United States Patent
Mori

(10) Patent No.: US 9,656,349 B2
(45) Date of Patent: May 23, 2017

(54) LASER PROCESSING APPARATUS CAPABLE OF INCREASING FOCUSED BEAM DIAMETER

(71) Applicant: FANUC CORPORATION, Minamitsuru-gun, Yamanashi (JP)

(72) Inventor: Atsushi Mori, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/868,926

(22) Filed: Sep. 29, 2015

(65) Prior Publication Data

US 2016/0089749 A1   Mar. 31, 2016

(30) Foreign Application Priority Data

Sep. 30, 2014  (JP) ................................. 2014-201853

(51) Int. Cl.
*B23K 26/064*    (2014.01)
*G02B 27/40*    (2006.01)
(Continued)

(52) U.S. Cl.
CPC ...... *B23K 26/0648* (2013.01); *B23K 26/0665* (2013.01); *G02B 27/0025* (2013.01); *G02B 27/40* (2013.01)

(58) Field of Classification Search
CPC .... B23K 26/0648; G02B 27/00; G02B 27/40; G02B 27/0025
(Continued)

(56) References Cited

U.S. PATENT DOCUMENTS 6,004,487 A * 12/1999 Wada ................. B23K 26/0084
219/121.75
6,888,853 B1 * 5/2005 Jurgensen .......... B23K 26/0604
101/150

(Continued)

FOREIGN PATENT DOCUMENTS

CN   102448660 A   5/2012
JP      47034198   12/1972
(Continued)

OTHER PUBLICATIONS

Japanese Office Action dated Feb. 9, 2016 for Japanese Application No. 2014-201853.

*Primary Examiner* — Samuel M Heinrich
(74) *Attorney, Agent, or Firm* — RatnerPrestia

(57) ABSTRACT

A laser processing apparatus including a processing head and a light-focusing optical section for focusing a laser beam having a diffusion angle and enabling the laser beam having a convergent angle to be emitted from the processing head. The laser processing apparatus includes a transmissive optical member located upstream of the light-focusing optical section so as to transmit the laser beam while keeping the diffusion angle constant, or located downstream of the light-focusing optical section so as to transmit the laser beam while keeping the convergent angle constant. The transmissive optical member includes a focused-beam diameter increasing part for increasing a focused beam diameter of the laser beam transmitted through the focused-beam diameter increasing part, as compared to a focused beam diameter of the laser beam in a case where the laser beam is not transmitted through the focused-beam diameter increasing part but is focused by the light-focusing optical section.

14 Claims, 23 Drawing Sheets

(51) Int. Cl.
*G02B 27/00* (2006.01)
*B23K 26/06* (2014.01)

(58) Field of Classification Search
USPC ....... 219/121.62, 121.75; 359/237, 362, 432,
359/433; 385/15, 33; 372/9
See application file for complete search history.

(56) References Cited

U.S. PATENT DOCUMENTS

| | | | |
|---|---|---|---|
| 7,057,580 B1 * | 6/2006 | Ivanov | G02B 5/1885 345/4 |
| 2012/0031883 A1 | 2/2012 | Kumamoto et al. | |
| 2013/0306609 A1 | 11/2013 | Watanabe | |

FOREIGN PATENT DOCUMENTS

| | | |
|---|---|---|
| JP | S58-154484 A | 9/1983 |
| JP | 09103896 | 4/1997 |
| JP | 2008-168333 | 7/2008 |
| JP | 2009-056481 A | 3/2009 |
| JP | 2009-178725 A | 8/2009 |
| JP | 2010188385 | 9/2010 |
| JP | 2012-024782 A | 2/2012 |
| JP | 2014037003 | 2/2014 |
| JP | 2014073526 | 4/2014 |
| WO | 2012164663 | 12/2012 |

\* cited by examiner

FIG. 19A
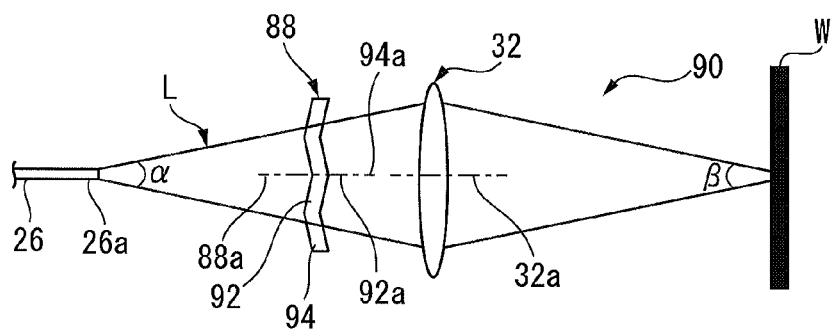
FIG. 19B
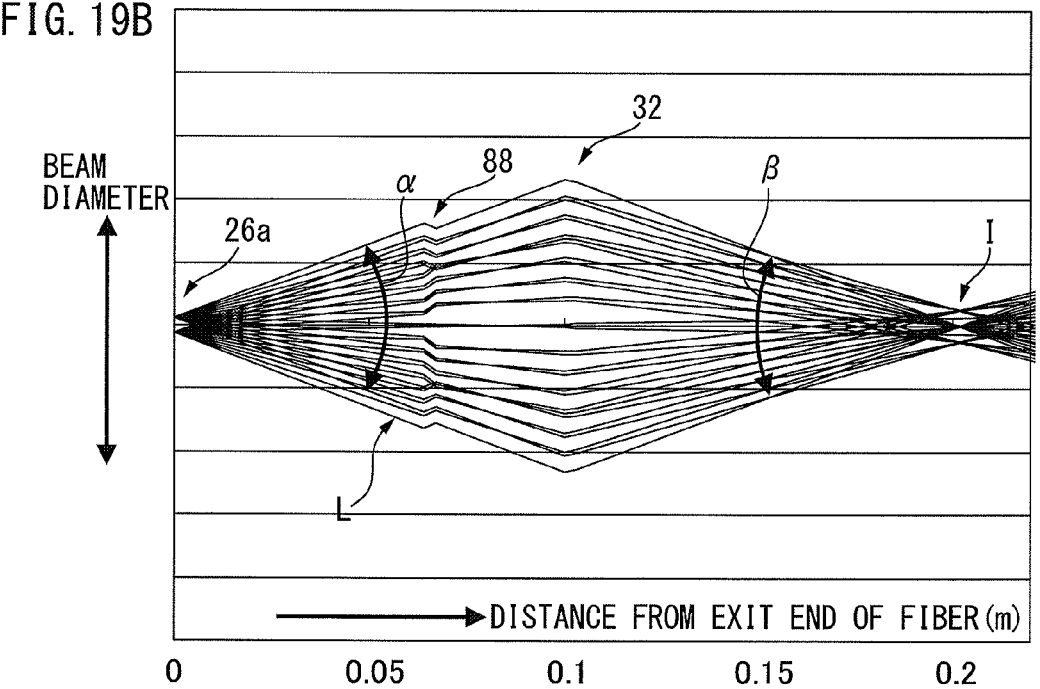
→ DISTANCE FROM EXIT END OF FIBER (m)
FIG. 19C
FIG. 19D
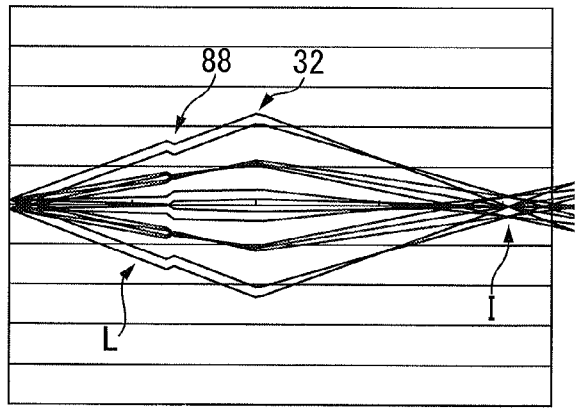

LASER PROCESSING APPARATUS CAPABLE OF INCREASING FOCUSED BEAM DIAMETER

BACKGROUND OF THE INVENTION

1. Field of the Invention

The present invention relates to a laser processing apparatus capable of increasing a focused beam diameter.

2. Description of the Related Art

Generally, a laser processing apparatus which performs processing on a workpiece by using a laser beam is equipped with a light-focusing optical section for focusing or condensing the laser beam supplied from a laser source and entering a processing head, and for emitting the focused or condensed beam from the processing head. The light-focusing optical section includes a desired number of lenses, and provides a predetermined collecting angle (also referred to as a convergent angle, in the present application) to the entered or input laser beam. The laser beam provided with the convergent angle forms a light focusing point or focal spot, corresponding to an imaging point at a predetermined distance from the principal point of the light-focusing optical section. In the present application, a beam diameter at the light focusing point is referred to as a focused beam diameter. Laser processing is performed by conforming the light focusing point to a portion to be processed of a workpiece, or by purposely displacing the light focusing point from the portion to be processed in a direction along the optical axis. The convergent angle affects the focusing depth of the laser beam at the portion to be processed, and the focused beam diameter affects the energy density of the laser beam at the portion to be processed. Thus, it is possible to determine optimum convergent angle and optimum focused beam diameter in accordance with the kind of laser processing, such as welding, cutting, marking, etc., or the material, thickness, etc. of the workpiece.

The quality of a laser beam used for laser processing depends on a focusing performance ($M^2$) of the laser beam, and can be expressed by the product of a convergent angle and a focused beam diameter. The product of the convergent angle and the focused beam diameter is a constant value determined according to the kind of a laser beam (a laser medium, etc.), and it may be considered that the smaller the product the higher the laser beam quality. In the laser processing apparatus, when the laser beam entering the processing head has a minimum beam diameter and a spreading angle (also referred to as a diffusion angle, in the present application), the light-focusing optical section is generally designed so that the product of the convergent angle and the focused beam diameter of the output laser beam becomes equal to the product of the diffusion angle and the minimum beam diameter of the input laser beam (i.e., the light-focusing optical section does not affect the quality or focusing performance of the laser beam). In this connection, the focused beam diameter is determined by the minimum beam diameter of the input laser beam and the imaging magnification of the light-focusing optical section, and the convergent angle is determined by the diffusion angle of the input laser beam and the imaging magnification of the light-focusing optical section. As a result, in a case where it is desired, for example, to adjust the focused beam diameter due to a change in the kind of processing or the kind of workpiece, changing the imaging magnification of the light-focusing optical section causes a change in the convergent angle, and thus it is difficult to adjust only the focused beam diameter.

A laser processing apparatus configured to be able to adjust a focused beam diameter or a convergent angle, provided to the laser beam by a light-focusing optical section, has been known. For example, Japanese Unexamined Patent Publication No. 2012-024782 (JP2012-024782A) discloses a laser processing apparatus in which provisions are made so that a laser beam transmitted from a laser oscillator through a feeding fiber is either passed through a selected one of a plurality of process fibers of different core diameters or directed to a laser processing unit (or a light-focusing optical section) without passing through any process fiber. In this laser processing apparatus, it is claimed that the core diameter of the optical fiber immediately before the laser processing unit (i.e., the minimum beam diameter of the laser beam to be introduced into the laser processing unit) can be changed as needed, and therefore that the focused beam diameter of the laser beam to be focused by the laser processing unit can be adjusted according to the thickness, etc. of the workpiece without having to change the imaging magnification of the laser processing unit.

On the other hand, Japanese Unexamined Patent Publication No. 2009-056481 (JP2009-056481A) discloses a laser processing apparatus in which a laser beam emitted from a laser oscillator is transmitted through an optical fiber to an optical head (or a light-focusing optical section) and then a workpiece is irradiated with the laser beam, the apparatus being characterized in that an adjusting means for adjusting the spreading angle of the laser beam from the laser oscillator so as to become equal to or smaller than the allowable aperture of the optical fiber is provided just before the incident end of the optical fiber. In this laser processing apparatus, it is claimed that by adjusting the spreading angle of the laser beam (i.e., the collecting angle of the laser beam to be input to the optical fiber) on the input side of the optical fiber, any variation in the spreading angle of the laser beam emerging from the optical fiber (i.e., variations in the convergent angle and focused beam diameter of the laser beam focused through the optical head) can be eliminated and consistent processing results can always be obtained.

A laser processing apparatus configured to include means for adjusting the beam diameter or beam shape of the laser beam entering the light-focusing optical section, which is provided for purposes other than adjusting the convergent angle or focused beam diameter, has been also known. For example, Japanese Unexamined Patent Publication No. 2008-168333 (JP2008-168333A) discloses a laser soldering apparatus in which a circular laser beam entering a processing head from a laser oscillator is first converted into a ring-shaped laser beam by a beam converter constructed from a combination of a concave cone lens and a convex cone lens and then converged by a projection lens and projected in the shape of a ring onto the part to be processed on a workpiece. On the other hand, Japanese Unexamined Patent Publication No. 2009-178725 (JP2009-178725A) discloses a laser processing apparatus in which a laser beam from a laser source is shaped into an annular form by a laser shaping means including a pair of axicon lenses, and the annular laser beam is converged by a converging lens at a point for processing, thereby suppressing the spherical aberration of the converging lens.

SUMMARY OF THE INVENTION

In a laser processing apparatus equipped with a light-focusing optical section, it is desired to make it possible to irradiate a workpiece with a laser beam having an optimum focused beam diameter that is adapted to the kind of laser processing, or the material, thickness, etc. of a workpiece, by employing techniques other than a technique of changing the imaging magnification of the light-focusing optical section.

One aspect of the present invention is a laser processing apparatus that includes a processing head configured to irradiate a workpiece with a laser beam; a light-focusing optical section provided in the processing head, the light-focusing optical section configured to focus a laser beam having a diffusion angle, the laser beam being supplied from a laser source and entering the processing head, and to enable the laser beam to be emitted from the processing head as the laser beam having a convergent angle; and a transmissive optical member provided in the processing head, the transmissive optical member configured to be located at an upstream side of the light-focusing optical section as seen in a traveling direction of the laser beam so as to transmit the laser beam while keeping the diffusion angle constant, before and after transmission, or alternatively, the transmissive optical member configured to be located at a downstream side of the light-focusing optical section as seen in a traveling direction of the laser beam so as to transmit the laser beam while keeping the convergent angle constant, before and after transmission; wherein the transmissive optical member includes a focused-beam diameter increasing part configured to increase a focused beam diameter of the laser beam transmitted through the focused-beam diameter increasing part, as compared to a focused beam diameter of the laser beam in a case where the laser beam is not transmitted through the focused-beam diameter increasing part but is focused by the light-focusing optical section.

According to the laser processing apparatus of the above aspect, since a configuration in which the laser beam is transmitted through the focused-beam diameter increasing part of the transmissive optical member, is employed instead of a configuration in which the imaging magnification of the light-focusing optical section is increased, it is possible to enlarge the focused beam diameter without substantially changing the distance from the principal point of the light-focusing optical section to the light focusing point and the convergent angle of the laser beam. Therefore, without affecting the overall size of the laser processing apparatus, it is possible to irradiate a workpiece with a laser beam having an optimum focused beam diameter that is adapted to the kind of laser processing, or the material, thickness, etc. of the workpiece. Since the transmissive optical member is constructed to allow the laser beam to be transmitted therethrough while keeping the diffusion angle or the convergent angle unchanged or constant before and after the transmission, it is possible to inhibit the transmissive optical member from influencing on a geometrical aberration during focusing. Furthermore, since the transmissive optical member is disposed upstream or downstream of the light-focusing optical section as seen in the traveling direction of the laser beam, it is possible to prevent the geometrical aberration from increasing due to the provision of the transmissive optical member, in a general configuration wherein the light-focusing optical section is designed to reduce the geometrical aberration.

BRIEF DESCRIPTION OF THE DRAWINGS

The above and other objects, features and advantages of the present invention will become more apparent from the description of the preferred embodiments as set forth below with reference to the accompanying drawings, wherein:

FIG. 19A is a component layout view for explaining the configuration of a laser processing apparatus according to a still further embodiment;

FIG. 19B is a diagram depicting some of light-ray paths in the laser processing apparatus of FIG. 19A;

FIG. 19C is a diagram depicting light-ray paths optionally extracted from the light-ray paths shown in FIG. 19B;

FIG. 19D is an enlarged view depicting the light-ray paths around a light focusing point;

DETAILED DESCRIPTION

Embodiments of the present invention will be described below with reference to the accompanying drawings.

Figure 1:
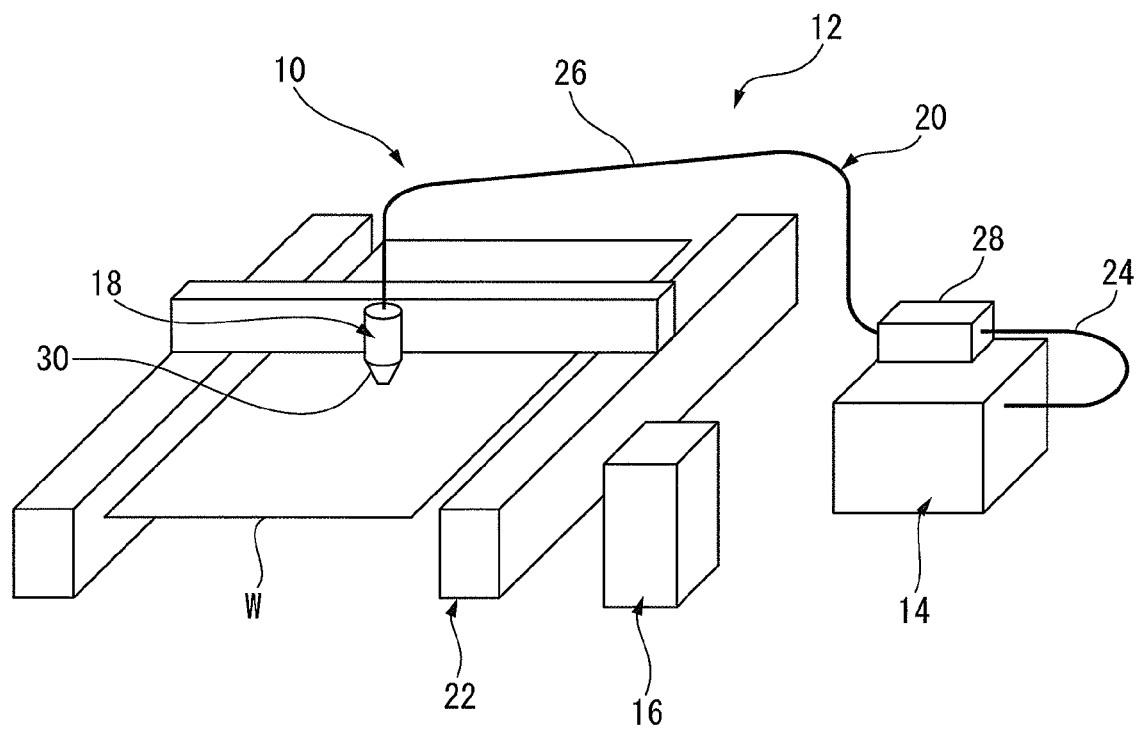
FIG. 1 is a perspective view schematically depicting one exemplary configuration of a laser processing system including a laser processing apparatus.

FIG. 1 depicts in schematic form one example of the construction of a laser processing system 12 incorporating a laser processing apparatus 10 according to one embodiment of the present invention. The laser processing system 12 includes the laser processing apparatus 10, a laser source 14 and a control unit 16 which controls the operation of the laser processing apparatus 10 as well as the operation of the laser source 14. The laser processing apparatus 10 includes a processing head 18, a transmitting means 20 for transmitting a laser beam from the laser source 14 to the processing head 18, and a driving mechanism 22 which moves one or both of the processing head 18 and a workpiece W relative to each other.

The laser source 14 includes, for example, a fiber laser oscillator (not shown), and a laser beam generated by the oscillator is transmitted through the transmitting means 20 and fed into the processing head 18. The transmitting means 20 includes a first optical fiber 24 connected to the laser source 14, a second optical fiber 26 connected to the processing head 18, and a fiber coupler 28 which optically couples together the first and second optical fibers 24 and 26. For example, by attaching the first optical fiber 24 having a predetermined core diameter to the laser source 14 and optically coupling the first optical fiber 24 via the fiber coupler 28 to the second optical fiber 26 having a desired different core diameter, a laser beam having a minimum beam diameter equal to the core diameter of the second optical fiber 26 can be emitted from the exit or output end of the second optical fiber 26 and fed into the processing head 18. The construction is not limited to the illustrated example; for example, the laser source 14 may be constructed using any other suitable type of oscillator such as a $CO_2$ laser oscillator, and the transmitting means 20 may employ any other suitable configuration using, for example, a light-guiding tube, reflecting mirror, etc.

The processing head 18 includes a light-focusing optical section (not shown) for focusing or condensing the laser beam introduced from the transmitting means 20, and performs laser processing by irradiating a restricted region on the surface of the workpiece W with the laser beam emitted from a processing nozzle 30 provided at the end of the head. During the laser processing, an assist gas composed of oxygen, nitrogen, air, argon, etc. is sprayed over the portion to be processed of the workpiece W and its surrounding area. The assist gas is supplied to the processing head 18 from an external gas supply source (not shown). Compressed air for spraying the assist gas over the workpiece W is also supplied to the processing head 18.

The driving mechanism 22 can move the processing head 18 and the workpiece W relative to each other in directions along the surface of the workpiece. The driving mechanism 22 can also move the processing head 18 and the workpiece W closer to or away from each other in a selective manner. For example, the driving mechanism 22 can move the processing head 18 and the workpiece W relative to each other in a three-dimensional fashion with three control axes (X axis, Y axis and Z axis) operating in accordance with command values defined in an orthogonal three-axis coordinate system. In this case, the driving mechanism 22 may include a servo motor and a power transmitting mechanism for each control axis. The individual control axes may be set for either one or both of the processing head 18 and the workpiece W. For example, the control axes may be configured so that the processing head 18 is driven by the X, Y and Z axes and moved in directions horizontal and perpendicular relative to a workpiece table (not shown) with the workpiece W fixed thereon, or so that the workpiece table is driven by the X and Y axes while driving the processing head 18 by the Z axis.

The control unit 16 has, for example, a configuration corresponding to a numerical control unit. The control unit 16 has the capability of interpreting a given laser processing program and outputting an operation command to the controlled object such as the laser processing apparatus 10 or the laser source 14, thereby causing the driving mechanism 22 to move the processing head 18 or the workpiece W or causing the laser source 14 to generate and emit laser beam or the gas supply source to supply assist gas to the processing head 18.

Figure 2:
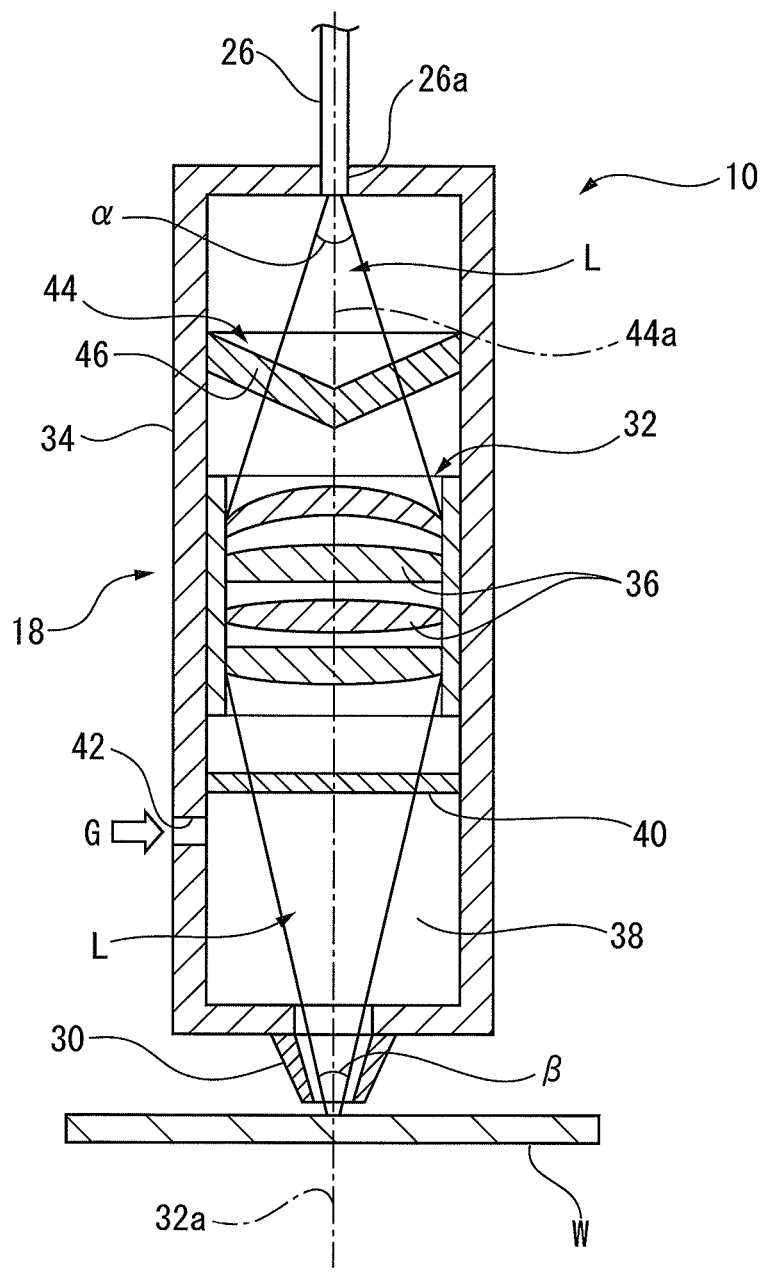
FIG. 2 is a sectional view schematically depicting the configuration of a laser processing apparatus according to one embodiment.

FIG. 2 depicts in schematic form the arrangement of the major component elements of the laser processing apparatus 10 according to the one embodiment of the present invention. The laser processing apparatus 10 includes the processing head 18 for irradiating the workpiece W with the laser beam L, and the light-focusing optical section 32, provided within the processing head 18, for focusing the laser beam L entering the processing head 18 with a diffusion angle $\alpha$ from the laser source 14 (FIG. 1) and for causing the laser beam L to be emitted from the processing head 18 with a convergent angle $\beta$. The processing head 18 has a hollow, cylindrically shaped housing 34, and is fixed at the rear end (upper end in the drawing) of the housing 34 to the exit end 26a of the optical fiber 26. The optical fiber 26 is attached so as to be coaxial with the optical axis 32a of the light-focusing optical section 32 at least at its exit end 26a, and the laser beam L with a minimum beam diameter equal to the core diameter of the exit end 26a is emitted from the exit end 26a into the interior of the housing 34 with the diffusion angle $\alpha$. Accordingly, the axis line passing through the center of the laser beam L coincides with the optical axis 32a. The diffusion angle $\alpha$ is substantially determined by the convergent angle of the laser beam input to the input end (not shown) of the optical fiber 26 and the characteristics of the optical fiber 26 itself.

The light-focusing optical section 32 includes a predetermined number of optical lenses 36. By combining a plurality of various kinds of spherical lenses as the optical lenses 36, for example, geometrical aberrations including spherical aberrations can be minimized. By taking measures such as minimizing a geometrical aberration, the light-focusing optical section 32 is designed so that the product of the minimum beam diameter and the diffusion angle $\alpha$ of the laser beam L entering the light-focusing optical section 32 becomes equal to the product of the focused beam diameter and the convergent angle $\beta$ of the laser beam L exiting the light-focusing optical section 32 (that is, the light-focusing optical section 32 does not affect the quality or focusing performance of the laser beam L).

One example of the focusing action of the light-focusing optical section 32 will be described below. In this example, the core diameter of the optical fiber 26 is set at 50 μm and the diffusion angle $\alpha$ of the laser beam L is set at 0.1 radians as a half angle. Assuming that the light-focusing optical section 32 is configured as a single virtual lens, the distance from the core end face of the exit end 26a of the optical fiber 26 to the principal point of the light-focusing optical section (or virtual lens) 32 is set at 100 mm and the focal length of the light-focusing optical section 32 is set at 50 mm. Further, it is assumed that no other optical element is provided between the exit end 26a of the optical fiber 26 and the light-focusing optical section 32. Under these conditions, the distance from the principal point of the light-focusing optical section 32 to the light focusing point (or imaging point) of the laser beam L is determined as 100 mm, the imaging magnification of the light-focusing optical section 32 is determined as 1.0, the convergent angle $\beta$ as a half angle is determined as 0.1 radians, and the focused beam diameter (diameter) at the light focusing point is determined as 50 μm. From the above conditions, if the distance from the exit end 26a of the optical fiber 26 to the principal point of the light-focusing optical section 32 is changed to 90 mm without changing the diffusion angle $\alpha$ of the laser beam L, the distance from the principal point to the light focusing point will be changed to 112.5 mm, the imaging magnification will be changed to 1.25, the convergent angle $\beta$ as a half angle will be changed to 0.08 radians, and the focused beam diameter will be changed to 62.5 μm. In this way, the action of the light-focusing optical section 32 as a single unit is such that when the imaging magnification changes, the convergent angle $\beta$ and the focused beam diameter are changed to be linked to each other. In this connection, the light-focusing optical section 32 may be mounted in the housing 34 so as to be movable along the optical axis 32a in order to change the imaging magnification, etc.

The processing nozzle 30 formed from copper or the like is mounted at the forward end (lower end in the drawing) of the housing 4. The end of the processing nozzle 30 is usually disposed in close proximity to the light focusing point of the laser beam L. The space between the processing nozzle 30 and the light-focusing optical section 32 may be formed as a hermetically sealed chamber 38, except for the nozzle opening and the assist gas inlet to be described later. Alternatively, a bulkhead 40 formed from a transparent plate may be provided between the light-focusing optical section 32 and the processing nozzle 30, and the space between the bulkhead 40 and the processing nozzle 30 may be formed as the hermetically sealed chamber 38. The bulkhead 40 prevents sputters, etc. generated during the processing of the workpiece W from entering the light-focusing optical section 32. When the bulkhead 40 becomes smudged, only the bulkhead 40 need be replaced, and the bulkhead 40 may be configured to be detachable from the housing 34 so that it can be replaced as needed. An inlet 42 for introducing the assist gas G into the chamber 38 is formed in a sidewall of the housing 34, and the assist gas G under predetermined pressure is introduced from the external gas supply source (not shown) into the chamber 38 through the inlet 42. The assist gas G is sprayed over the workpiece W from the processing nozzle 30 together with compressed air. It is desirable that the assist gas G be sprayed from the processing nozzle 30 while maintaining the flow coaxial with the optical axis 32a; to achieve this, a mechanism (not shown) may be provided that fine-adjusts the position of the processing nozzle 30 in directions perpendicular to the optical axis 32a. It is also possible to provide a mechanism (not shown) for aligning the optical axis 32a (and hence the light-focusing optical section 32) with the axial center of the processing nozzle 30.

As one example, the diameter of the opening of the processing nozzle 30 can be set in the range of about 0.8 mm to 6 mm, the axis position of the processing nozzle 30 can be adjusted in the range of about 2 mm to 5 mm, the pressure of the assist gas G in the processing nozzle 30 can be adjusted in the range of about 0.01 Mpa to 3 Mpa, and the distance between the processing nozzle 30 and the workpiece W can be controlled in the range of about 0.5 mm to 4 mm. The chamber 38 has a hermetically sealed structure in order to maintain the pressure of the assist gas G at a constant level, but other portions of the housing 34, including the portion where the exit end 26a of the optical fiber 26 is attached, can also be made to have a structure that can prevent outside air from entering the interior of the housing 34. This can block the infiltration of external dirt, humidity, etc. into the housing 34 and can thus prevent the optical fiber exit end 26a and other optical elements such as the light-focusing optical section 32 from being smudged.

The laser processing apparatus 10 further includes a transmissive optical member 44 provided in the processing head 18 and located at an upstream side (upward in the drawing) of the light-focusing optical section 32 as seen in the traveling direction of the laser beam L. The transmissive optical member 44 is an optical element which is mounted within the housing 34 at a predetermined position between the exit end 26a of the optical fiber 26 and the light-focusing optical section 32 with the center axis line 44a thereof coinciding with the optical axis 32a of the light-focusing optical section 32. The transmissive optical member 44 is capable of transmitting the laser beam L emitted from the exit end of the optical fiber 26 while keeping the diffusion angle α of the laser beam L unchanged or constant before and after the transmission.

The concrete configuration of the transmissive optical member 44 in the present embodiment and the laser beam transmitting action thereof will be described with reference to FIGS. 3A to 4B.

Figure 3A:
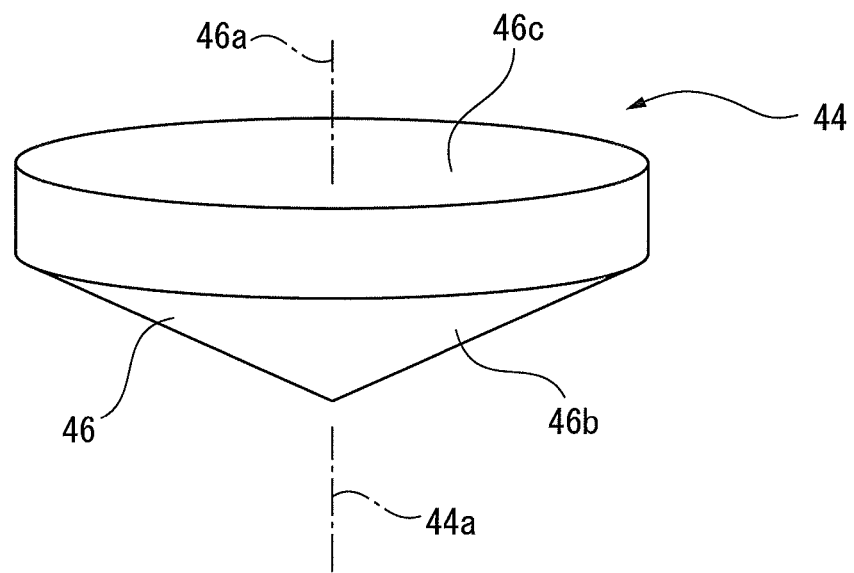
FIG. 3A is a perspective view depicting a transmissive optical member of a laser processing apparatus according to one embodiment.
Figure 3B:
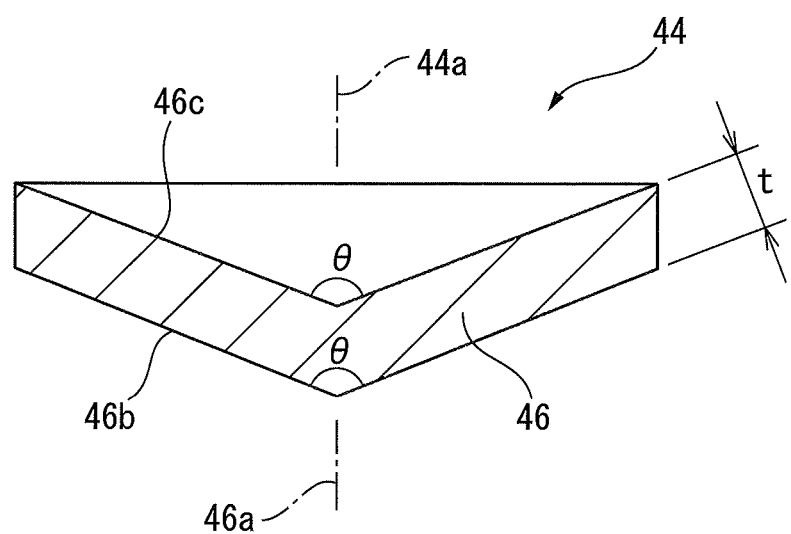
FIG. 3B is a sectional view depicting the transmissive optical member of FIG. 3A.

As shown in FIGS. 3A and 3B, the transmissive optical member 44 includes a conical plate portion 46 having a uniform thickness and a rotationally symmetrical shape, and inclined with respect to a symmetry axis 46a thereof. More specifically, the conical plate portion 46 has a first surface 46b as a cone-shaped convex surface and a second surface 46c as a cone-shaped concave surface opposite to the first surface 46b, the second surface having a vertex angle θ equal to a vertex angle θ of a cone of the first surface 46b and having a shape and dimensions identical to those of the first surface 46b. The first and second surfaces 46b and 46c extend in parallel with each other, and the dimension (i.e., thickness) t of the conical plate portion 46 measured in a direction perpendicular to the first and second surfaces 46b and 46c is uniform in whole. The symmetry axis 46a of the conical plate portion 46 coincides with the center axis line 44a of the transmissive optical member 44. In the present embodiment, the transmissive optical member 44 is provided in its entirety with the conical plate portion 46, as illustrated.

The transmissive optical member 44 can be formed from a material, such as quartz glass or BK7, that does not or is least likely to absorb or scatter the laser beam L. Further, the first and second surfaces 46b, 46c of the transmissive optical member 44 can be treated with an antireflective coating formed from a multilayered optical film. This structure allows the laser beam L to be transmitted through the transmissive optical member 44 without attenuating the beam energy. Due to the difference in refractive index between the transmissive optical member 44 and ambient air, the optical path of the laser beam L is tilted according to the incident angle at the time when the laser beam enters the transmissive optical member 44 and also exits the transmissive optical member 44. This phenomenon will be described with reference to FIGS. 4A and 4B.

Figure 4A:
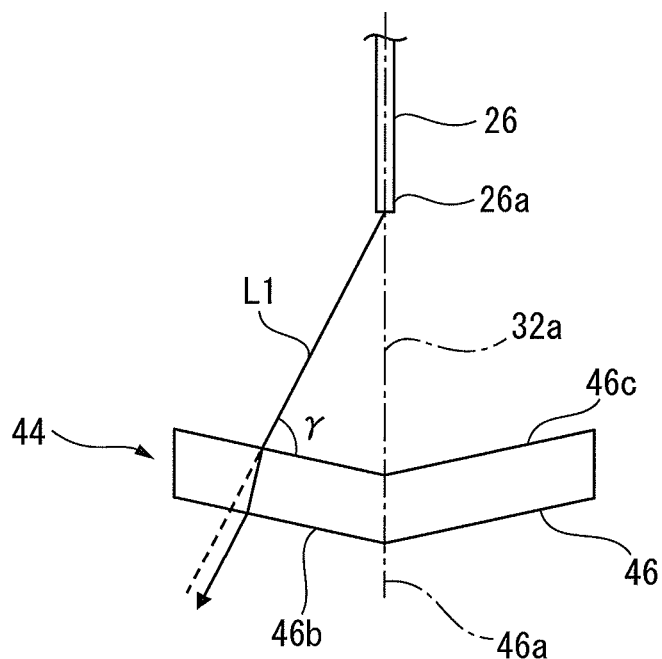
FIG. 4A is a conceptual diagram for explaining the laser beam transmitting action of the transmissive optical member of FIG. 3A, in a configuration wherein the transmissive optical member is oriented in one direction.
Figure 4B:
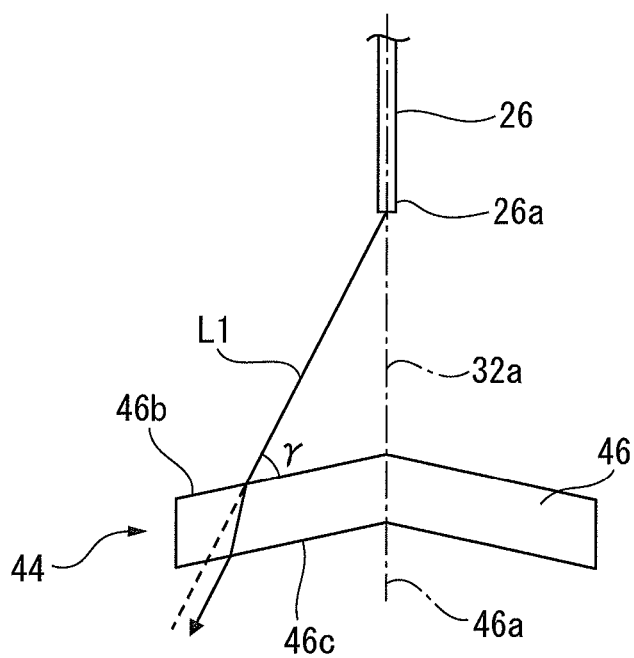
FIG. 4B is a diagram depicting a configuration in which the transmissive optical member of FIG. 4A is oriented in an opposite direction.

As shown conceptually in FIGS. 4A and 4B, the transmissive optical member 44 is arranged within the housing 34 (FIG. 2) of the processing head 18 at a position where the symmetry axis 46a of the conical plate portion 46 coincides with the optical axis 32a of the light-focusing optical section 32 (FIG. 2). Further, the transmissive optical member 44 is arranged at a position where the entirety of the laser beam L emitted from the exit end 26a of the optical fiber 26 will pass through the conical plate portion 46 (FIG. 2). In FIG. 4A, the transmissive optical member 44 is arranged with the second surface 46c of the conical plate portion 46 facing the optical fiber 26. In FIG. 4B, the transmissive optical member 44 is arranged with the first surface 46b of the conical plate portion 46 facing the optical fiber 26.

Here, attention is paid to one light ray L1 in the light flux of the laser beam L. In the configuration of FIG. 4A, it is assumed that the light ray L1 enters the second surface 46c of the conical plate portion 46 with an acute incident angle γ. The light ray L1 is refracted, when entering the transmissive optical member 44, in a direction determined by the difference in refractive index and the incident angle γ, and also refracted, when exiting the transmissive optical member 44, in a direction determined by the difference in refractive index and the output angle. Since the second surface (the input face) 46c and the first surface (the output face) 46b are parallel with each other, the output angle is equal to the incident angle γ, and therefore, the traveling direction of the light ray L1 before the entrance to the transmissive optical member 44 is identical to the traveling direction of the light ray L1 after the exit from the transmissive optical member 44. Further, after twice refraction, the path of the light ray L1 after exiting the transmissive optical member 44 is subjected to a parallel translation in a predetermined direction (a direction toward the optical axis 32a, in the drawing) with respect to the path of the light ray L1 (indicated by a dashed line) before entering the transmissive optical member 44. The distance of the parallel translation of the light ray L1 is determined by several factors, such as the thickness t (FIG. 3B) of the conical plate portion 46 of the transmissive optical member 44, the vertex angle θ thereof (FIG. 3B), the difference in refractive index between the transmissive optical member 44 and the ambient air, or the incident angle γ on the conical plate portion 46. The entire light flux of the laser beam L emitted from the exit end 26a of the optical fiber 26 undergo the same phenomenon, and as a result, the transmissive optical member 44 allows the laser beam L to be transmitted therethrough while keeping the diffusion angle α of the laser beam L (FIG. 2) unchanged or constant before and after the transmission. Further, as will be described later, when a light ray passes through the conical plate portion 46 of the transmissive optical member 44, an effect occurs as if the optical axis is displaced obliquely with respect to the light ray, and as a result, the focused beam diameter at the light focusing point or focal spot, at which all of the light rays are focused, is enlarged.

In the arrangement of FIG. 4B in which the transmissive optical member 44 is reversed relative to the arrangement shown in FIG. 4A, the path of the light ray L1 after exiting the transmissive optical member 44 can likewise be subjected to a parallel translation in a predetermined direction (a direction toward the optical axis 32a, in the drawing) with respect to the path of the light ray L1 (indicated by a dashed line) before entering the transmissive optical member 44. Accordingly, in this arrangement, the transmissive optical member 44 allows the laser beam L to be transmitted therethrough while keeping the diffusion angle α of the laser beam L (FIG. 2) unchanged or constant before and after the transmission. In this arrangement, however, the light ray L1, that is the same as the light ray L1 of FIG. 4A, enters the first surface 46b of the conical plate portion 46 with an incident angle γ smaller than the incident angle γ of FIG. 4A. As a result, the distance of the parallel translation of the light ray L1 caused by the transmission in the arrangement of FIG. 4B is larger than the distance of the parallel translation of the light ray L1 caused by the transmission in the arrangement of FIG. 4A.

Figure 5A:
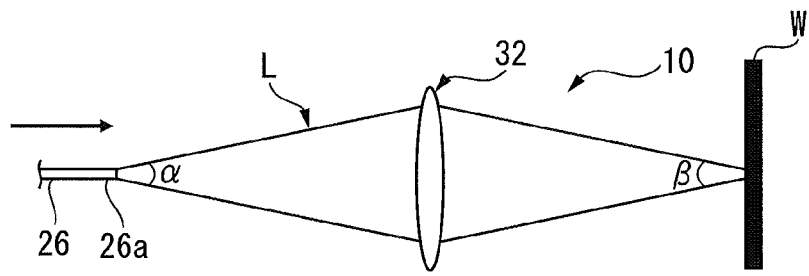
FIG. 5A is a component layout view for explaining the laser beam focusing action of a laser processing apparatus provided with no transmissive optical member.

The conical plate portion 46 of the transmissive optical member 44 constitutes the focused-beam diameter increasing part which increases the focused beam diameter of the laser beam L. The laser beam focusing action of the laser processing apparatus 10 including the transmissive optical member 44 will be described below with reference to FIGS. 5A to 7D. In FIGS. 5A, 6A and 7A, the entire construction of the laser processing apparatus 10 is shown, but for simplicity, the housing 34, processing nozzle 30 and bulkhead 40 shown in FIG. 2 are omitted from illustration, and the light-focusing optical section 32 is replaced by a single virtual lens.

First, referring to FIGS. 5A to 5D, a laser beam focusing action, in a configuration wherein the transmissive optical member 44 is removed from the laser processing apparatus 10, will be investigated. As shown in FIG. 5A, the above configuration does not include the transmissive optical member 44 in the optical path of the laser beam L in the processing head 18. The laser beam L having the diffusion angle α, emitted from the exit end 26a of the optical fiber 26, is focused through the light-focusing optical section (or a virtual lens) 32, without passing through the transmissive optical member 44, and thereby the workpiece W is irradiated with the focusing laser beam L having the convergent angle β. The dimensions of the respective parts are set as follows: the core diameter of the optical fiber 26 is 50 μm, the diffusion angle α of the laser beam L as a half angle is 0.1 radian, the distance from the core end face of the exit end 26a of the optical fiber 26 to the principal point of the light-focusing optical section 32 is 100 mm, and the focal length of the light-focusing optical section 32 is 50 mm. Further, the distance from the principal point of the light-focusing optical section 32 to the light focusing point of the laser beam L is 100 mm, the imaging magnification of the light-focusing optical section 32 is 1.0, the convergent angle β of the laser beam L is 0.1 radians as a half angle, and the focused beam diameter at the light focusing point is 50 μm.

Figure 5B:
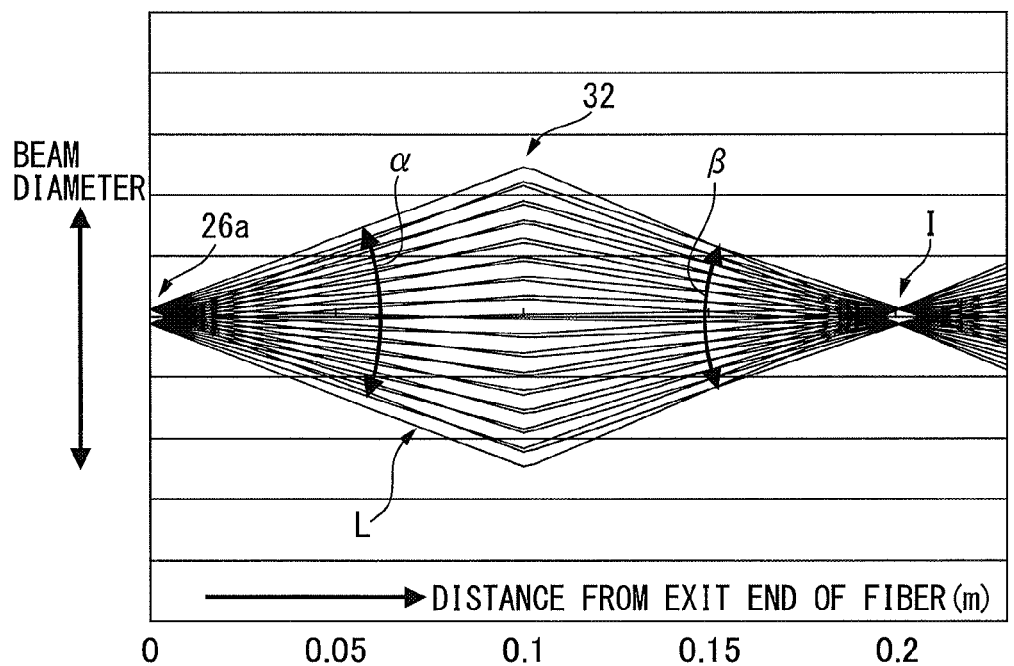
FIG. 5B is a diagram depicting some of light-ray paths in the laser processing apparatus of FIG. 5A.
Figure 5C:
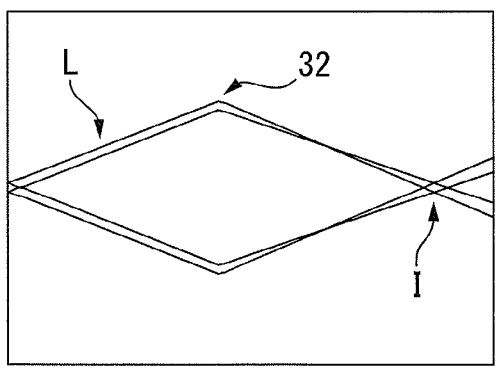
FIG. 5C is a diagram depicting light-ray paths optionally extracted from the light-ray paths shown in FIG. 5B.

FIG. 5B depicts the paths of some of the rays of the laser beam L obtained through simulation. For better understanding, FIG. 5C depicts light-ray paths optionally extracted from the light-ray paths shown in FIG. 5B. For example, in FIGS. 5B and 5C, the light ray emitted from the upper edge of the core end face of the optical fiber exit end 26a diffuses with the diffusion angle α and enters the light-focusing optical section 32, thereafter is output from the light-focusing optical section 32 with the convergent angle β and is focused (or imaged) at the bottom position in the illustrated light focusing point I. On the other hand, in FIGS. 5B and 5C, the light ray emitted from the lower edge of the core end face of the optical fiber exit end 26a diffuses with the diffusion angle α and enters the light-focusing optical section 32, thereafter is output from the light-focusing optical section 32 with the convergent angle β and is focused (or imaged) at the top position in the illustrated light focusing point I. Accordingly, all of the rays of the laser beam L emitted from the entire core end face of the optical fiber exit end 26a are focused in a circular region S having a focused beam diameter D (the region corresponding to the perimeter shape and diameter of the core end face) at the light focusing point I, as shown in an enlarged view of FIG. 5D. When the light focusing point I is located on the surface of the workpiece W, the workpiece surface is irradiated with the laser beam L as a circular spot having the focused beam diameter D.

Next, referring to FIGS. 6A to 6D, a laser beam focusing action of the laser processing apparatus 10 including the transmissive optical member 44 will be investigated. As shown in FIG. 6A, the above configuration includes the transmissive optical member 44 arranged so that the first surface 46b of the conical plate portion 46 faces the optical fiber 26. The laser beam L having the diffusion angle α, emitted from the exit end 26a of the optical fiber 26, is first transmitted through the transmissive optical member 44 and then focused through the light-focusing optical section (or a virtual lens) 32, and thereby the workpiece W is irradiated with the focusing laser beam L having the convergent angle β. The dimensions of the respective parts are set to be analogous to those in the arrangement of FIG. 5A; more specifically, the core diameter of the optical fiber 26 is 50 μm, the diffusion angle α of the laser beam L as a half angle is 0.1 radian, the distance from the core end face of the exit end 26a of the optical fiber 26 to the principal point of the light-focusing optical section 32 is 100 mm, and the focal length of the light-focusing optical section 32 is 50 mm. Further, the transmissive optical member 44 is dimensioned so that the vertex angle θ of the conical plate portion 46 is 177.14° (i.e., an inclination angle with respect to a plane perpendicular to the symmetry axis 46a is 1.43°) and the thickness t is 3 mm, and is disposed at a position where the distance from the core end face of the optical fiber exit end 26a to the vertex of the conical plate portion 46 is 44 mm.

Figure 6A:
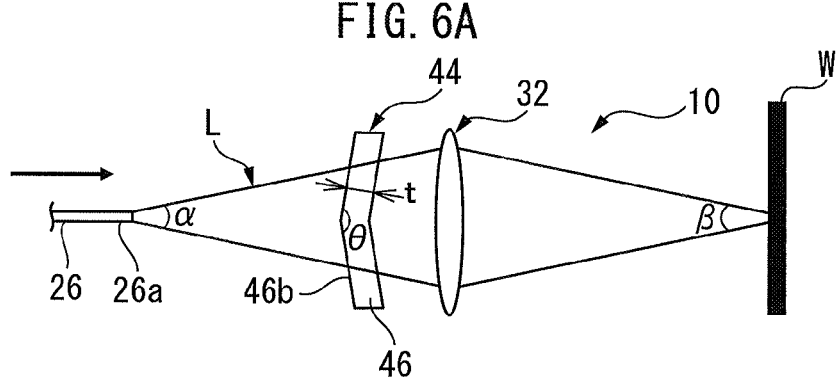
FIG. 6A is a component layout view for explaining the laser beam focusing action of a laser processing apparatus provided with the transmissive optical member of FIG. 3A.
Figure 6B:
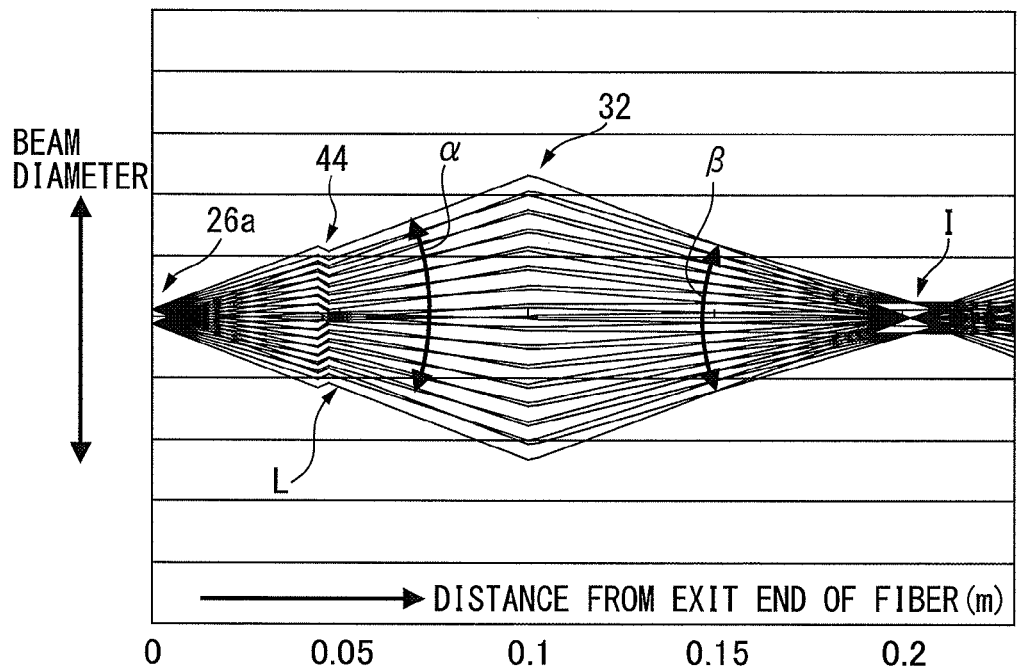
FIG. 6B is a diagram depicting some of light-ray paths in the laser processing apparatus of FIG. 6A.
Figure 6C:
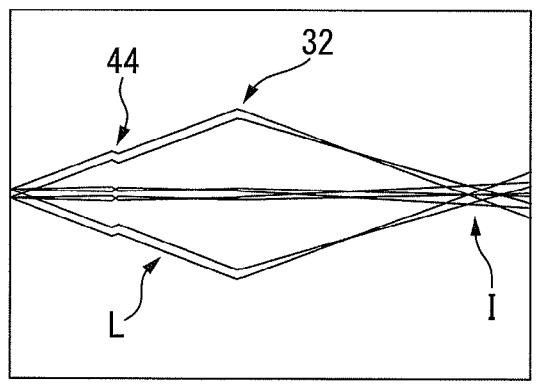
FIG. 6C is a diagram depicting light-ray paths optionally extracted from the light-ray paths shown in FIG. 6B.
Figure 7A:
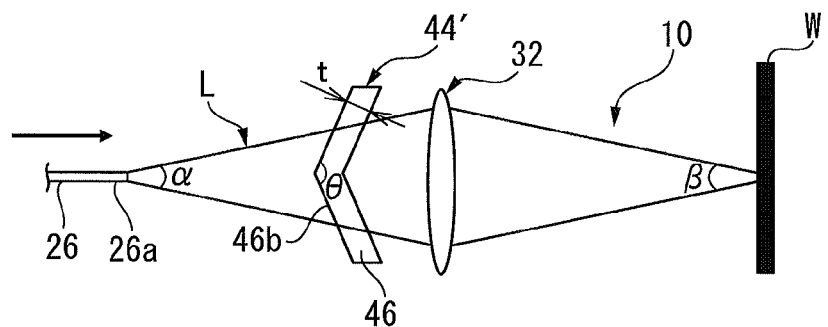
FIG. 7A is a component layout view for explaining the laser beam focusing action of a laser processing apparatus provided with a differently shaped transmissive optical member.

FIG. 6B depicts the paths of some of the rays of the laser beam L obtained through simulation. For better understanding, FIG. 6C depicts light-ray paths optionally extracted from the light-ray paths shown in FIG. 6B. For example, in FIGS. 6B and 6C, the light ray emitted from the upper edge of the core end face of the optical fiber exit end 26a diffuses with the diffusion angle α and enters the conical plate portion 46 of the transmissive optical member 44, then is subjected to a refraction and parallel translation as shown in FIG. 4B according to the incident angle so as to be transmitted through the transmissive optical member 44 while maintaining the diffusion angle α, thereafter enters the light-focusing optical section 32 and is output from the light-focusing optical section 32 with the convergent angle β, and is focused (or imaged) respectively at the center and bottom positions in the illustrated light focusing point I. On the other hand, in FIGS. 6B and 6C, the light ray emitted from the lower edge of the core end face of the optical fiber exit end 26a diffuses with the diffusion angle α and enters the conical plate portion 46 of the transmissive optical member 44, then is subjected to a refraction and parallel translation as shown in FIG. 4B according to the incident angle so as to be transmitted through the transmissive optical member 44 while maintaining the diffusion angle α, thereafter enters the light-focusing optical section 32 and is output from the light-focusing optical section 32 with the convergent angle β, and is focused (or imaged) respectively at the center and top positions in the illustrated light focusing point I. When each light ray passes through the conical plate portion 46 of the transmissive optical member 44, an effect occurs as if the optical axis is displaced obliquely with respect to the light ray, and as a result, the light ray is focused separately at two positions in the light focusing point I as illustrated.

Figure 6D:
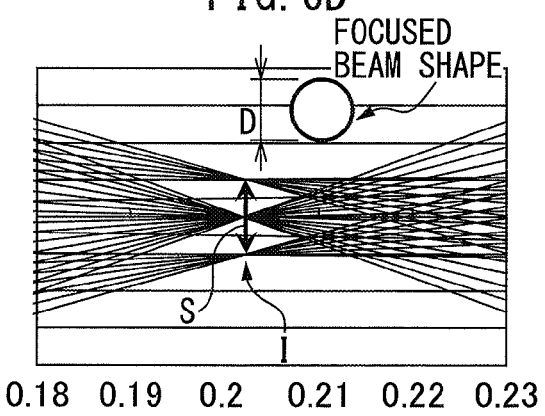
FIG. 6D is an enlarged view depicting the light-ray paths around a light focusing point.

Accordingly, all of the rays of the laser beam L emitted from the entire core end face of the optical fiber exit end 26a are focused in a circular region S having a focused beam diameter D (the region corresponding to the perimeter shape of the core end face and having a diameter twice as large as that of the core end face) at the light focusing point I, as shown in an enlarged view of FIG. 6D. When the light focusing point I is located on the surface of the workpiece W, the workpiece surface is irradiated with the laser beam L as a circular spot having the focused beam diameter D. As the results of the investigation, the distance from the principal point of the light-focusing optical section 32 to the light focusing point I of the laser beam L is determined as about 100 mm, the imaging magnification of the light-focusing optical section 32 is determined as about 1.0, the convergent angle β of the laser beam L as a half angle is determined as about 0.1 radians, and the focused beam diameter D at the light focusing point is determined as about 100 μm.

As can be understood from a comparison between the configuration of FIGS. 5A to 5D and the configuration of FIGS. 6A to 6D, the conical plate portion (or the focused-beam diameter increasing part) 46 of the transmissive optical member 44 acts to increase the focused beam diameter D of the laser beam L passed through the conical plate portion (or the focused-beam diameter increasing part) 46 as compared to the focused beam diameter D of the laser beam L in the case where the laser beam L is focused through the light-focusing optical section 32 without passing through the conical plate portion (or the focused-beam diameter increasing part) 46. Further, as will be apparent from the result of the investigation, it is possible to enlarge the focused beam diameter D (about twice, in the example of FIG. 6D) without substantially changing any one of the distance from the principal point of the light-focusing optical section 32 to the light focusing point I of the laser beam L, the imaging magnification of the light-focusing optical section 32, and the convergent angle β of the laser beam L.

In the arrangement (FIG. 5A) in which the transmissive optical member 44 is removed from the laser processing apparatus 10, if the focused beam diameter D is to be enlarged by increasing the imaging magnification of the light-focusing optical section 32, the light-focusing optical section 32 is moved from the position shown in FIG. 5A in the direction toward the optical fiber exit end 26a, for example, by 10 mm, and thereby increasing the imaging magnification to 1.25, so that the focused beam diameter D increases to 62.5 μm, but on the other hand, the distance from the principal point of the light-focusing optical section 32 to the light focusing point I increases to 112.5 mm, and the convergent angle β as a half angle decreases to 0.08 radians. If the focused beam diameter D is to be doubled by increasing the imaging magnification of the light-focusing optical section 32 to 2, the change in the distance from the light-focusing optical section 32 to the light focusing point I and the convergent angle β is further increased, which may concernedly affect the overall size of the laser processing apparatus 10 or make it difficult to perform an optimum laser processing that matches the kind of laser processing or the material, thickness, etc. of the workpiece.

By contrast, in the laser processing apparatus 10 including the transmissive optical member 44 (FIGS. 2 and 6A), which employs the configuration in which the entirety of the laser beam L is transmitted through the conical plate portion (or the focused-beam diameter increasing part) 46 of the transmissive optical member 44, instead of a configuration in which the imaging magnification of the light-focusing optical section 32 is increase (i.e., the light-focusing optical section 32 is moved along the optical axis 32a), it is possible to enlarge the focused beam diameter D without substantially changing the distance from the principal point of the light-focusing optical section 32 to the light focusing point I and the convergent angle β of the laser beam L. If it is desired not only to enlarge the focused beam diameter D to a desired size but also to change the convergent angle β to a desired value, it is only necessary to move the light-focusing optical section 32 along the optical axis 32a by an appropriate distance. Therefore, according to the laser processing apparatus 10, without affecting the overall size of the laser processing apparatus 10, it is possible to irradiate the workpiece W with the laser beam L having an optimum focused beam diameter D and convergent angle β, which are adapted to the kind of laser processing, or the material, thickness, etc. of the workpiece W. Since the transmissive optical member 44 is constructed to allow the laser beam L to be transmitted therethrough while keeping the diffusion angle α unchanged or constant before and after the transmission, it is possible to minimize an influence on a geometrical aberration during focusing, even in the configuration where the transmissive optical member 44 is disposed upstream of the light-focusing optical section 32 as seen in the traveling direction of the laser beam. Furthermore, since the transmissive optical member 44 is disposed upstream of the light-focusing optical section 32 as seen in the traveling direction of the laser beam, it is possible to prevent the geometrical aberration from increasing due to the provision of the transmissive optical member 44, in the configuration wherein the light-focusing optical section 32 is designed in advance to reduce the geometrical aberration. If the transmissive optical member 44 is provided between the plurality of optical lenses 36 of the light-focusing optical section 32, a geometrical aberration changes due to a change in the distance between the respective optical lenses 36, and it is required to redesign the light-focusing optical section 32. However, in the laser processing apparatus 10, there is no need to redesign the light-focusing optical section 32 due to the provision of the transmissive optical member 44.

Next, referring to FIGS. 7A to 7D, the laser beam focusing action of the laser processing apparatus 10 will be investigated when the transmissive optical member 44 in FIG. 6A is replaced by a transmissive optical member 44'. The transmissive optical member 44' is identical in structure to the transmissive optical member 44, except that the vertex angle θ of the conical plate portion 46 is different. In this configuration, the transmissive optical member 44' is arranged with the first surface 46b of its conical plate portion 46 facing the optical fiber 26, as shown in FIG. 7A. The laser beam L with the diffusion angle α, emitted from the exit end 26a of the optical fiber 26, is first transmitted through the transmissive optical member 44' and then focused through the light-focusing optical section (or a virtual lens) 32, and thereby the workpiece W is irradiated with the focused laser beam L with the convergent angle β. The vertex angle θ of the conical plate portion 46 of the transmissive optical member 44' is set at 174.28° (i.e., an inclination angle with respect to a plane perpendicular to the symmetry axis 46a is set at 2.86° (twice the inclination angle of the transmissive optical member 44)). The dimensions of the other parts are set analogously to those in the arrangement of FIG. 6A.

Figure 7B:
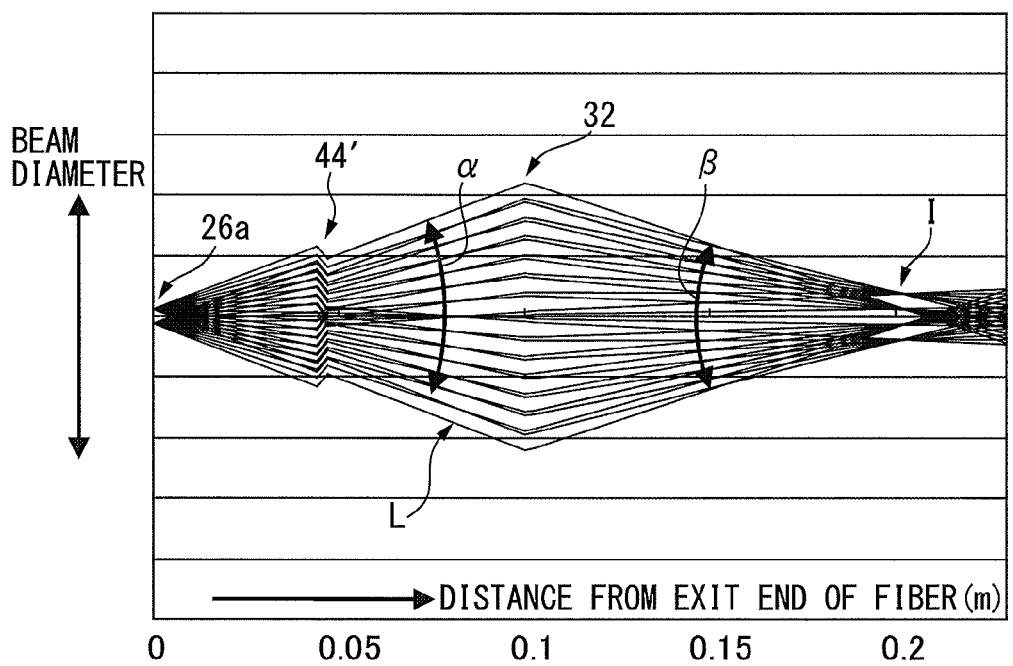
FIG. 7B is a diagram depicting some of light-ray paths in the laser processing apparatus of FIG. 7A.
Figure 7C:
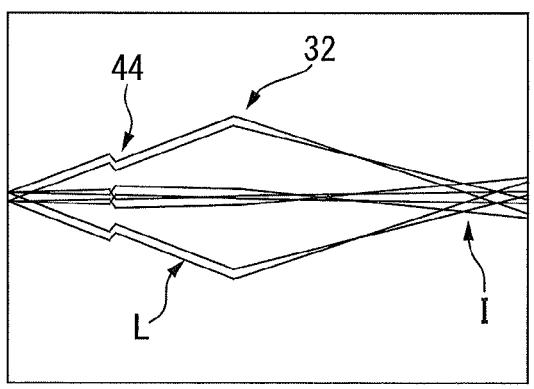
FIG. 7C is a diagram depicting light-ray paths optionally extracted from the light-ray paths shown in FIG. 7B.

FIG. 7B depicts the paths of some of the rays of the laser beam L obtained through simulation. For better understanding, FIG. 7C depicts light-ray paths optionally extracted from the light-ray paths shown in FIG. 7B. In FIGS. 7B and 7C, for example, the light ray emitted from the upper edge of the core end face of the optical fiber exit end 26a diffuses with the diffusion angle α and enters the conical plate portion 46 of the transmissive optical member 44', then is subjected to a refraction and parallel translation as shown in FIG. 4B according to the incident angle so as to be transmitted through the transmissive optical member 44' while maintaining the diffusion angle α, thereafter enters the light-focusing optical section 32 and is output from the light-focusing optical section 32 with the convergent angle β, and is focused (or imaged) respectively at the second top position and the bottom position in the illustrated light focusing point I. On the other hand, in FIGS. 7B and 7C, the light ray emitted from the lower edge of the core end face of the optical fiber exit end 26a diffuses with the diffusion angle α and enters the conical plate portion 46 of the transmissive optical member 44', then is subjected to a refraction and parallel translation as shown in FIG. 4B according to the incident angle so as to be transmitted through the transmissive optical member 44' while maintaining the diffusion angle α, thereafter enters the light-focusing optical section 32 and is output from the light-focusing optical section 32 with the convergent angle β, and is focused (or imaged) respectively at the second bottom position and the top position in the illustrated light focusing point I. When each light ray passes through the conical plate portion 46 of the transmissive optical member 44', an effect occurs as if the optical axis is displaced obliquely with respect to the light ray, and as a result, the light ray is focused separately at two positions in the light focusing point I, as illustrated.

Figure 7D:
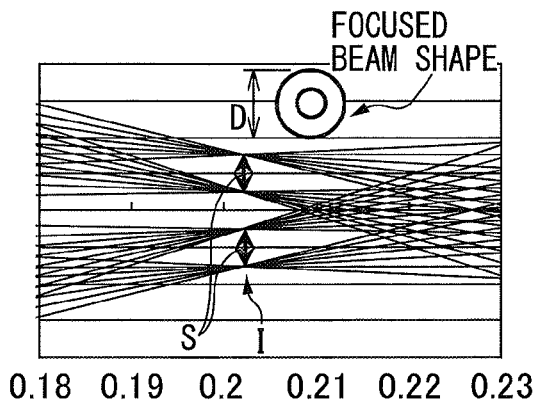
FIG. 7D is an enlarged view depicting the light-ray paths around a light focusing point.

Accordingly, all of the rays of the laser beam L emitted from the entire core end face of the optical fiber exit end 26a are focused in an annular region S having a focused beam diameter (outer diameter) D (the annular circle region corresponding to the perimeter shape of the core end face and having an outer diameter about three times as large as that of the core end face) at the light focusing point I, as shown in an enlarged view of FIG. 7D. Since the vertex angle θ of the conical plate portion 46 of the transmissive optical member 44' is smaller than the vertex angle θ of the conical plate portion 46 of the transmissive optical member 44 of FIG. 6A, it is presumed that the apparent displacement of the optical axis with respect to the light ray passing through the conical plate portion 46 of the transmissive optical member 44' increases, and as a result, a region where the laser beam L is not focused is formed at the center of the light focusing point I. When the light focusing point I is positioned on the surface of the workpiece W, the workpiece surface is irradiated with the laser beam as an annular spot with focused beam diameter (outer diameter) D. The results of the investigation showed that the distance from the principal point of the light-focusing optical section 32 to the light focusing point I of the laser beam L is determined as about 100 mm, the imaging magnification of the light-focusing optical section 32 is determined as about 1.0, the convergent angle β of the laser beam L is determined as about 0.1 radians as a half angle, and the focusing diameter (outer diameter) D at the light focusing point is determined as about 150 μm.

As can be understood from a comparison between the configuration of FIGS. 6A to 6D and the configuration of FIGS. 7A to 7D, the size of the enlarged focused beam diameter D to be achieved by the conical plate portion (focused-beam diameter increasing part) 46 of the transmissive optical member 44 can be changed by changing the structure of the conical plate portion 46. For example, the size of the focused beam diameter D can be changed by changing a desired one of various parameters such as the vertex angle θ, thickness t, refractive index, etc. of the conical plate portion 46. A plurality of processing heads 18, each equipped with a desired one of a plurality of transmissive optical members 44 employing different parameters, may be provided in advance, and the appropriate processing head 18 equipped with the transmissive optical member 44 that matches the kind of laser processing and the material, thickness, etc. of the workpiece W may be selected for use.

Alternatively, the laser processing apparatus 10 may be constructed so that the transmissive optical member 44 can be detachably mounted in a predetermined position within the processing head 18. For example, using a suitable mounting jig (not shown) at a position that does not interfere with the laser beam L, the transmissive optical member 44 may be detachably mounted to the inner wall of the housing 34. According to this configuration, a plurality of transmissive optical members 44, which differ in the vertex angle θ, thickness t, refractive index, etc. of the conical plate portion 46 employed, are provided in advance, and an appropriate one of the transmissive optical members 44 that matches the kind of laser processing and the material, thickness, etc. of the workpiece W is selected and mounted to the processing head 18; in this way, laser processing can be performed by irradiating the workpiece W with the laser beam L having an optimum focused beam diameter D and convergent angle β. Further, each time any one of the parameters defining the kind of laser processing and the material, thickness, etc. of the workpiece W is changed, laser processing can be performed by replacing the transmissive optical member 44 by an appropriate one.

When the transmissive optical member 44 is configured to be detachable from the processing head 18, the same laser processing apparatus 10 can be used by appropriately switching the configuration between the configuration that is not equipped with the transmissive optical member 44 (e.g., see FIG. 5A) and the configuration that is equipped with the transmissive optical member 44 (e.g., see FIG. 6A or 7A). In the configuration that is not equipped with the transmissive optical member 44, the laser beam L emitted from the optical fiber 26 is focused through the light-focusing optical section 32 designed to minimize geometrical aberrations, etc. and is emitted from the processing head 18 without degrading its original focusing performance. On the other hand, in the configuration that is equipped with the transmissive optical member 44, the laser beam L emitted from the optical fiber 26 is transmitted through the conical plate portion 46 inclined with respect to the symmetry axis 46a, thus somewhat degrading its original focusing performance, and the laser beam L in this condition is focused through the light-focusing optical section 32 and emitted from the processing head 18. Accordingly, by just switching the configuration between the configuration that is not equipped with the transmissive optical member 44 and the configuration that is equipped with the transmissive optical member 44, the laser processing apparatus 10 can perform optimum laser processing by responding not only to a change in the kind of laser processing or the material, thickness, etc. of the workpiece W but also to a change in the focusing performance of the laser beam L required for processing.

Figure 5D:
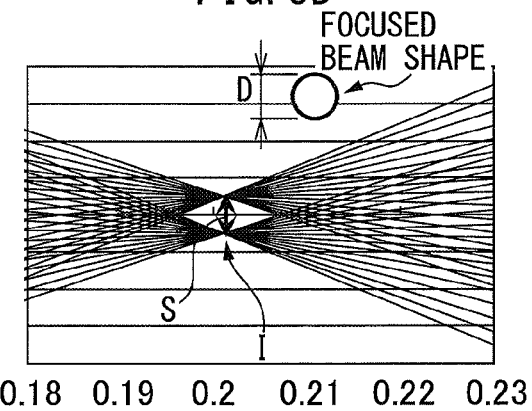
FIG. 5D is an enlarged view depicting the light-ray paths around a light focusing point.

In the laser processing apparatus 10 equipped with the detachable transmissive optical member 44, when performing laser processing that requires, for example, a small focused beam diameter D with high energy density, the transmissive optical member 44 is detached from the processing head 18, and when performing laser processing that requires a large focused beam diameter D with low energy density, the transmissive optical member 44 is attached to the processing head 18; in this way, laser processing can be performed with optimum focused beam diameter D. Specific examples will be described by dealing with the laser cutting of a plate-like workpiece W of mild steel: for example, in the case of a thick plate workpiece W about 16 mm in thickness, a transmissive optical member 44 having a conical plate portion 46 whose vertex angle θ is relatively small (the inclination angle is large) is attached to the processing head 18, and cutting is performed using a laser beam L with a focused beam diameter D of 150 µm (FIG. 7A); in the case of a workpiece W of medium thickness of about 6 mm, a transmissive optical member 44 having a conical plate portion 46 whose vertex angle θ is relatively large (the inclination angle is small) is attached to the processing head 18, and cutting is performed using a laser beam L with a focused beam diameter D of 100 µm (FIG. 6A); and in the case of a thin plate workpiece W about 1 mm in thickness, the transmissive optical member 44 is detached from the processing head 18, and cutting is performed using a laser beam L with a focused beam diameter D of 50 µm (FIG. 5D).

In the laser processing apparatus 10, the transmissive optical member 44 may be reversed side for side from the arrangement shown in FIGS. 6A and 7A, or may be disposed downstream of the light-focusing optical section 32 as seen in the traveling direction of the laser beam L. When the transmissive optical member 44 is reversed side for side from the arrangement shown in FIG. 6A or 7A, the distance over which the laser beam ray is translated by passing through the transmissive optical member 44 becomes smaller, as earlier described with reference to FIGS. 4A and 4B, and hence the focused beam diameter D slightly changes. Therefore, the mounting orientation of the transmissive optical member 44 can be selected in accordance with the kind of laser processing and the material, thickness, etc. of the workpiece W.

Figure 8:
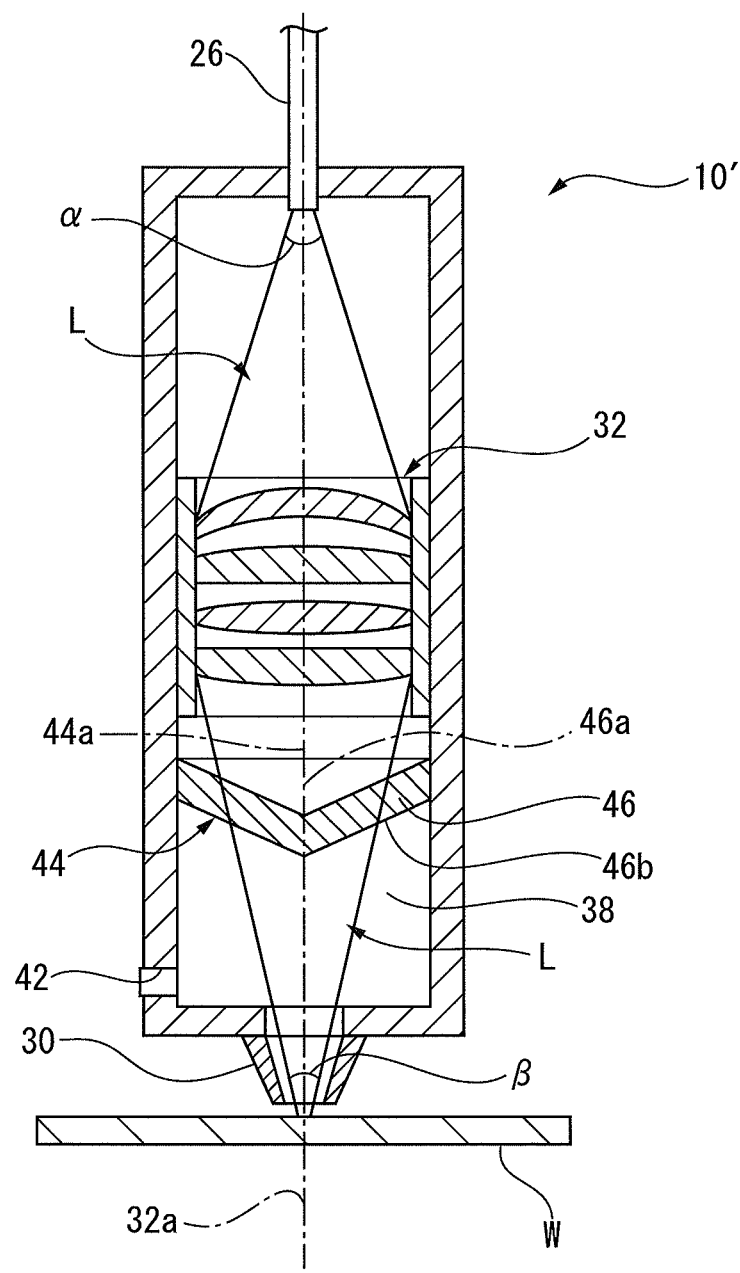
FIG. 8 is a sectional view schematically depicting a laser processing apparatus according to a modified example.

FIG. 8 depicts a laser processing apparatus 10' according to a modified example in which the transmissive optical member 44 (FIG. 3A) provided in the processing head 18 is disposed downstream (downward in the drawing) of the light-focusing optical section 32 as seen in the traveling direction of the laser beam L. In the laser processing apparatus 10', the transmissive optical member 44 is mounted within the housing 34 at a predetermined position between the light-focusing optical section 32 and the processing nozzle 30 with the center axis line 44a thereof coinciding with the optical axis 32a of the light-focusing optical section 32. The transmissive optical member 44 allows the laser beam L focused through the light-focusing optical section 32 to be transmitted therethrough while keeping the convergent angle β of the laser beam L unchanged before and after the transmission. Further, in the laser processing apparatus 10', the transmissive optical member 44 is arranged with the first surface 46b of its conical plate portion 46 facing the nozzle 30 and with the symmetry axis 46a of the conical plate portion 46 coinciding with the optical axis 32a of the light-focusing optical section 32. Otherwise, the configuration of the laser processing apparatus 10' is the same as that of the laser processing apparatus 10 shown in FIG. 2.

The laser processing apparatus 10' incorporating the transmissive optical member 44 as shown in FIG. 8 offers a particularly advantageous effect equivalent to that of the laser processing apparatus 10 shown in FIG. 2. Especially, in the case of the laser processing apparatus 10', the focused beam diameter can be enlarged by deflecting and translating the laser beam L as shown in FIG. 4B in accordance with the incident angle on the conical plate portion 46 of the transmissive optical member 44 after the laser beam L has been focused with the convergent angle β through the light-focusing optical section 32. Accordingly, compared with the configuration in which the transmissive optical member 44 is omitted (e.g., see FIG. 5A), the amount of change of the convergent angle β can be reduced to zero.

The laser processing apparatus 10' may be constructed so that the transmissive optical member 44 can be detachably mounted in a predetermined position within the processing head 18. In that case, as in the case of the laser processing apparatus 10 shown in FIG. 2, laser processing can be performed by irradiating the workpiece W with the laser beam L having an optimum focused beam diameter D and convergent angle β, by switching to the configuration that is not equipped with the transmissive optical member 44 or appropriately selecting the optimum transmissive optical member 44 in accordance with a change in the kind of laser processing or the material, thickness, etc. of the workpiece W or in the focusing performance of the laser beam L required for processing. Furthermore, since the transmissive optical member 44 that can be detachably mounted between the light-focusing optical section 32 and the processing nozzle 30 can serve the function of preventing contamination of the light-focusing optical section 32 as with the bulkhead 40 (FIG. 2), the number of components can be reduced by omitting the bulkhead 40.

Figure 9:
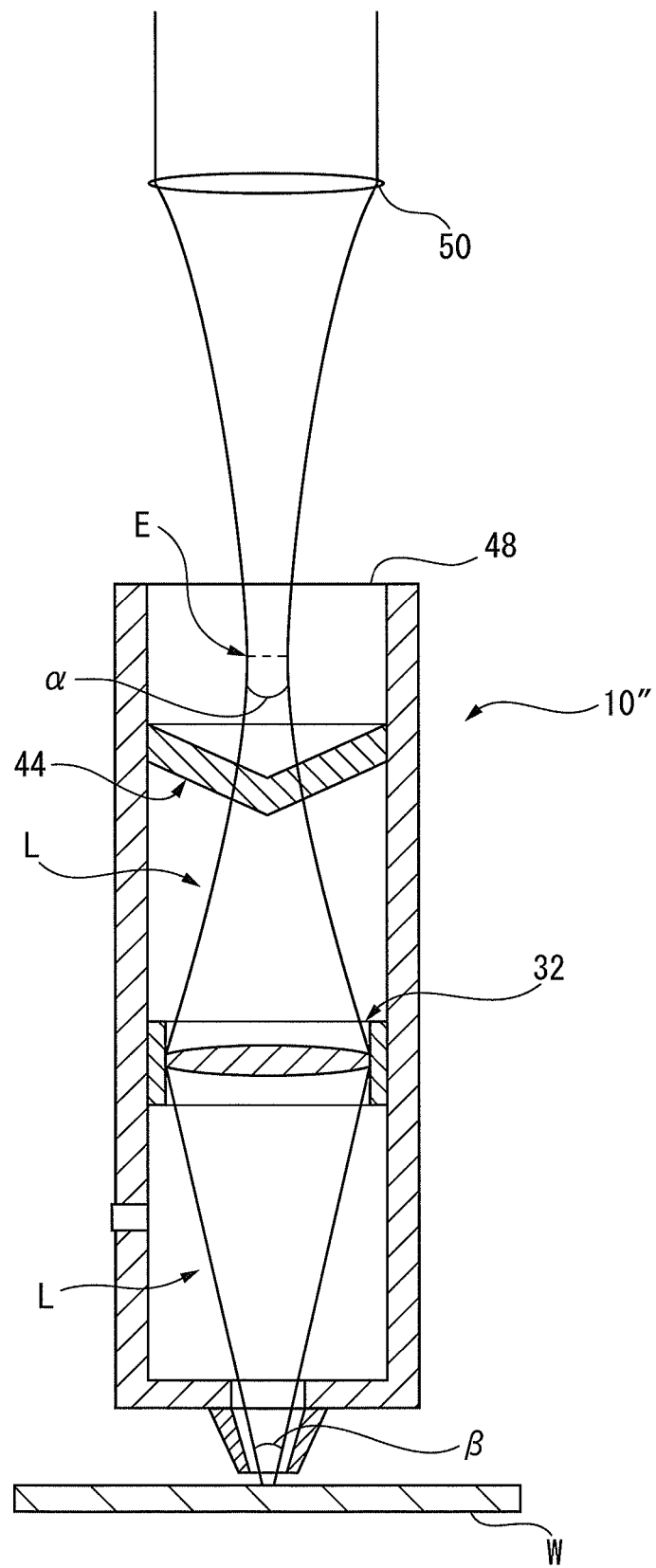
FIG. 9 is a sectional view schematically depicting a laser processing apparatus according to another modified example.

FIG. 9 depicts a laser processing apparatus 10" according to another modified example in which the laser beam L generated by an oscillator such as a $CO_2$ laser oscillator in the laser source 14 (FIG. 1) and transmitted through the transmitting means 20 (FIG. 1) constructed using a light-guiding tube, reflecting mirror, etc. is introduced into the processing head 18. In the laser processing apparatus 10", the housing 34 of the processing head 18 has an opening 48 at its rear end (upper end in the drawing), and a condensing lens 50 for condensing the laser beam L propagated through the air is disposed behind it (above it in the drawing). The laser beam L passing through the condensing lens 50 is concentrated to form a beam waist E, and enters the processing head 18 as the laser beam L having a diffusion angle α on the downstream side of the beam waist E as seen in the traveling direction of the laser beam. Otherwise, the configuration of the laser processing apparatus 10" is the same as that of the laser processing apparatus 10 shown in FIG. 2.

The laser processing apparatus 10" incorporating the transmissive optical member 44 as shown in FIG. 9 also offers a particularly advantageous effect equivalent to that of the laser processing apparatus 10 shown in FIG. 2. In the laser processing apparatus 10″ also, the transmissive optical member 44 may be detachably mounted in a predetermined position either upstream or downstream of the light-focusing optical section 32 as seen in the traveling direction of the laser beam. In that case, as in the case of the laser processing apparatus 10 shown in FIG. 2, laser processing can be performed by irradiating the workpiece W with the laser beam L having an optimum focused beam diameter D and convergent angle β, by switching to the configuration that is not equipped with the transmissive optical member 44 or appropriately selecting the optimum transmissive optical member 44 in accordance with a change in the kind of laser processing or the material, thickness, etc. of the workpiece W or in the focusing performance of the laser beam L required for processing.

The laser processing apparatus according to the present invention may be configured so as to be able to incorporate any one of various transmissive optical members that differ in shape or structure from the transmissive optical member 44 described above. The configuration of a transmissive optical member 52 that differs in shape from the transmissive optical member 44 and the configuration of a laser processing apparatus 54 according to an alternative embodiment incorporating the transmissive optical member 52 will be described below with reference to FIGS. 10A to 15C. The laser processing apparatus 54 incorporating the transmissive optical member 52 may be constructed to have the same configuration as the laser processing apparatus 10 shown in FIGS. 2 and 5A to 7D, the laser processing apparatus 10' shown in FIG. 8, or the laser processing apparatus 10″ shown in FIG. 9, except that the transmissive optical member 44 is replaced by the transmissive optical member 52. In the following description, components corresponding to those in the laser processing apparatus 10, 10', or 10″ are designated by like reference numerals, and such components will not be further described herein.

Figure 10A:
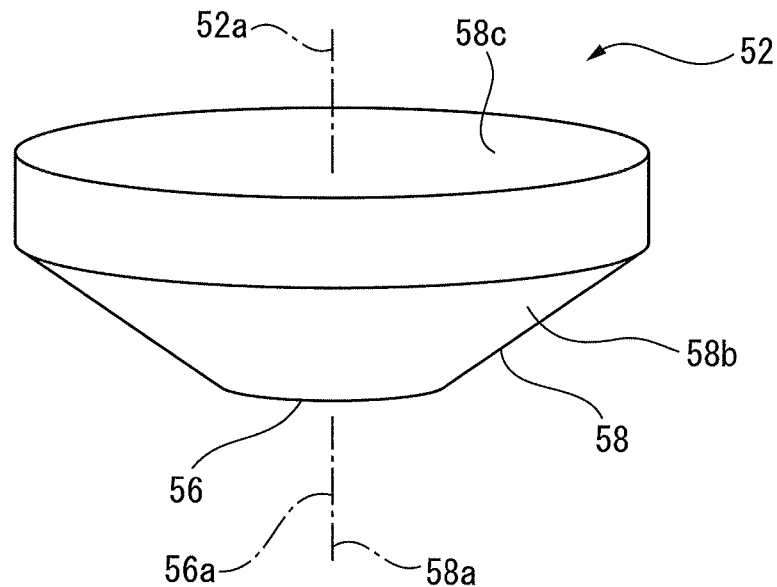
FIG. 10A is a perspective view of a transmissive optical member of a laser processing apparatus according to another embodiment.
Figure 10B:
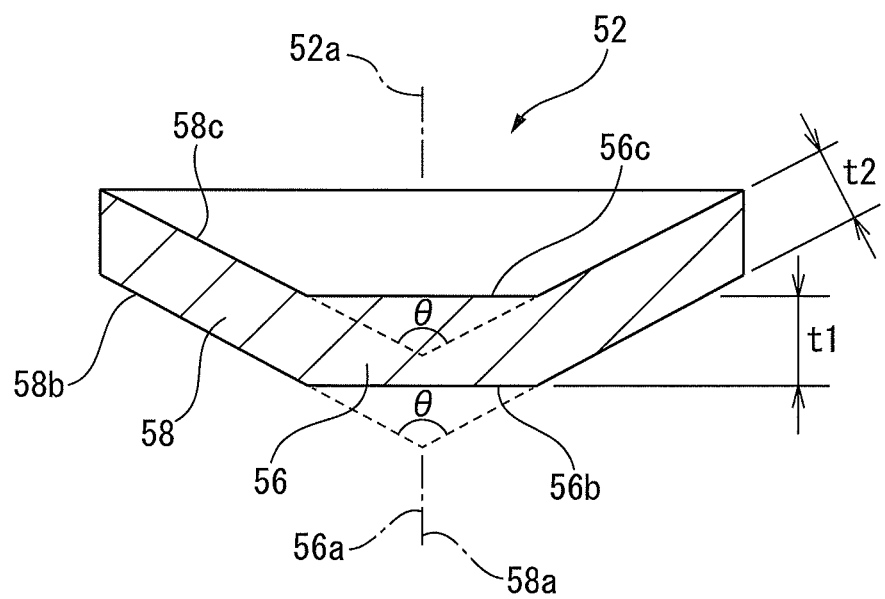
FIG. 10B is a sectional view depicting the transmissive optical member of FIG. 10A.

As shown in FIGS. 10A and 10B, the transmissive optical member 52 includes a center flat plate portion 56 of uniform thickness formed in a rotationally symmetrical shape and perpendicular to its symmetry axis 56a, and an annular conical plate portion 58 of uniform thickness formed in a rotationally symmetrical shape and inclined with respect to its symmetry axis 58a. More specifically, the center flat plate portion 56 includes a first surface 56b which is a circular flat surface, and a second surface 56c which is a circular flat surface located on the side opposite from the first surface 56b and has the same shape and dimensions as the first surface 56b. The first and second surfaces 56b and 56c extend in parallel with each other, and the dimension (thickness) t1 of the center flat plate portion 56 measured in directions perpendicular to the first and second surfaces 56b and 56c is uniform across the entire portion. The annular conical plate portion 58 has a first surface 58b which is a truncated cone-shaped convex surface, and a second surface 58c which is a truncated cone-shaped concave surface located on the side opposite from the first surface 58b and which has the same shape and dimensions as the first surface 58b and has an imaginary cone vertex angle θ equal to the vertex angle θ of an imaginary cone formed by extending the first surface 58b. The first and second surfaces 58b and 58c extend in parallel with each other, and the dimension (thickness) t2 of the conical plate portion 58 measured in directions perpendicular to the first and second surfaces 58b and 58c is uniform across the entire portion. The thickness t2 of the conical plate portion 58 may be the same as or different from the thickness t1 of the center flat plate portion 56. The symmetry axis 56a of the center flat plate portion 56 and the symmetry axis 58a of the conical plate portion 58 coincide with each other and coincide with the center axis line 52a of the transmissive optical member 52.

The transmissive optical member 52 can be formed from a material, such as quartz glass or BK7, that does not or is least likely to absorb or scatter the laser beam L. Further, the first and second surfaces 56b, 58b and 56c, 58c of the transmissive optical member 52 can be treated with an antireflective coating formed from a multilayered optical film. This structure allows the laser beam L to be transmitted through the transmissive optical member 52 without causing its energy to decay. Due to the difference in refractive index between the transmissive optical member 52 and the ambient air, the laser beam L changes direction according to its incident angle when entering the transmissive optical member 52 and again changes direction when exiting the transmissive optical member 52. This phenomenon will be described with reference to FIGS. 11A to 11D. It is assumed that the transmissive optical member 52 shown in FIGS. 11A to 11D, like the transmissive optical member 44 shown in FIG. 2, is mounted within the housing 34 of the processing head 18 at a predetermined position (FIG. 2) between the exit end 26a of the optical fiber 26 and the light-focusing optical section 32 with the center axis line 52a thereof coinciding with the optical axis 32a of the light-focusing optical section 32.

Figure 11A:
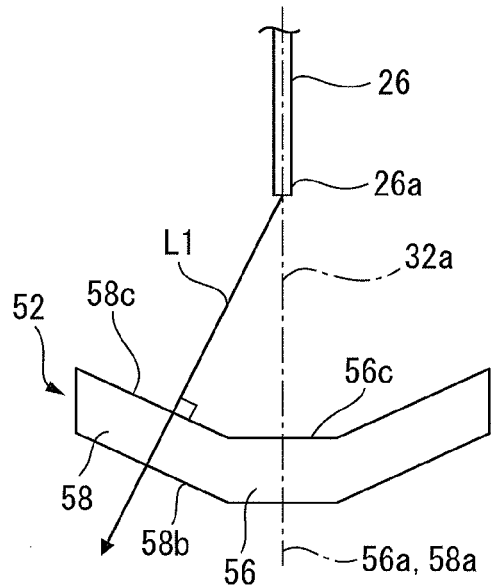
FIG. 11A is a conceptual diagram for explaining the laser beam transmitting action of the transmissive optical member of FIG. 10A, in a configuration wherein the transmissive optical member is oriented in one direction.
Figure 11B:
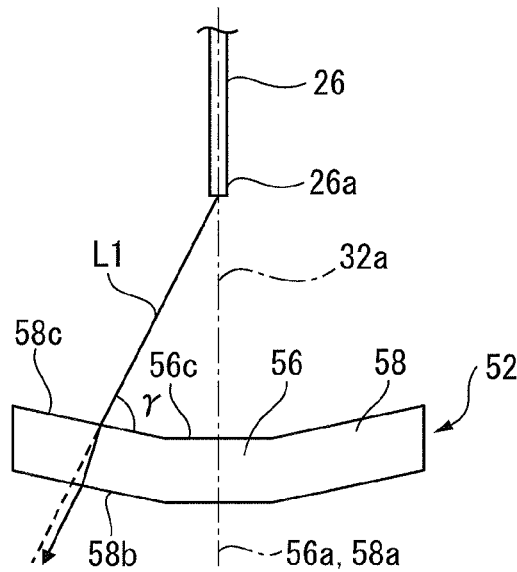
FIG. 11B is a diagram depicting a configuration in which a differently shaped transmissive optical member is oriented in one direction.
Figure 11C:
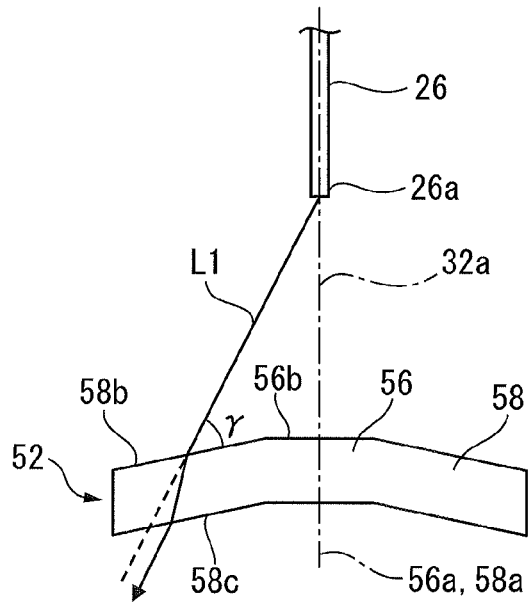
FIG. 11C is a diagram depicting a configuration in which the transmissive optical member of FIG. 11B is oriented in an opposite direction.
Figure 11D:
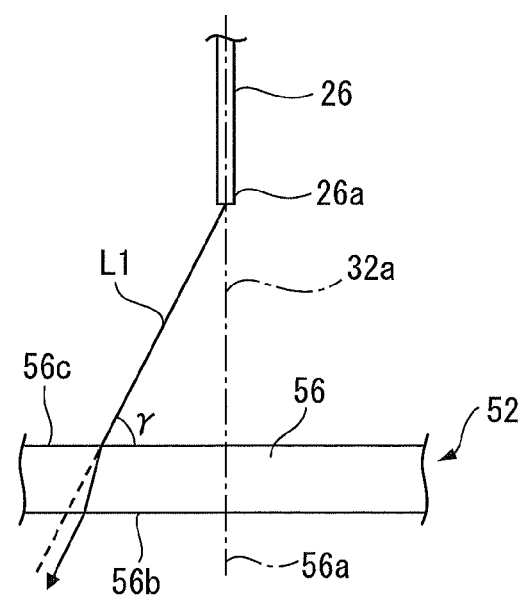
FIG. 11D is a diagram depicting a light-ray path when a light ray is transmitted through the center portion of the transmissive optical member.

As shown conceptually in FIGS. 11A to 11D, the transmissive optical member 52 is arranged within the housing 34 (FIG. 2) of the processing head 18 so that the symmetry axis 56a of the center flat plate portion 56 and the symmetry axis 58a of the conical plate portion 58 coincide with the optical axis 32a of the light-focusing optical section 32 (FIG. 2). In FIGS. 11A, 11B and 11D, the transmissive optical member 52 is arranged with the second surfaces 56c and 58c of the center flat plate portion 56 and conical plate portion 58 facing the optical fiber 26. In FIG. 11C, the transmissive optical member 52 is arranged with the first surfaces 56b and 58b of the center flat plate portion 56 and conical plate portion 58 facing the optical fiber 26. FIG. 11A depicts the transmissive optical member 52 in which the vertex angle θ (FIG. 10B) of the conical plate portion 58 is small (the inclination angle is large), and FIGS. 11B and 11C each depict the transmissive optical member 52 in which the vertex angle θ of the conical plate portion 58 is large (the inclination angle is small). FIG. 11D depicts the condition in which the transmissive optical member 52 is located at a position closer to the optical fiber 26 and the same light ray as that shown in FIGS. 11A to 11C is transmitted through the center flat plate portion 56.

Here, attention is paid to one light ray L1 in the light flux of the laser beam L. In the configuration of FIG. 11A, it is assumed that the light ray L1 is input vertically to the second surface 58c of the conical plate portion 58. In this case, the light ray L1 enters the conical plate portion 58 without being deflected at the second surface 58c, and exits the conical plate portion 58 without being deflected at the first surface 58b; therefore, the light ray generally passes straight through the conical plate portion 58 without undergoing deflection or translation.

In the configuration of FIG. 11B in which the vertex angle of the conical plate portion 58 is larger than that in the configuration of FIG. 11A, the same light ray L1 as that in FIG. 11A is input to the second surface 58c of the conical plate portion 58 with an acute incident angle γ. When entering the transmissive optical member 52, the light ray L1 is deflected in a direction determined by the difference in refractive index and the incident angle γ, and when exiting the transmissive optical member 52, the light ray L1 is again deflected in a direction determined by the difference in refractive index and the output angle. Since the second surface (the input face) 58c and the first surface (the output face) 58b are parallel with each other, the output angle is equal to the incident angle γ, and therefore, the traveling direction of the light ray L1 is the same when exiting the transmissive optical member 52 as when entering the transmissive optical member 52. However, after undergoing the deflection twice, the path of the light ray L1 exiting the transmissive optical member 52 becomes translated in a predetermined direction (the direction toward the optical axis 32a in the drawing) with respect to the path of the light ray L1 (indicated by dashed line) entering the transmissive optical member 52. The distance over which the light ray L1 is translated is determined by such factors as the thickness t2 (FIG. 10B) of the conical plate portion 58 of the transmissive optical member 52, the vertex angle θ (FIG. 10B), the difference in refractive index between the transmissive optical member 52 and the ambient air, and the incident angle γ on the conical plate portion 58. Of the rays of the laser beam L emitted from the exit end 26a of the optical fiber 26, all the light rays that pass through the conical plate portion 58 undergo the same phenomenon, and as a result, the transmissive optical member 52 allows the laser beam L to be transmitted therethrough while keeping the diffusion angle α of the laser beam L (FIG. 2) unchanged before and after the transmission. Further, as will be described later, when each light ray passes through the conical plate portion 58 of the transmissive optical member 52, an effect occurs as if the optical axis is displaced obliquely with respect to the light ray, and as a result, the focused beam diameter becomes enlarged when all the light rays are focused at the light focusing point.

In the arrangement of FIG. 11C in which the transmissive optical member 52 is reversed side for side from the arrangement shown in FIG. 11B, the path of the light ray L1 exiting the transmissive optical member 52 can likewise be translated in a predetermined direction (the direction toward the optical axis 32a in the drawing) with respect to the path of the light ray L1 (indicated by dashed line) entering the transmissive optical member 52. Accordingly, in this configuration also, the transmissive optical member 52 allows the laser beam L to be transmitted therethrough while keeping the diffusion angle α of the laser beam L (FIG. 2) unchanged before and after the transmission. However, in this configuration, the same light ray L1 as the light ray L1 of FIG. 11B is input to the first surface 58b of the conical plate portion 58 with an incident angle γ smaller than the incident angle γ of FIG. 11B. As a result, the distance over which the light ray L1 is translated in the configuration of FIG. 11C is greater than the distance over which the light ray L1 is translated in the configuration of FIG. 11B.

As shown in FIG. 11D, when the transmissive optical member 52 is located at a position closer to the optical fiber 26 than the position shown in FIGS. 11A to 11C, and the same light ray L1 is transmitted through the center flat plate portion 56, the path of the light ray L1 exiting the transmissive optical member 52 is likewise translated in a predetermined direction (the direction toward the optical axis 32a in the drawing) with respect to the path of the light ray L1 (indicated by dashed line) entering the transmissive optical member 52. In this case, the incident angle γ of the light ray L1 input to the center flat plate portion 56 is smaller than the incident angle γ shown in FIG. 11B but larger than the incident angle γ shown in FIG. 11C. As a result, the distance over which the laser beam ray L1 is translated during the transmission is greater than the distance over which the laser beam ray L1 is translated during the transmission in FIG. 11B but smaller than the distance over which the laser beam ray L1 is translated during the transmission in FIG. 11C. When the light ray passes through the center flat plate portion 56 of the transmissive optical member 52, an effect as if the optical axis is displaced obliquely with respect to the light ray does not occur. Since the optical axis is not displaced, the focused beam diameter formed at the light focusing point when all the light rays are passed through the transmissive optical member 52 is the same as the focused beam diameter that would be formed if the light rays were not passed through the transmissive optical member 52.

With reference to the configuration of FIG. 11D in which the light ray L1 passes through the center flat plate portion 56, when the same light ray L1 is passed through the conical plate portion 58 in FIG. 11B, the path of the light ray L1 exiting the conical plate portion 58 is translated with respect to the path of the light ray L1 in FIG. 11D in a direction away from the optical axis 32a, and when the same light ray L1 is passed through the conical plate portion 58 in FIG. 11C, the path of the light ray L1 exiting the conical plate portion 58 is translated with respect to the path of the light ray L1 in FIG. 11D in a direction toward the optical axis 32a. As can be deduced from the above description, if the light ray L1 were passed through a conical plate portion 58 having a smaller vertex angle (i.e., having a larger inclination angle) than the conical plate portion 58 of FIG. 11A, the incident angle γ of the light ray L1 would be an obtuse angle, so that the path of the light ray L1 exiting the conical plate portion 58 would be translated in a direction away from the optical axis 32a with respect to the path of the light ray L1 entering the conical plate portion 58.

The conical plate portion 58 of the transmissive optical member 52 constitutes the focused-beam diameter increasing part which increases the focused beam diameter of the laser beam L. The laser beam focusing action of the laser processing apparatus 54 incorporating the transmissive optical member 52 will be described below with reference to FIGS. 12A to 15C. In FIGS. 12A, 13A, 14A and 15A, the entire construction of the laser processing apparatus 54 is shown, but for simplicity, the housing 34, processing nozzle 30, and bulkhead 40 shown in FIG. 2 are omitted from illustration, and the light-focusing optical section 32 is replaced by a single virtual lens.

Figure 12A:
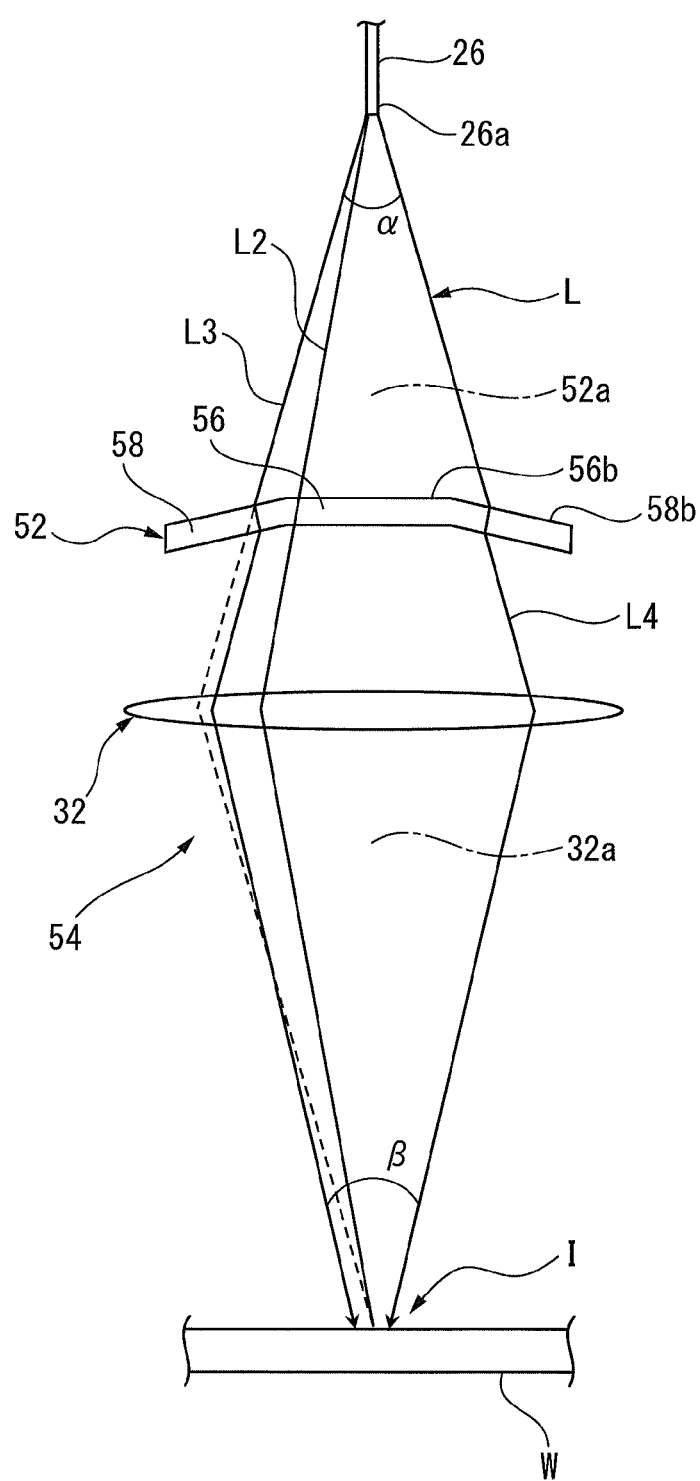
FIG. 12A is a diagram for explaining the laser beam focusing action of a laser processing apparatus provided with the transmissive optical member of FIG. 10A, and depicting some typical light-ray paths.

As shown in FIG. 12A, the transmissive optical member 52 incorporated in the laser processing apparatus 54 is provided within the processing head 18 (FIG. 2), and is disposed upstream (upward in the drawing) of the light-focusing optical section 32 as seen in the traveling direction of the laser beam L. The transmissive optical member 52 is mounted within the housing 34 (FIG. 2) at a predetermined position between the exit end 26a of the optical fiber 26 and the light-focusing optical section 32 with the center axis line 52a thereof coinciding with the optical axis 32a of the light-focusing optical section 32. Further, the transmissive optical member 52 is located at a position where the center portion of the light flux of the laser beam L emitted from the exit end 26a of the optical fiber 26 is transmitted through the center flat plate portion 56 and the remaining outer portion through the conical plate portion 58. The transmissive optical member 52 is arranged with the first surfaces 56b and 58b of the center flat plate portion 56 and conical plate portion 58 facing the optical fiber 26. As described with reference to FIGS. 11A to 11D, the transmissive optical member 52 allows the laser beam L emitted from the exit end 26a of the optical fiber 26 to be transmitted therethrough while keeping the diffusion angle α of the laser beam L unchanged before and after the transmission.

FIG. 12A depicts the typical paths of three light rays L2, L3 and L4 in the light flux of the laser beam L emitted from the optical fiber exit end 26a. The light ray L2 emitted from the center region of the optical fiber exit end 26a is transmitted through the center flat plate portion 56 of the transmissive optical member 52, and its path is translated during the transmission through the transmissive optical member 52 (FIG. 12B), as earlier described with reference to FIG. 11D. However, since this light ray L2 is not subjected to an effect as if the optical axis is displaced obliquely, the light ray L2 passed through the light-focusing optical section 32 is focused onto the position within the light focusing point I that corresponds to the emitting position at the optical fiber exit end 26a. On the other hand, the light ray L3 emitted from a region near an outer edge is transmitted through the conical plate portion 58 of the transmissive optical member 52, and its path is translated during the transmission through the conical plate portion 58 (FIG. 12C) by a greater distance than the path of the light ray L2, as earlier described with reference to FIG. 11C. During the transmission through the conical plate portion 58, the light ray L3 is subjected to an effect as if the optical axis is displaced obliquely, and as a result, the light ray L3 is focused onto a position within the light focusing point I that is displaced in a direction away from the optical axis 32a relative to the emitting position at the optical fiber exit end 26a. The light ray L4 located on the opposite side of the optical axis 32a from the light ray L3 is transmitted through the conical plate portion 58 of the transmissive optical member 52 along the path axially symmetric to the path of the light ray L3, and is focused onto a position within the light focusing point I that is displaced in a direction away from the optical axis 32a and opposite to the direction in which the light ray L3 is displaced. In this way, the focused beam diameter at the light focusing point I is enlarged compared with the minimum beam diameter at the optical fiber exit end 26a.

As described above, the group of light rays emitted from the center region of the optical fiber exit end 26a and transmitted through the center flat plate portion 56 of the transmissive optical member 52 is focused onto the center region within the light focusing point I. On the other hand, the light rays emitted from the outer peripheral region of the optical fiber exit end 26a and transmitted through the conical plate portion 58 of the transmissive optical member 52 are focused onto the outer peripheral region of the light focusing point I. Accordingly, the size of the enlarged focused beam diameter to be achieved by the conical plate portion (focused-beam diameter increasing part) 58 of the transmissive optical member 52 can be changed by changing the configuration of the conical plate portion 58. For example, the size of the focused beam diameter can be changed by changing a desired one of various parameters such as the vertex angle θ, thickness t2, refractive index, inner diameter (outer diameter of the center flat plate portion 56), etc. of the conical plate portion 58. Similarly, the ratio between the illuminating intensity of the light rays to be focused on the center region of the light focusing point I and the illuminating intensity of the light rays to be focused on the outer peripheral region of the light focusing point I can be adjusted by changing a desired parameter of the conical plate portion 58. A plurality of processing heads 18 (FIG. 2), each equipped with a desired one of a plurality of transmissive optical members 52 employing different parameters, may be provided in advance, and the appropriate processing head 18 equipped with the transmissive optical member 52 that matches the kind of laser processing and the material, thickness, etc. of the workpiece W may be selected for use.

The laser processing apparatus 54 equipped with the transmissive optical member 52 incorporating the conical plate portion (focused-beam diameter increasing part) 58 offers a particularly advantageous effect equivalent to that of the laser processing apparatus 10 shown in FIG. 2. Furthermore, the laser processing apparatus 54 equipped with the transmissive optical member 52 can change the size of the focused beam diameter or adjust the ratio in illumination intensity between the center region and the outer peripheral region of the light focusing point I by changing, instead of the desired parameter of the conical plate portion 58, the position of the transmissive optical member 52 to be located between the optical fiber 26 and the light-focusing optical section 32 along the optical axis 32a. Next, referring to FIGS. 13A to 15C, the laser beam focusing action of the laser processing apparatus 54 will be investigated by variously changing the position of the transmissive optical member 52 along the optical axis.

Figure 13A:
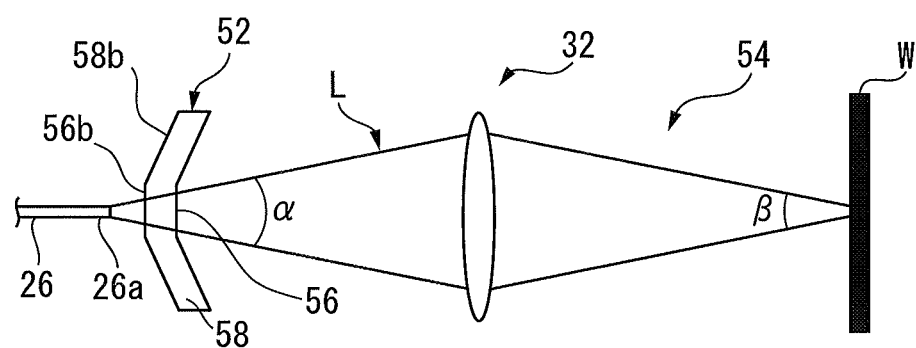
FIG. 13A is a component layout view for explaining the laser beam focusing action of a laser processing apparatus provided with the transmissive optical member of FIG. 10A disposed at a desired position.
Figure 13B:
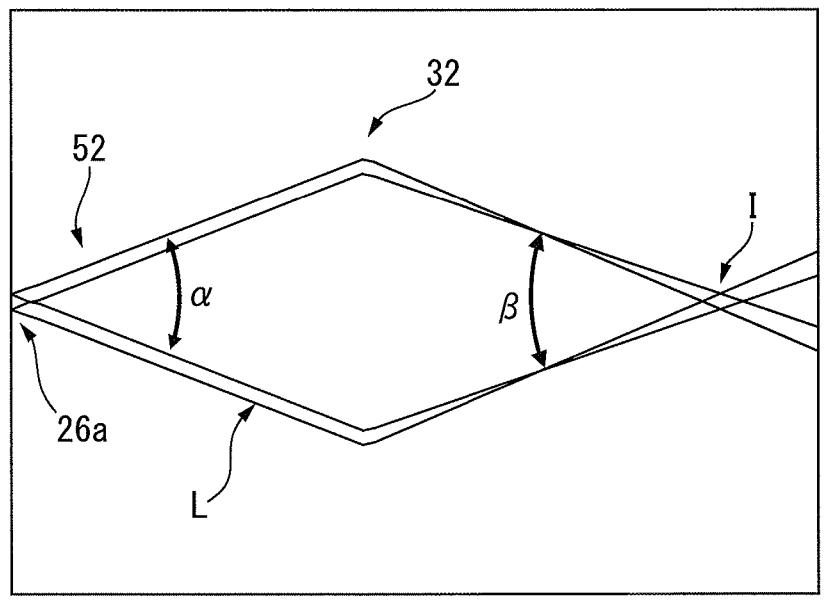
FIG. 13B is a diagram depicting optionally extracted light-ray paths in the laser processing apparatus of FIG. 13A.
Figure 13C:
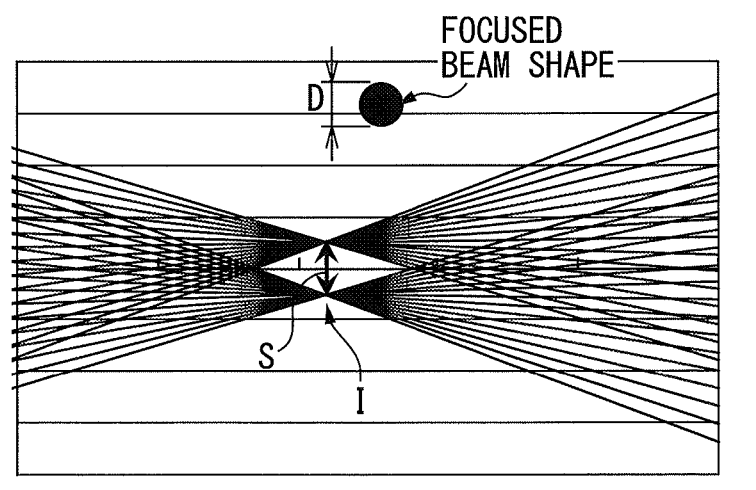
FIG. 13C is an enlarged view depicting light-ray paths around a light focusing point.

First, referring to FIGS. 13A to 13C, the laser beam focusing action will be investigated when the transmissive optical member 52 is mounted in close proximity to the exit end 26a of the optical fiber 26. In the illustrated configuration, the transmissive optical member 52 is located at a position where all of the laser beam L emitted from the exit end 26a of the optical fiber 26 is transmitted through the center flat plate portion 56. Further, the transmissive optical member 52 is arranged with the first surfaces 56b and 58b of the center flat plate portion 56 and conical plate portion 58 facing the optical fiber 26. The laser beam L emitted from the optical fiber exit end 26a with the diffusion angle α is first transmitted through the center flat plate portion 56 and then focused through the light-focusing optical section (virtual lens) 32, and the workpiece W is irradiated with the focused laser beam L with the convergent angle β. The dimensions of the various parts are set as follows: the core diameter of the optical fiber 26 is 50 μm, the diffusion angle α of the laser beam L is 0.1 radians as a half angle, the distance from the core end face of the exit end 26a of the optical fiber 26 to the principal point of the light-focusing optical section 32 is 100 mm, and the focal length of the light-focusing optical section 32 is 50 mm. Further, the thickness t1 (FIG. 10B) of the center flat plate portion 56 of the transmissive optical member 52 is 3 mm, the vertex angle θ (FIG. 10B) of the conical plate portion 58 is 171.98° (i.e., the inclination angle with respect to the plane perpendicular to the symmetry axis 58a is 4.01°), the thickness t2 is 3 mm, and the distance from the core end face of the optical fiber exit end 26a to the first surface 56a of the center flat plat portion 56 is 5 mm.

Figure 12B:
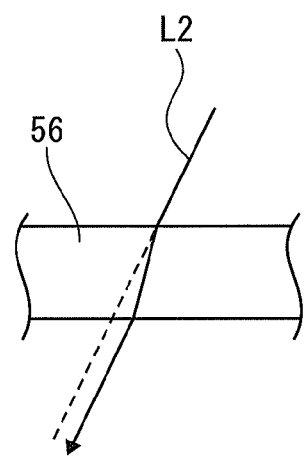
FIG. 12B is an enlarged view depicting one light-ray path in the laser processing apparatus of FIG. 12A.

FIG. 13B depicts light-ray paths optionally extracted from the paths of some of the rays of the laser beam L obtained through simulation. As illustrated in FIG. 13B, for example, the light ray emitted from the upper edge of the core end face of the optical fiber exit end 26a is diffused with the diffusion angle α and input to the center flat plate portion 56 of the transmissive optical member 52, and the light ray is subjected to a refraction and parallel translation as shown in FIG. 12B according to its incident angle and transmitted through the transmissive optical member 52 while maintaining the diffusion angle α; the light ray then enters the light-focusing optical section 32, is output from the light-focusing optical section 32 with the convergent angle β, and is focused at the lower end position in the drawing at the light focusing point I. On the other hand, as illustrated in FIG. 13B, the light ray emitted from the lower edge of the core end face of the optical fiber exit end 26a is diffused with the diffusion angle α and input to the center flat plate portion 56 of the transmissive optical member 52, and the light ray is subjected to a refraction and parallel translation as shown in FIG. 12B according to its incident angle and transmitted through the transmissive optical member 52 while maintaining the diffusion angle α; the light ray then enters the light-focusing optical section 32, is output from the light-focusing optical section 32 with the convergent angle β, and is focused at the upper end position in the drawing at the light focusing point I.

When each light ray passes through the center flat plate portion 56 of the transmissive optical member 52, the light ray is not subjected to the effect as if the optical axis is displaced obliquely with respect to the light ray, as earlier described. Accordingly, the light rays are focused at the light focusing point I in substantially the same manner as described with reference to FIGS. 5A to 5D for the configuration in which the transmissive optical member 44 is removed. That is, all the rays of the laser beam L emitted from the entire core end face of the optical fiber exit end 26a are focused on a circular region S of focused beam diameter D (the region corresponding to the perimeter shape and diameter of the core end face) at the light focusing point I, as shown in an enlarged view of FIG. 13C. When the light focusing point I is positioned on the surface of the workpiece W, the workpiece surface is irradiated with the laser beam as a circular spot with focused beam diameter D. The results of the investigation showed that the distance from the principal point of the light-focusing optical section 32 to the light focusing point I of the laser beam L is determined as 100 mm, the imaging magnification of the light-focusing optical section 32 is determined as 1.0, the convergent angle β of the laser beam L is determined as 0.1 radians as a half angle, and the focused beam diameter at the light focusing point is determined as about 50 μm.

Figure 14A:
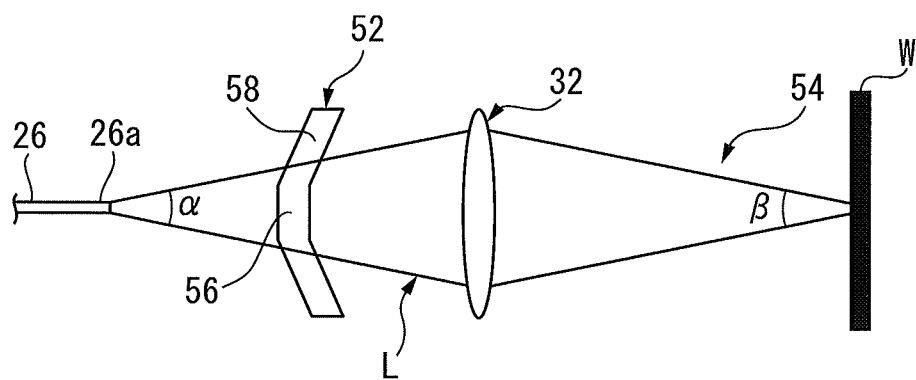
FIG. 14A is a component layout view for explaining the laser beam focusing action of a laser processing apparatus provided with the transmissive optical member of FIG. 10A disposed at another desired position.
Figure 14B:
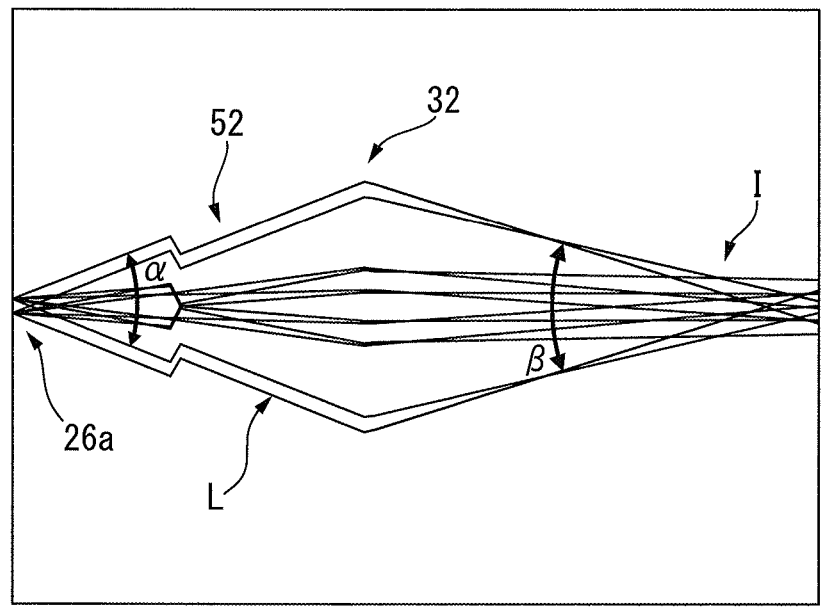
FIG. 14B is a diagram depicting optionally extracted light-ray paths in the laser processing apparatus of FIG. 14A.
Figure 14C:
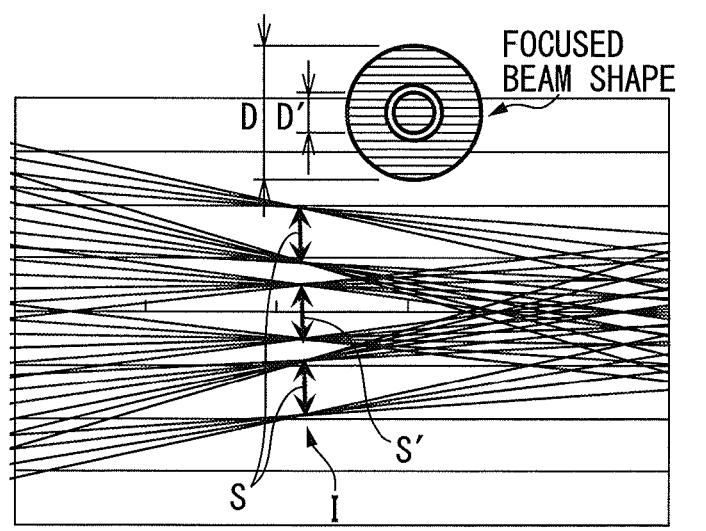
FIG. 14C is a diagram depicting light-ray paths around a light focusing point.

Next, referring to FIGS. 14A to 14C, the laser beam focusing action will be investigated when the transmissive optical member 52 is located at a position closer to the light-focusing optical section 32 than the position shown in FIG. 13A. In this configuration, the transmissive optical member 52 is located at a position where a portion of the laser beam L emitted from the exit end 26a of the optical fiber 26 is transmitted through the center flat plate portion 56 and the remaining portion through the conical plate portion 58, as shown in FIG. 14A. More specifically, the transmissive optical member 52 is positioned so that the first surface 56a of the center flat plate portion 56 is located at a distance of 45 mm from the core end face of the optical fiber exit end 26a. Otherwise, the configuration is the same as that shown in FIG. 13A.

Figure 12C:
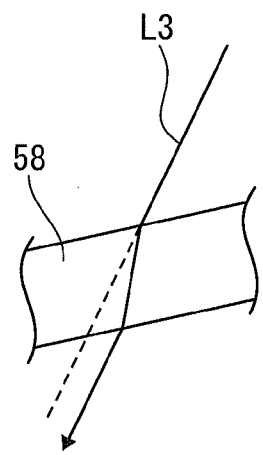
FIG. 12C is an enlarged view depicting another light-ray path in the laser processing apparatus of FIG. 12A.

FIG. 14B depicts light-ray paths optionally extracted from the paths of some of the rays of the laser beam L obtained through simulation. In FIG. 14B, for example, the light ray emitted from the upper edge of the core end face of the optical fiber exit end 26a diffuses with the diffusion angle α and enters the conical plate portion 58 of the transmissive optical member 52, then is subjected to a refraction and parallel translation as shown in FIG. 12C according to the incident angle so as to be transmitted through the transmissive optical member 52 while maintaining the diffusion angle α, thereafter enters the light-focusing optical section 32 and is output from the light-focusing optical section 32 with the convergent angle β, and is focused (or imaged) respectively at the second top position and the bottom position in the illustrated light focusing point I. On the other hand, in FIG. 14B, the light ray emitted from the lower edge of the core end face of the optical fiber exit end 26a diffuses with the diffusion angle α and enters the conical plate portion 58 of the transmissive optical member 52, then is subjected to a refraction and parallel translation as shown in FIG. 12C according to the incident angle so as to be transmitted through the transmissive optical member 52 while maintaining the diffusion angle α, thereafter enters the light-focusing optical section 32 and is output from the light-focusing optical section 32 with the convergent angle β, and is focused (or imaged) at the second bottom position and the top position in the illustrated light focusing point I.

When each light ray passes through the conical plate portion 58 of the transmissive optical member 52, an effect occurs as if the optical axis is displaced obliquely with respect to the light ray, and as a result, the light ray is focused separately at two positions in the light focusing point I, as illustrated. Further, as illustrated in FIG. 14B, the group of light rays emitted from the center region of the core end face of the optical fiber exit end 26a enters the center flat plate portion 56 of the transmissive optical member 52 and is transmitted through the transmissive optical member 52 while being subjected to a refraction and parallel translation as shown in FIG. 12B according to the incident angle, thereafter are focused through the light-focusing optical section 32 and focused (or imaged) at the center region in the illustrated light focusing point I.

Accordingly, the group of rays of the laser beam L emitted from the outer peripheral region of the core end face of the optical fiber exit end 26a is focused on an annular region S of focused beam diameter (outer diameter) D (the annular region corresponding to the perimeter shape of the core end face and having an outer diameter a little more than three times as large) at the light focusing point I, as shown in an enlarged view of FIG. 14C. On the other hand, the group of rays of the laser beam L emitted from the center region of the core end face of the optical fiber exit end 26a is focused on a circular region S' of focused beam diameter (outer diameter) D' (the region corresponding to the perimeter shape and diameter of the core end face) inside the annular region S at the light focusing point I, as shown in an enlarged view of FIG. 14C. The illumination intensity of the circular region S' in the center of the light focusing point I and the illumination intensity of the annular region S around the outer periphery are determined by the amount of light transmitted through the center flat plate portion 56 of the transmissive optical member 52 and the amount of light transmitted through the conical plate portion 58, respectively. When the light focusing point I is positioned on the surface of the workpiece W, the workpiece surface is irradiated with the laser beam L as a substantially circular spot having focused beam diameter D with the center region and the peripheral region having respectively different illumination intensities. The results of the investigation showed that the distance from the principal point of the light-focusing optical section 32 to the light focusing point I of the laser beam L is determined as about 100 mm, the imaging magnification of the light-focusing optical section 32 is determined as about 1.0, the convergent angle β of the laser beam L is determined as about 0.1 radians as a half angle, and the focused beam diameter D at the light focusing point is determined as about 150 μm.

Figure 15A:
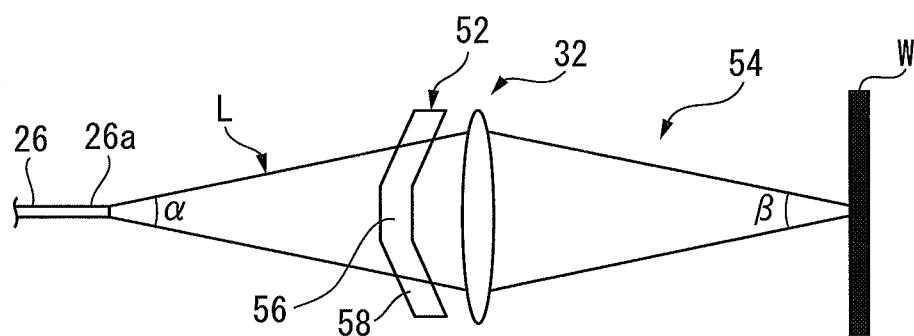
FIG. 15A is a component layout view for explaining the laser beam focusing action of a laser processing apparatus provided with the transmissive optical member of FIG. 10A disposed at still another desired position.
Figure 15B:
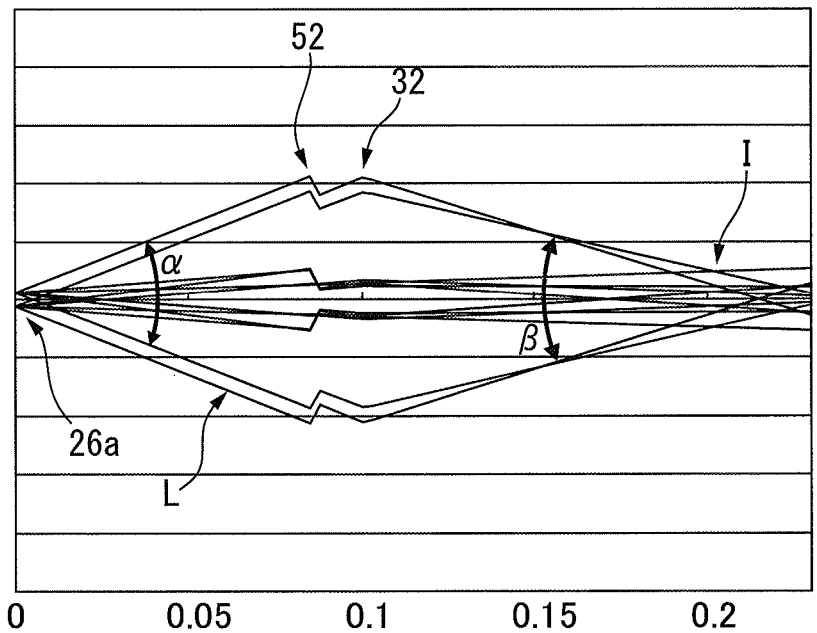
FIG. 15B is a diagram depicting optionally extracted light-ray paths in the laser processing apparatus of FIG. 15A.
Figure 15C:
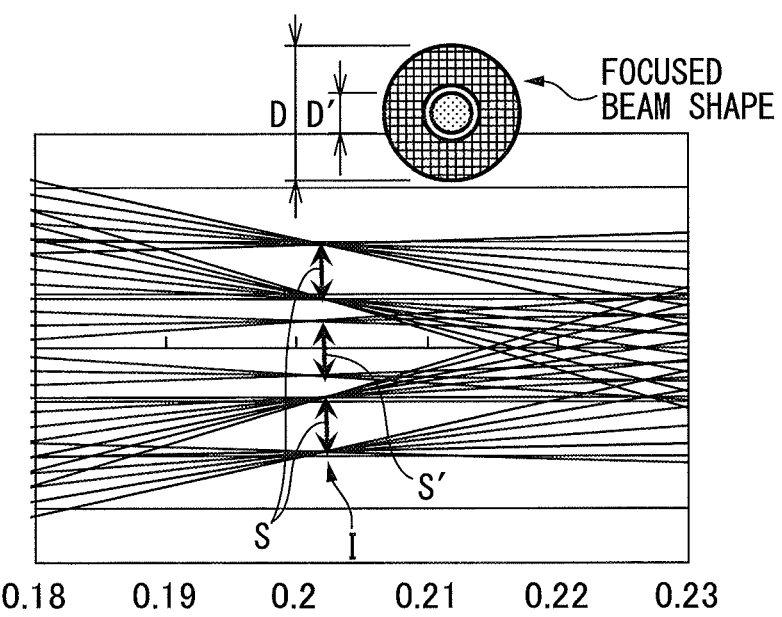
FIG. 15C is a diagram depicting light-ray paths around a light focusing point.

Next, referring to FIGS. 15A to 15C, the laser beam focusing action will be investigated when the transmissive optical member 52 is located at a position closer to the light-focusing optical section 32 than the position shown in FIG. 14A. In this configuration, the transmissive optical member 52 is located at a position where a portion of the laser beam L emitted from the exit end 26a of the optical fiber 26 is transmitted through the center flat plate portion 56 and the remaining portion through the conical plate portion 58, as shown in FIG. 15A. More specifically, the transmissive optical member 52 is positioned so that the first surface 56a of the center flat plate portion 56 is located at a distance of 85 mm from the core end face of the optical fiber exit end 26a. Otherwise, the configuration is the same as that shown in FIG. 14A.

FIG. 15B depicts light-ray paths optionally extracted from the paths of some of the rays of the laser beam L obtained through simulation. As illustrated in FIG. 15B, for example, the light ray emitted from the upper edge of the core end face of the optical fiber exit end 26a diffuses with the diffusion angle α and enters the conical plate portion 58 of the transmissive optical member 52, then is subjected to a refraction and parallel translation as shown in FIG. 12C according to the incident angle so as to be transmitted through the transmissive optical member 52 while maintaining the diffusion angle α, thereafter enters the light-focusing optical section 32 and is output from the light-focusing optical section 32 with the convergent angle β, and is focused (imaged) respectively at the second top position and the bottom position in the illustrated light focusing point I. On the other hand, in FIG. 15B, the light ray emitted from the lower edge of the core end face of the optical fiber exit end 26a diffuses with the diffusion angle α and enters the conical plate portion 58 of the transmissive optical member 52, then is subjected to a refraction and parallel translation as shown in FIG. 12C according to the incident angle so as to be transmitted through the transmissive optical member 52 while maintaining the diffusion angle α, thereafter enters the light-focusing optical section 32 and is output from the light-focusing optical section 32 with the convergent angle β, and is focused (imaged) respectively at the second bottom position and the top position in the drawing at the light focusing point I. When each light ray passes through the conical plate portion 58 of the transmissive optical member 52, an effect occurs as if the optical axis is displaced obliquely with respect to the light ray, and as a result, the light ray is focused at two separate positions at the light focusing point I, as illustrated. Further, as illustrated in FIG. 15B, the group of light rays emitted from the center region of the optical fiber exit end 26a enters the center flat plate portion 56 of the transmissive optical member 52 and is transmitted through the transmissive optical member 52 while being subjected to a refraction and parallel translation as shown in FIG. 12B according to the incident angle, thereafter are focused through the light-focusing optical section 32 and focused (or imaged) at the center region in the illustrated light focusing point I.

Accordingly, the group of rays of the laser beam L emitted from the outer peripheral region of the core end face of the optical fiber exit end 26a is focused on an annular region S of focused beam diameter (outer diameter) D (the annular region corresponding to the perimeter shape of the core end face and having an outer diameter a little more than three times as large) at the light focusing point I, as shown in an enlarged view of FIG. 15C. On the other hand, the group of rays of the laser beam L emitted from the center region of the core end face of the optical fiber exit end 26a is focused on a circular region S' of focused beam diameter (outer diameter) D' (the region corresponding to the perimeter shape and diameter of the core end face) inside the annular region S at the light focusing point I, as shown in an enlarged view of FIG. 15C. Compared with the configuration of FIGS. 14A to 14C, since the transmissive optical member 42 is positioned even closer to the light-focusing optical section 32 in the configuration of FIGS. 15A to 15C, the amount of light transmitted through the center flat plate portion 56 decreases, and the amount of light transmitted through the conical plate portion 58 increases. As a result, compared with FIG. 14C, the illumination intensity of the circular region S' in the center of the light focusing point I decreases, and the illumination intensity of the annular region S around the outer periphery increases, as shown in FIG. 15C. When the light focusing point I is positioned on the surface of the workpiece W, the workpiece surface is irradiated with the laser beam L as a substantially circular spot of focused beam diameter D with the outer peripheral region having a higher illumination intensity than the center region. The results of the investigation showed that the distance from the principal point of the light-focusing optical section 32 to the light focusing point I of the laser beam L is determined as about 100 mm, the imaging magnification of the light-focusing optical section 32 is determined as about 1.0, the convergent angle β of the laser beam L is determined as about 0.1 radians as a half angle, and the focused beam diameter D at the light focusing point is determined as about 150 μm.

As can be understood from a comparison between the configurations shown in FIGS. 13A to 15C, the size of the focused beam diameter or the ratio in illumination intensity between the center region and the outer peripheral region of the light focusing point I can be changed or adjusted by changing, instead of the desired parameter of the conical plate portion 58 of the transmissive optical member 52, the position of the transmissive optical member 52 between the optical fiber 26 and the light-focusing optical section 32 along the optical axis 32a. A plurality of processing heads 18 (FIG. 2), each equipped with a transmissive optical member 52 identical in configuration but differently positioned, may be provided in advance, and the appropriate processing head 18 equipped with the transmissive optical member 52 mounted in a position that matches the kind of laser processing and the material, thickness, etc. of the workpiece W may be selected for use. If the design dictates that a portion of the laser beam L should always be transmitted through the conical plate portion 58 of the transmissive optical member 52, it is not possible to change the size of the focused beam diameter by just changing the position of the transmissive optical member 52 along the optical axis. If the size of the focused beam diameter is to be changed in this case, the transmissive optical member 52 must be replaced by a different transmissive optical member 52 that differs in parameters such as the vertex angle θ, thickness t2, refractive index, inner diameter, etc. of the conical plate portion 58.

Alternatively, the laser processing apparatus 54 may be constructed so that the transmissive optical member 52 is mounted within the processing head 18 (FIG. 2) so as to be movable in directions along the optical axis 32a of the light-focusing optical section 32. For example, using a suitable driving mechanism (not shown) at a position that does not interfere with the laser beam L, the transmissive optical member 52 can be mounted so as to be movable along the optical axis in a stepless manner within the housing 34. According to this configuration, since the transmissive optical member 52 is moved by the driving mechanism to an appropriate position to match the kind of laser processing and the material, thickness, etc. of the workpiece W, laser processing can be performed by irradiating the workpiece W with the laser beam L having an optimum focused beam diameter D and convergent angle β. As earlier described, the configuration in which all of the laser beam L is transmitted through the center flat plate portion 56 of the transmissive optical member 52 (FIG. 13A) achieves substantially the same laser beam focusing action as the configuration in which the laser processing apparatus 54 is not equipped with the transmissive optical member 52. That is, in the configuration in which all of the laser beam L is transmitted through the center flat plate portion 56, the laser beam L emitted from the optical fiber 26 is focused through the light-focusing optical section 32 designed to minimize geometrical aberrations, etc. and is emitted from the processing head 18 without degrading its original focusing performance. Accordingly, by moving the transmissive optical member 52 to an appropriate position, as described above, the laser processing apparatus 52 in which the transmissive optical member 52 is mounted movably along the optical axis can perform optimum laser processing by responding not only to a change in the kind of laser processing or the material, thickness, etc. of the workpiece W but also to a change in the focusing performance of the laser beam L required for processing.

Further, the laser processing apparatus 54 may be constructed so that the transmissive optical member 52 can be detachably mounted at a selected one of a plurality of predetermined positions within the processing head 18 (FIG. 2). For example, using a suitable mounting jig (not shown) at a position that does not interfere with the laser beam L, the transmissive optical member 52 may be detachably mounted to the inner wall of the housing 34 (FIG. 2). According to this configuration, since the transmissive optical member 52 is mounted at an appropriate position selected from among the plurality of predetermined positions to match the kind of laser processing, the material, thickness, etc. of the workpiece W, and the required focusing performance of the laser beam, laser processing can be performed by irradiating the workpiece W with the laser beam L having an optimum focused beam diameter D and convergent angle β. Further, a plurality of transmissive optical members 52, which differ in the vertex angle θ, thickness t, refractive index, inner diameter (outer diameter of the center flat plate portion 56), etc. of the conical plate portion 58 employed, may be provided in advance, and an appropriate one of the transmissive optical members 52 that matches the kind of laser processing, the material, thickness, etc. of the workpiece W, and the required focusing performance of the laser beam may be selected and mounted at the selected position. Furthermore, the same laser processing apparatus 54 can be used by appropriately switching the configuration between the configuration that is not equipped with the transmissive optical member 52 and the configuration that is equipped with it. In the configuration that is not equipped with the transmissive optical member 52, the laser beam L emitted from the optical fiber 26 can be output from the processing head 18 without degrading its original focusing performance.

In the laser processing apparatus 54, as in the laser processing apparatus 10, the transmissive optical member 52 may be reversed side for side from the arrangement shown in FIG. 12A to 15C, or may be disposed downstream of the light-focusing optical section 32 as seen in the traveling direction of the laser beam L. The mounting orientation of the transmissive optical member 52 and its position relative to the light-focusing optical section 32 can be selected in accordance with the kind of laser processing and the material, thickness, etc. of the workpiece W.

In the laser processing apparatus 54, a situation can occur where a light ray that entered the center flat plate portion 56 of the transmissive optical member 52 near the boundary between the center flat plate portion 56 and the conical plate portion 58 is output from the conical plate portion 58 or conversely a light ray that entered the conical plate portion 58 near the boundary is output from the center flat plate portion 56. If this occurs, the parallel relationship between the light-ray paths before and after the transmission through the transmissive optical member 52 may not be maintained; therefore, it is desirable to design the transmissive optical member 52 by considering the diffusion angle α and convergent angle β of the laser beam L.

Further, in the laser processing apparatus 54, the position of the transmissive optical member 52 along the optical axis may be determined in accordance with the required distribution of the illumination intensity on the light focusing point of the laser beam. For example, assume the conditions that the core diameter of the optical fiber 26 is 50 μm, the diffusion angle α of the laser beam L is 0.1 radians as a half angle, the distance from the exit end 26a of the optical fiber 26 to the principal point of the light-focusing optical section 32 is 100 mm, the distance from the principal point of the light-focusing optical section 32 to the light focusing point of the laser beam L is 100 mm, and the imaging magnification of the light-focusing optical section 32 is 1.0; under these conditions, when the transmissive optical member 52 is mounted in close proximity to the optical fiber exit end 26a as shown in FIG. 13A, the focused beam diameter is 50 μm which is equal to the core diameter of the optical fiber 26. When the conical plate portion 58 of the transmissive optical member 52 has a vertex angle of 176.6° (i.e., an inclination angle of) 1.7° and a thickness of 5 mm, the group of light rays transmitted through the conical plate portion 58 is focused through the light-focusing optical section 32 onto an annular region having an inner diameter of about 50 μm, an outer diameter of about 150 μm, and a width of about 50 μm. On the other hand, the group of light rays transmitted through the center flat plate portion 56 of the transmissive optical member 52 is focused onto a circular region about 50 μm in diameter which is formed inside the annular region. The area of the annular region is about eight times the area of the circular region. Accordingly, when the transmissive optical member 52 is mounted at the position where eight times as many light rays as the light rays passing through the center flat portion 56 pass through the conical plate portion 58, the entire area of the light focusing point of diameter 150 μm can be illuminated with uniform illumination intensity by the laser beam. When the diameter of the center flat portion 56 of the transmissive optical member 52 is 5 mm, if the transmissive optical member 52 is mounted at the position where the outer diameter of the laser beam passing through the conical plate portion 58 is 15 mm, the light focusing point of diameter 150 μm can be illuminated with uniform illumination intensity.

Figure 16A:
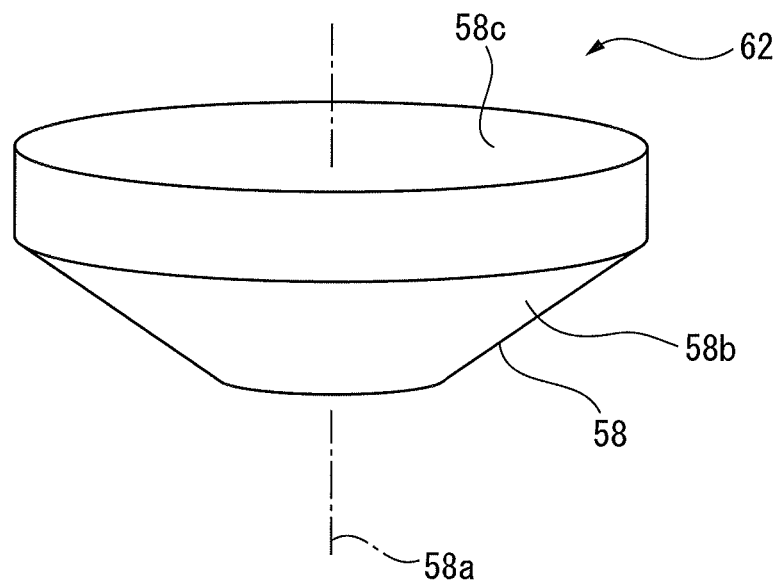
FIG. 16A is a perspective view of a transmissive optical member according to a modified example.
Figure 16B:
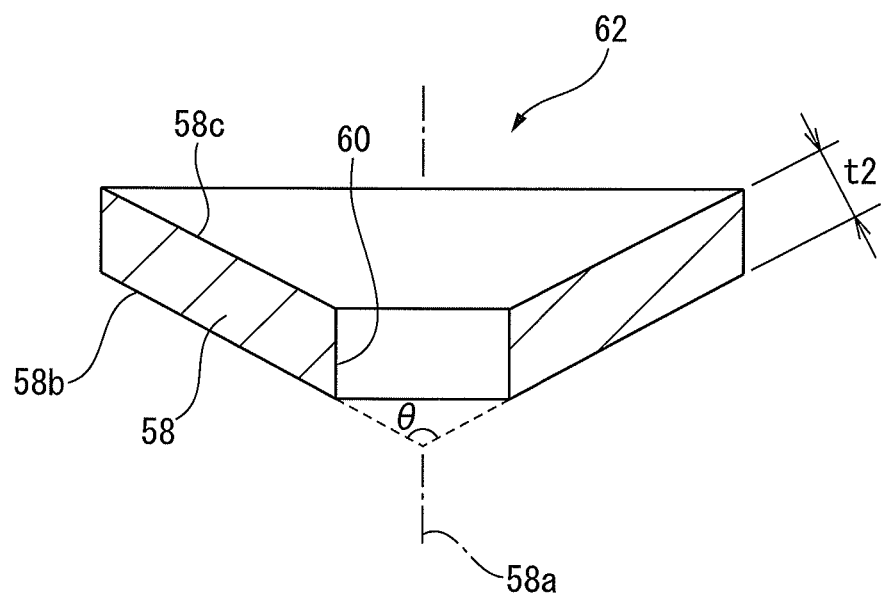
FIG. 16B is a sectional view depicting the transmissive optical member of FIG. 16A.

In the laser processing apparatus 54, the transmissive optical member 52 may be replaced by a transmissive optical member 62 which is provided, inside the annular conical plate portion 58, with a circular hole 60 centered at the symmetry axis 58a, as illustrated in FIGS. 16A and 16B. The transmissive optical member 62 is substantially identical to the transmissive optical member 52, except that the center flat portion 56 of the transmissive optical member 52 is replaced by the hole 60, and the effect it exerts on the laser beam being transmitted is substantially the same as that of the transmissive optical member 52. However, in the case of the transmissive optical member 62, since the annular inner circumferential surface of the conical plate portion 58 that defines the hole 60 may tend to absorb the laser beam depending on the shape of the circumferential surface, it is desirable not to dispose the transmissive optical member 62 at a position extremely close to the exit end 26a of the optical fiber 26 or at a position where the annular inner circumferential surface is irradiated with a laser beam portion having high energy intensity.

When the transmissive optical member 52, 62 is disposed on the upstream side of the light-focusing optical section 32, it is preferable that the annular conical plate portion 58 has an inner diameter larger than the minimum beam diameter (equal to the core diameter of the exit end 26a of the optical fiber 26) of the laser beam L having the diffusion angle α. On the other hand, when the transmissive optical member 52, 62 is disposed on the downstream side of the light-focusing optical section 32, it is preferable that the annular conical plate portion 58 has an inner diameter larger than the focused beam diameter D of the laser beam L having the convergent angle β.

Next, referring to FIGS. 17A to 17C, the configuration of a transmissive optical member 64 that differs in shape from any of the transmissive optical members 44, 52 and 62 and the configuration of a laser processing apparatus 66 according to an alternative embodiment incorporating the transmissive optical member 64 will be described. The laser processing apparatus 66 incorporating the transmissive optical member 64 may be constructed to have the same configuration as the laser processing apparatus 54 shown in FIGS. 12A to 15C, except that the transmissive optical member 52, 62 is replaced by the transmissive optical member 64. In the following description, components corresponding to those in the laser processing apparatus 54 are designated by like reference numerals, and such components will not be further described herein.

Figure 17A:
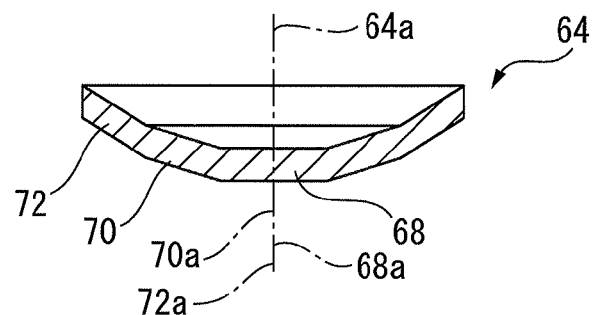
FIG. 17A is a sectional view depicting a transmissive optical member and explaining the configuration of a laser processing apparatus according to a further embodiment.

As shown in FIG. 17A, the transmissive optical member 64 includes a center flat plate portion 68 of uniform thickness formed in a rotationally symmetrical shape and perpendicular to its symmetry axis 68a, an annular first conical plate portion 70 of uniform thickness formed in a rotationally symmetrical shape along the outer periphery of the center flat plate portion 68 and inclined with respect to its symmetry axis 70a, and an annular second conical plate portion 72 of uniform thickness formed in a rotationally symmetrical shape along the outer periphery of the first conical plate portion 70 and inclined with respect to its symmetry axis 72a. The symmetry axis 68a of the center flat plate portion 68, the symmetry axis 70a of the first conical plate portion 70, and the symmetry axis 72a of the second conical plate portion 72 coincide with each other and coincide with the center axis line 64a of the transmissive optical member 64. The first conical plate portion 70 and the second conical plate portion 72 are arranged concentric with each other. The inclination angle of the second conical plate portion 72 with respect to a plane perpendicular to the symmetry axis 72a is larger than the inclination angle of the first conical plate portion 70 with respect to a plane perpendicular to the symmetry axis 70a. In other words, the transmissive optical member 64 differs from the earlier described transmissive optical member 52 in that the conical plate portion 58 of the transmissive optical member 52 is replaced by the first and second conical plate portions 70 and 72 having respectively different inclination angles; in other respects, the same configuration as that of the transmissive optical member 52 may be employed.

Figure 17B:
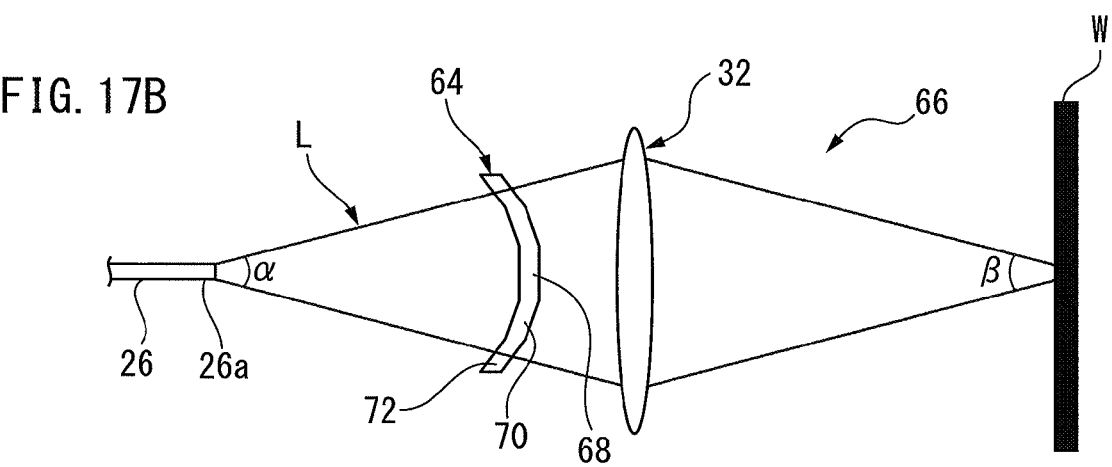
FIG. 17B is a component layout view of the laser processing apparatus of FIG. 17A.
Figure 17C:
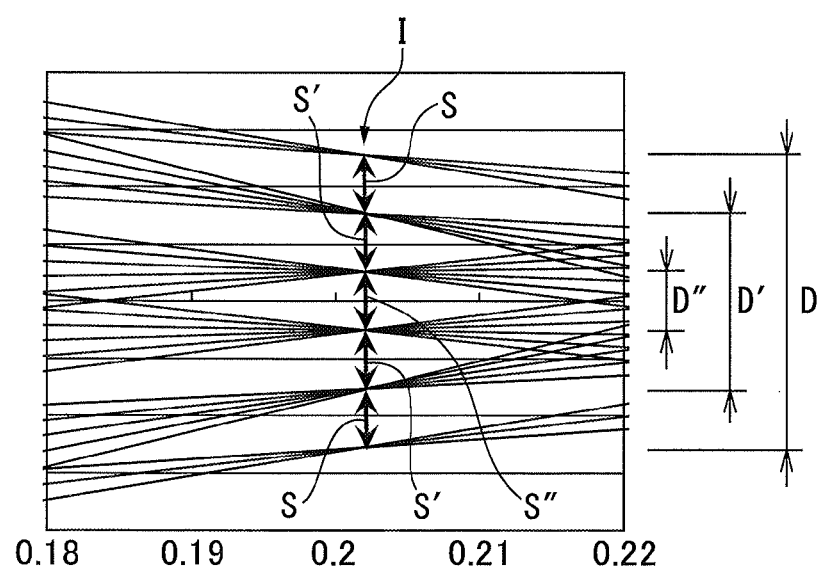
FIG. 17C is a diagram depicting light-ray paths around a light focusing point.

In the laser processing apparatus 66 shown in FIG. 17B, the transmissive optical member 64 is located at a position where a portion of the laser beam L emitted from the exit end 26a of the optical fiber 26 is transmitted through the center flat plate portion 56, another portion of the laser beam L is transmitted through the first conical plate portion 70, and the remaining portion of the laser beam L is transmitted through the second conical plate portion 72. As previously described with reference to 11A to 11D, the light ray transmitting through the center flat plate portion 68 of the transmissive optical member 64, the light ray transmitting through the first conical plate portion 70, and the light ray transmitting through the second conical plate portion 72 are each translated a different distance during the transmission. As a result, in the configuration of FIG. 17B, as shown in enlarged form in FIG. 17C, the group of light rays of the laser beam L emitted from the outer peripheral region of the core end face of the optical fiber exit end 26a is focused on an annular region S of focused beam diameter (outer diameter) D at the light focusing point I, the group of light rays of the laser beam L emitted from an annular region inside the outer peripheral region of the core end face is focused on an annular region S' of focused beam diameter (outer diameter) D' inside the annular region S at the light focusing point I, and the group of light rays of the laser beam L emitted from the center region of the core end face is focused on a circular region S" of focused beam diameter (outer diameter) D" inside the annular region S' at the light focusing point I.

In the laser processing apparatus 66, as in the earlier described laser processing apparatus 54, the transmissive optical member 64 can be mounted at a desired position along the optical axis 32a (FIG. 12A) of the light-focusing optical section 32 to match the kind of laser processing, the material, thickness, etc. of the workpiece W, and the required focusing performance of the laser beam. Further, in the laser processing apparatus 66, as in the laser processing apparatus 54, the position of the transmissive optical member 64 along the optical axis may be determined in accordance with the required distribution of the illumination intensity on the light focusing point of the laser beam. Further, by configuring the transmissive optical member 64 to have three or more conical plate portions arranged concentric with each other and inclined at respectively different angles with respect to the symmetry axis, it becomes possible to meticulously address various needs. Furthermore, the center flat plate portion 68 of the transmissive optical member 64 may be replaced by a hole, or the center flat plate portion 68 may be omitted and the first conical plate portion 70 may be formed in the shape of a cone similar to the conic plate portion 46 of the transmissive optical member 44 shown in FIG. 3A. In this way, with the provision of the transmissive optical member 64 incorporating the first and second conic plate portions 70 and 72 (focused-beam diameter increasing part), the laser processing apparatus 66 at least offers an effect equivalent to that of the laser processing apparatus 54 shown in FIG. 12A.

Figure 18A:
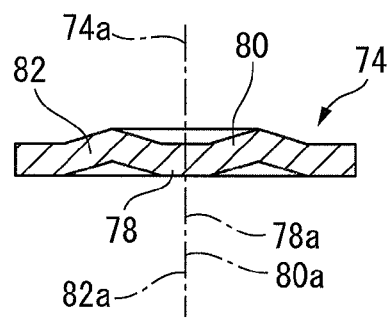
FIG. 18A is a sectional view depicting a transmissive optical member and explaining the configuration of a laser processing apparatus according to an yet further embodiment.

Next, referring to FIGS. 18A to 18C, the configuration of a transmissive optical member 74 that differs in shape from any of the transmissive optical members 44, 52, 62 and 64 and the configuration of a laser processing apparatus 76 according to an alternative embodiment incorporating the transmissive optical member 74 will be described. The laser processing apparatus 76 incorporating the transmissive optical member 74 may be constructed to have the same configuration as the laser processing apparatus 54 shown in FIGS. 12A to 15C, except that the transmissive optical member 52, 62 is replaced by the transmissive optical member 74. In the following description, components corresponding to those in the laser processing apparatus 54 are designated by like reference numerals, and such components will not be further described herein.

To achieve the earlier described configuration of the plurality of conical plate portions having respectively different inclination angles, the transmissive optical member 74 employs a configuration that includes a pair of conical plate portions inclined with respect to the symmetry axis in opposite directions at angles equal in absolute value. For example, as shown in FIG. 18A, the transmissive optical member 74 includes a center flat plate portion 78 of uniform thickness formed in a rotationally symmetrical shape and perpendicular to its symmetry axis 78a, an annular first conical plate portion 80 of uniform thickness formed in a rotationally symmetrical shape along the outer periphery of the center flat plate portion 78 and inclined with respect to its symmetry axis 70a, and an annular second conical plate portion 82 of uniform thickness formed in a rotationally symmetrical shape along the outer periphery of the first conical plate portion 80 and inclined with respect to its symmetry axis 82a. The symmetry axis 78a of the center flat plate portion 78, the symmetry axis 80a of the first conical plate portion 80, and the symmetry axis 82a of the second conical plate portion 82 coincide with each other and coincide with the center axis line 74a of the transmissive optical member 74. The first conical plate portion 80 and the second conical plate portion 82 are arranged concentric with each other. The inclination angle of the first conical plate portion 80 with respect to a plane perpendicular to the symmetry axis 80a and the inclination angle of the second conical plate portion 82 with respect to a plane perpendicular to the symmetry axis 82a are equal in absolute value but opposite in direction.

Figure 18B:
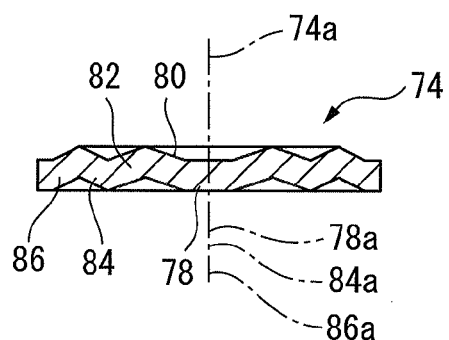
FIG. 18B is a sectional view depicting another transmissive optical member in the laser processing apparatus of FIG. 18A.

As shown in FIG. 18B, the transmissive optical member 74 may further includes an annular third conical plate portion 84 of uniform thickness formed in a rotationally symmetrical shape along the outer periphery of the second conical plate portion 82 and inclined with respect to its symmetry axis 84a, and an annular fourth conical plate portion 86 of uniform thickness formed in a rotationally symmetrical shape along the outer periphery of the third conical plate portion 84 and inclined with respect to its symmetry axis 86a. The symmetry axis 84a of the third conical plate portion 84 and the symmetry axis 86a of the fourth conical plate portion 86 coincide not only with the symmetry axis 78a of the center flat plate portion 78 but also with the center axis line 74a of the transmissive optical member 74. The third conical plate portion 84 and the fourth conical plate portion 86 are arranged concentric with each other and concentric with the first and second conical plate portions 80 and 82. The inclination angle of the third conical plate portion 84 with respect to a plane perpendicular to the symmetry axis 84a and the inclination angle of the fourth conical plate portion 86 with respect to a plane perpendicular to the symmetry axis 86a are equal in absolute value but opposite in direction. The inclination angle of the third conical plate portion 84 is larger than the inclination angle of the first conical plate portion 80, and the inclination angle of the fourth conical plate portion 86 is larger than the inclination angle of the second conical plate portion 82.

Figure 18C:
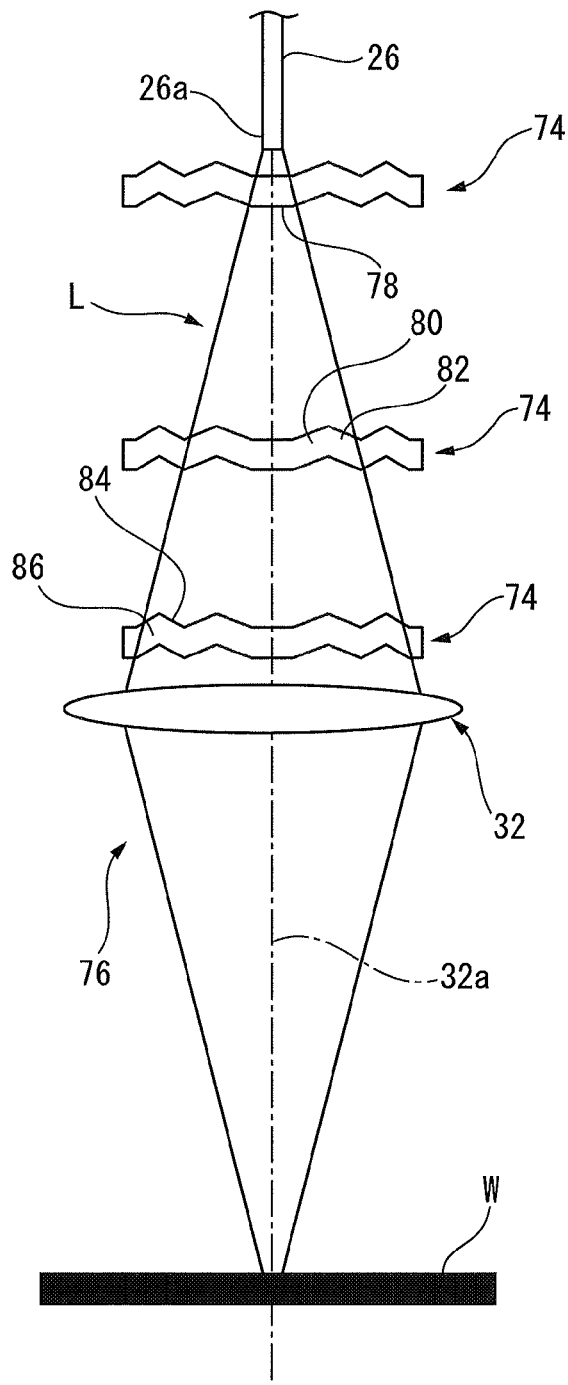
FIG. 18C is a component layout view of the laser processing apparatus of FIG. 18A.

As shown in FIG. 18C, the laser processing apparatus 76 incorporating the transmissive optical member 74 is constructed so that the transmissive optical member 74 can be mounted at a desired position along the optical axis 32a of the light-focusing optical section 32. FIG. 18C depicts the condition in which the transmissive optical member 74 is located at a position where all of the laser beam L emitted from the exit end 26a of the optical fiber 26 is transmitted through the center flat plate portion 78 (the position at the upper end in the drawing), at a position where a portion of the laser beam is transmitted through the center flat plate portion 78 and the remaining portion of the laser beam L is transmitted through the first and second conical plate portions 80 and 82 (the position at the middle in the drawing), and at a position where a portion of the laser beam is transmitted through the center flat plate portion 78, another portion of the laser beam L is transmitted through the first and second conical plate portions 80 and 82, and the remaining portion of the laser beam L is transmitted through the third and fourth conical plate portions 84 and 86 (the position at the lower end in the drawing), respectively. When the transmissive optical member 74 is mounted at the upper end position in the drawing, the focused beam diameter at the light focusing point can be minimized while maintaining the original focusing performance of the laser beam L, as in the laser processing apparatus 54 shown in FIG. 13A. When the transmissive optical member 74 is mounted at the middle position in the drawing, the focused beam diameter at the light focusing point can be enlarged by the action of the first and second conical plate portions 80 and 82, as in the laser processing apparatus 54 shown in FIG. 14A. When the transmissive optical member 74 is mounted at the lower end position in the drawing, the focused beam diameter at the light focusing point can be further enlarged by the action of the third and fourth conical plate portions 84 and 86 inclined at larger angles than the first and second conical plate portions 80 and 82. In this way, with the provision of the transmissive optical member 74 having one or more pairs of conic plate portions 80, 82, 84 and 86 (focused-beam diameter increasing part), the laser processing apparatus 76 at least offers an effect equivalent to that of the laser processing apparatus 54 shown in FIG. 12A.

Next, referring to FIGS. 19A to 20D, the configuration of a transmissive optical member 88 that differs in shape from any of the transmissive optical members 44, 52, 62, 64 and 74 and the configuration of a laser processing apparatus 90 according to an alternative embodiment incorporating the transmissive optical member 88 will be described. The laser processing apparatus 90 incorporating the transmissive optical member 88 may be constructed to have the same configuration as the laser processing apparatus 10 shown in FIGS. 5A to 7D, except that the transmissive optical member 44 is replaced by the transmissive optical member 88. In the following description, components corresponding to those in the laser processing apparatus 10 are designated by like reference numerals, and such components will not be further described herein.

The transmissive optical member 88 differs from the transmissive optical member 74 by the omission of the center flat plate portion 78. As shown in FIG. 19A, the transmissive optical member 88 includes an annular first conical plate portion 92 of uniform thickness formed in a rotationally symmetrical shape and inclined with respect to its symmetry axis 92a, and an annular second conical plate portion 94 of uniform thickness formed in a rotationally symmetrical shape along the outer periphery of the first conical plate portion 92 and inclined with respect to its symmetry axis 94a. The symmetry axis 92a of the first conical plate portion 92 and the symmetry axis 94a of the second conical plate portion 94 coincide with each other and coincide with the center axis line 88a of the transmissive optical member 88. The first conical plate portion 92 and the second conical plate portion 94 are arranged concentric with each other. The inclination angle of the first conical plate portion 92 with respect to a plane perpendicular to the symmetry axis 92a and the inclination angle of the second conical plate portion 94 with respect to a plane perpendicular to the symmetry axis 94a are equal in absolute value but opposite in direction.

As shown in FIG. 19A, the transmissive optical member 88 incorporated in the laser processing apparatus 90 is provided within the processing head 18 (FIG. 2), and is disposed upstream of the light-focusing optical section 32 as seen in the traveling direction of the laser beam L. The transmissive optical member 88 is mounted within the housing 34 (FIG. 2) at a predetermined position between the exit end 26a of the optical fiber 26 and the light-focusing optical section 32 with the center axis line 88a thereof coinciding with the optical axis 32a of the light-focusing optical section 32. Further, the transmissive optical member 88 is located at a position where the center portion of the light flux of the laser beam L emitted from the exit end 26a of the optical fiber 26 is transmitted through the first conical plate portion 92 and the remaining outer portion through the second conical plate portion 94. The transmissive optical member 88 allows the laser beam L emitted from the exit end 26a of the optical fiber 26 to be transmitted therethrough while keeping the diffusion angle α of the laser beam L unchanged before and after the transmission, in the same manner as previously described with reference to FIGS. 4A and 4B.

The laser beam L emitted from the exit end 26a of the optical fiber 26 with the diffusion angle α is first transmitted through the transmissive optical member 88 and then focused through the light-focusing optical section (virtual lens) 32, and the workpiece W is irradiated with the focused laser beam L with the convergent angle β. The dimensions of the various parts are set the same as those in the arrangement of FIGS. 5A to 5D; that is, the core diameter of the optical fiber 26 is 50 μm, the diffusion angle α of the laser beam L is 0.1 radians as a half angle, the distance from the core end face of the exit end 26a of the optical fiber 26 to the principal point of the light-focusing optical section 32 is 100 mm, and the focal length of the light-focusing optical section 32 is 50 mm. Further, the vertex angle of the first conical plate portion 92 of the transmissive optical member 88 is 177.14° (i.e., the inclination angle with respect to the plane perpendicular to the symmetry axis 92a is 1.43°), the thickness of the first conical plate portion 92 is 3 mm, the vertex angle of the second conical plate portion 94 is −177.14° (i.e., the inclination angle with respect to the plane perpendicular to the symmetry axis 94a is −1.43°), the thickness of the second conical plate portion 94 is 3 mm, and the distance from the core end face of the optical fiber exit end 26a to the vertex of the first conical plate portion 92 is 64 mm.

FIG. 19B depicts the paths of some of the rays of the laser beam L obtained through simulation. For better understanding, light-ray paths optionally extracted from the light-ray paths shown in FIG. 19B are illustrated in FIG. 19C. As illustrated in FIGS. 19B and 19C, for example, the light ray emitted from the upper edge of the core end face of the optical fiber exit end 26a is diffused with the diffusion angle α and input to the second conical plate portion 94 of the transmissive optical member 88, and the light ray is subjected to a refraction and parallel translation according to its incident angle and transmitted through the transmissive optical member 88 while maintaining the diffusion angle α; the light ray then enters the light-focusing optical section 32 and is output from the light-focusing optical section 32 with the convergent angle β. Likewise, as illustrated in FIGS. 19B and 19C, the light ray emitted from the lower edge of the core end face of the optical fiber exit end 26a is diffused with the diffusion angle α and input to the second conical plate portion 94 of the transmissive optical member 88, and the light ray is subjected to a refraction and parallel translation according to its incident angle and transmitted through the transmissive optical member 88 while maintaining the diffusion angle α; the light ray then enters the light-focusing optical section 32 and is output from the light-focusing optical section 32 with the convergent angle β. The paths of these light rays substantially correspond to the paths of the light rays shown in FIGS. 6B and 6C.

On the other hand, the group of light rays emitted from the center region of the exit end 26a of the optical fiber 26 is transmitted through the first conical portion 92; during the transmission, the group of light rays is translated a different distance than the light rays transmitted through the second conical plate portion 94, and the group of light rays thus translated is focused through the light-focusing optical section 32 for emission. As a result, the laser beam L is focused on a circular region S of focused beam diameter D (the region corresponding to the perimeter shape of the core end face and having a diameter about twice as large) at the light focusing point I, the focused beam shape being similar to that shown in FIG. 6D. Furthermore, since the laser beam L is transmitted through the pair of first and second conical plate portions 92 and 94 inclined with respect to their symmetry axes 92a and 94a in opposite directions at angles equal in absolute value, the way the paths of the light rays converge within a predetermined range taken along the optical axis and centered at the light focusing point I is similar to the way the paths of the light rays shown in FIG. 5D converge in the configuration in which the light rays are not transmitted through the transmissive optical member 44 (i.e., mirror image-like symmetry about the light focusing point I). Accordingly, when the laser processing apparatus 90 equipped with the transmissive optical member 88 performs laser processing, for example, by deliberately displacing the light focusing point I away from the workpiece surface along the optical axis, it can be expected that the focused beam diameter of the laser beam L at the light focusing point I can be enlarged, while achieving processing quality equivalent to the processing quality that can be obtained in the configuration not equipped with the transmissive optical member 88. With the provision of the transmissive optical member 88 having one or more pairs of conic plate portions 92 and 94 (focused-beam diameter increasing part), the laser processing apparatus 90 at least offers an effect equivalent to that of the laser processing apparatus 10 shown in FIG. 2.

Figure 20A:
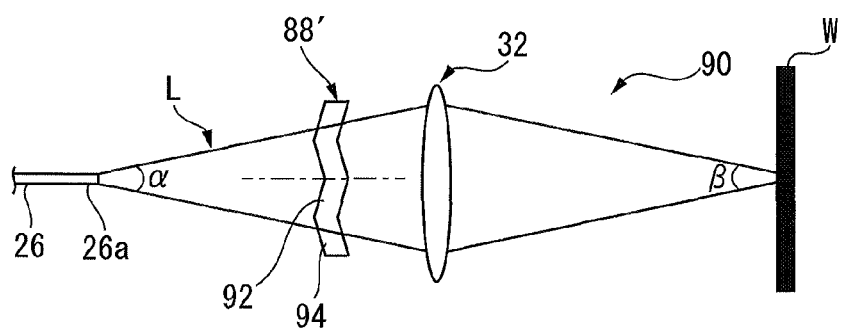
FIG. 20A is a component layout view for explaining a modified example of the configuration of the laser processing apparatus of FIG. 19A.

FIG. 20A depicts the laser processing apparatus 90 in an alternative configuration in which a transmissive optical member 88' having conic plate portions whose vertex angles are different from the vertex angles of the respective conic plate portions of the transmissive optical member 88 is mounted at the same position as the transmissive optical member 88. In the case of the transmissive optical member 88', the vertex angle of the first conical plate portion 92 is set to 174.28° (i.e., the inclination angle with respect to the plane perpendicular to the symmetry axis 92a is 2.86°), and the vertex angle of the second conical plate portion 94 is set to −174.28° (i.e., the inclination angle with respect to the plane perpendicular to the symmetry axis 94a is −2.86°). Otherwise, the dimensions of the various parts are the same as those in the configuration of FIG. 19A.

Figure 20B:
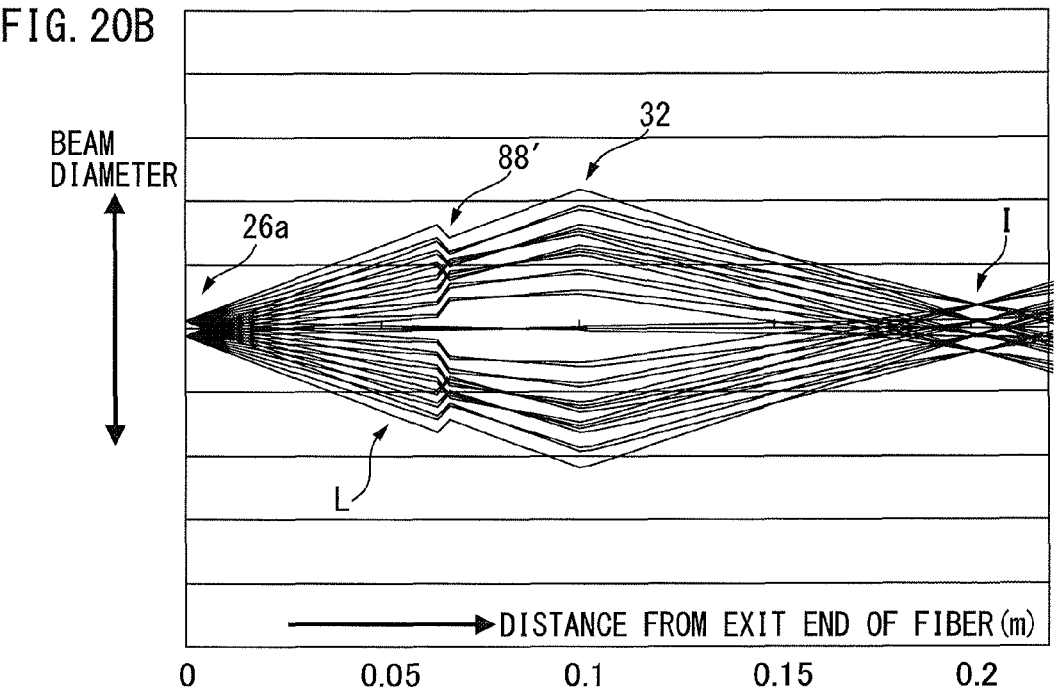
FIG. 20B is a diagram depicting some of light-ray paths in the laser processing apparatus of FIG. 20A.
Figure 20C:
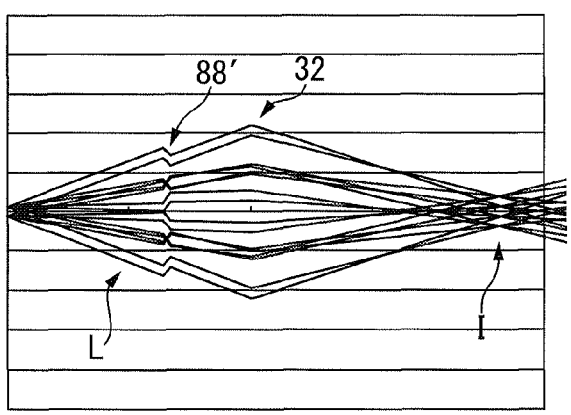
FIG. 20C is a diagram depicting light-ray paths optionally extracted from the light-ray paths shown in FIG. 20B.
Figure 20D:
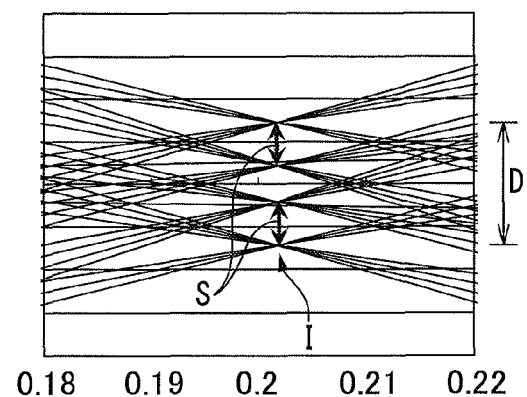
FIG. 20D is an enlarged view depicting the light-ray paths around a light focusing point.

FIG. 20B depicts the paths of some of the rays of the laser beam L obtained through simulation. For better understanding, light-ray paths optionally extracted from the light-ray paths shown in FIG. 20B are illustrated in FIG. 20C. As illustrated in FIGS. 20B and 20C, for example, the light ray emitted from the upper edge of the core end face of the optical fiber exit end 26a is diffused with the diffusion angle α and input to the second conical plate portion 94 of the transmissive optical member 88', and the light ray is subjected to a refraction and parallel translation according to its incident angle and transmitted through the transmissive optical member 88' while maintaining the diffusion angle α; the light ray then enters the light-focusing optical section 32 and is output from the light-focusing optical section 32 with the convergent angle β. Likewise, as illustrated in FIGS. 20B and 20C, the light ray emitted from the lower edge of the core end face of the optical fiber exit end 26a is diffused with the diffusion angle α and input to the second conical plate portion 94 of the transmissive optical member 88', and the light ray is subjected to a refraction and parallel translation according to its incident angle and transmitted through the transmissive optical member 88' while maintaining the diffusion angle α; the light ray then enters the light-focusing optical section 32 and is output from the light-focusing optical section 32 with the convergent angle β. The paths of these light rays substantially correspond to the paths of the light rays shown in FIGS. 7B and 7C.

On the other hand, the group of light rays emitted from the center region of the exit end 26a of the optical fiber 26 is transmitted through the first conical portion 92; during the transmission, the group of light rays is translated a different distance than the light rays transmitted through the second conical plate portion 94, and the group of light rays thus translated is focused through the light-focusing optical section 32 for emission. As a result, the laser beam L is focused on an annular region S of focused beam diameter (outer diameter) D (the annular region corresponding to the perimeter shape of the core end face and having an outer diameter about three times as large) at the light focusing point I, the focused beam shape being similar to that shown in FIG. 7D. Furthermore, since the laser beam L is transmitted through the pair of first and second conical plate portions 92 and 94 inclined with respect to their symmetry axes 92a and 94a in opposite directions at angles equal in absolute value, the way the paths of the light rays converge within a predetermined range taken along the optical axis and centered at the light focusing point I is similar to the way the paths of the light rays shown in FIG. 5D converge in the configuration in which the light rays are not transmitted through the transmissive optical member 44 (i.e., mirror image-like symmetry about the light focusing point I). In this way, the laser processing apparatus 90 equipped with the transmissive optical member 88' offers the same effect as that achieved by the laser processing apparatus 90 equipped with the transmissive optical member 88.

Figure 21:
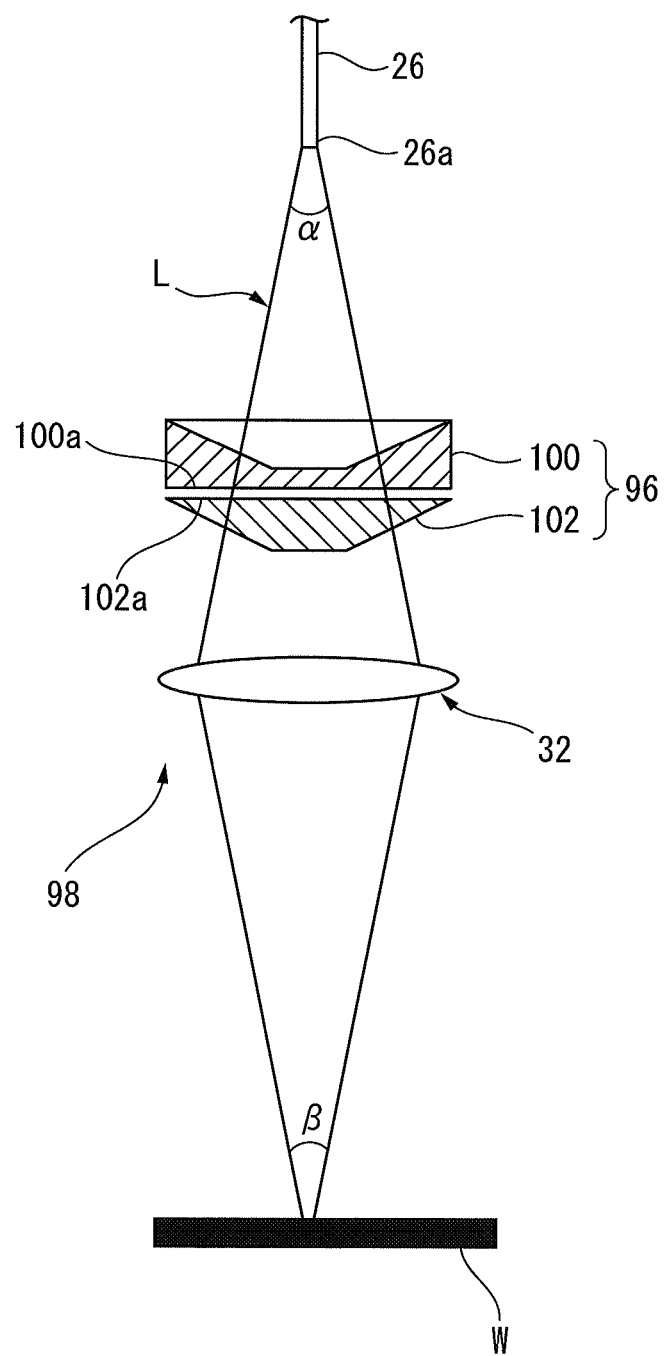
FIG. 21 is a diagram depicting a laser processing apparatus according to an yet further embodiment.

Next, referring to FIG. 21, the configuration of a transmissive optical member 96 that differs in shape from any of the transmissive optical members 44, 52, 62, 64, 74 and 88 and the configuration of a laser processing apparatus 98 according to an alternative embodiment incorporating the transmissive optical member 96 will be described. The laser processing apparatus 98 incorporating the transmissive optical member 96 may be constructed to have the same configuration as the laser processing apparatus 54 shown in FIGS. 12A to 15C, except that the transmissive optical member 52, 62 is replaced by the transmissive optical member 96. In the following description, components corresponding to those in the laser processing apparatus 54 are designated by like reference numerals, and such components will not be further described herein.

The transmissive optical member 96 includes a first member 100 and second member 102 of a structure equivalent to a structure that would result if the earlier described transmissive optical member 52 containing the center flat plate portion 56 and conical plate portion 58 were divided along a dividing plane perpendicular to the symmetry axes 56a and 58a. The first member 100 and the second member 102 are arranged concentric with each other with their division faces 100a and 102a facing each other. The focused beam diameter at the light focusing point of the laser beam L transmitted through the transmissive optical member 96 and the distribution of the illumination intensity on the light focusing point can be adjusted by varying the spacing between the first member 100 and the second member 102.

The laser processing apparatus 98 may be constructed so that the transmissive optical member 96 including the first and second members 100 and 102 is mounted within the processing head 18 (FIG. 2) so as to be movable in directions along the optical axis 32a of the light-focusing optical section 32. For example, using a suitable driving mechanism (not shown) at a position that does not interfere with the laser beam L, at least one of the first and second members 100 and 102 can be mounted so as to be movable along the optical axis in a stepless manner within the housing 34. According to this configuration, since the first member 100 or the second member 102 is moved by the driving mechanism to an appropriate position to match the kind of laser processing and the material, thickness, etc. of the workpiece W or the required focusing performance of the laser beam, laser processing can be performed by irradiating the workpiece W with the laser beam L having an optimum focused beam diameter and convergent angle β. In this way, with the provision of the transmissive optical member 96 incorporating a portion corresponding to the conical plate portion 58 (focused-beam diameter increasing part), the laser processing apparatus 98 at least offers an effect equivalent to that of the laser processing apparatus 54 shown in FIG. 12A.

In particular, even when the design dictates that a portion of the laser beam L should always be transmitted through the conical plate portion formed from a combination of the first and second members 100 and 102, the laser processing apparatus 96 can change the size of the focused beam diameter of the laser beam L at the light focusing point by just adjusting the spacing between the first and second members 100 and 102, rather than replacing the transmissive optical member 96 by a different transmissive optical member 96 that differs in parameters, as would be the case with the earlier described laser processing apparatus 54. An equivalent effect can be achieved if the first and second members 100 and 102 are arranged with their division faces 100a and 102a facing away from each other.

Figure 22A:
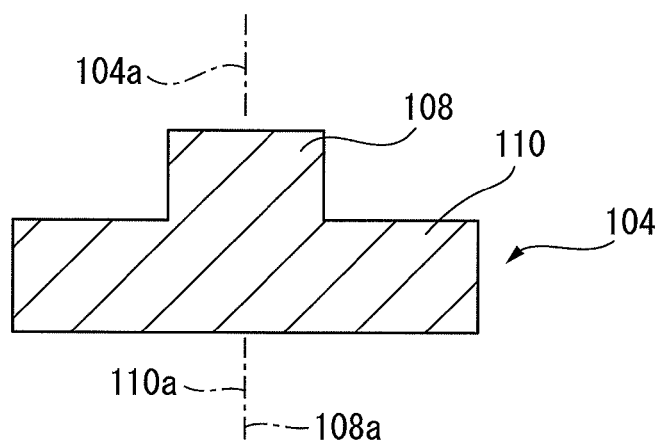
FIG. 22A is a sectional view depicting a transmissive optical member and explaining the configuration of a laser processing apparatus according to a still further embodiment.

Next, referring to FIGS. 22A to 22C, the configuration of a transmissive optical member 104 that differs in shape from any of the transmissive optical members 44, 52, 62, 64, 74, 88 and 96 and the configuration of a laser processing apparatus 106 according to an alternative embodiment incorporating the transmissive optical member 104 will be described. The laser processing apparatus 106 incorporating the transmissive optical member 104 may be constructed to have the same configuration as the laser processing apparatus 54 shown in FIGS. 12A to 15C, except that the transmissive optical member 52, 62 is replaced by the transmissive optical member 104. In the following description, components corresponding to those in the laser processing apparatus 54 are designated by like reference numerals, and such components will not be further described herein.

The transmissive optical member 104 differs from any of the above-described transmissive optical members 44, 52, 62, 64, 74, 88 and 96 by the omission of the conical plate portion that specifically functions as the focused-beam diameter increasing part. As shown in FIG. 22A, the focused-beam diameter increasing part of the transmissive optical member 104 includes a center flat plate portion 108 of uniform thickness formed in a rotationally symmetrical shape as a portion of the transmissive optical member 104 and perpendicular to its symmetry axis 108a, and an annular flat plate portion 110 of uniform thickness formed in a rotationally symmetrical shape as a portion of the transmissive optical member 104 and perpendicular to its symmetry axis 110a. The annular flat plate portion 110 is formed along the outer periphery of the center flat plate portion 108. The thickness of the center flat plate portion 108 is different from the thickness of the annular flat plate portion 110. The symmetry axis 108a of the center flat plate portion 108 and the symmetry axis 110a of the annular flat plate portion 110 coincide with each other and coincide with the center axis line 104a of the transmissive optical member 104.

Figure 22B:
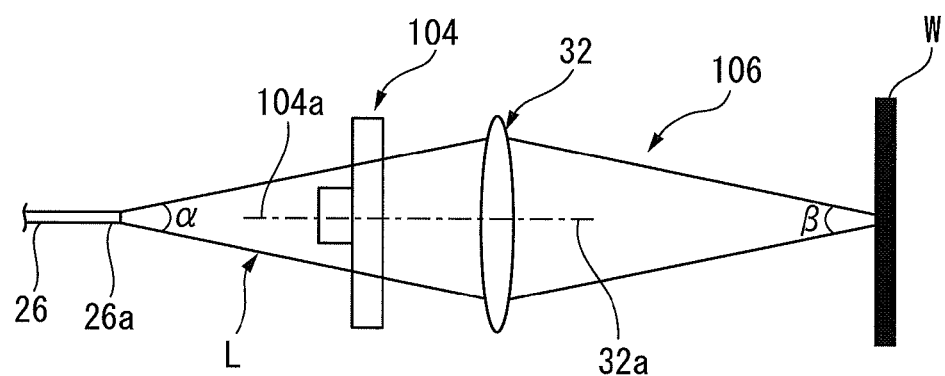
FIG. 22B is a component layout view of the laser processing apparatus of FIG. 22A.
Figure 22C:
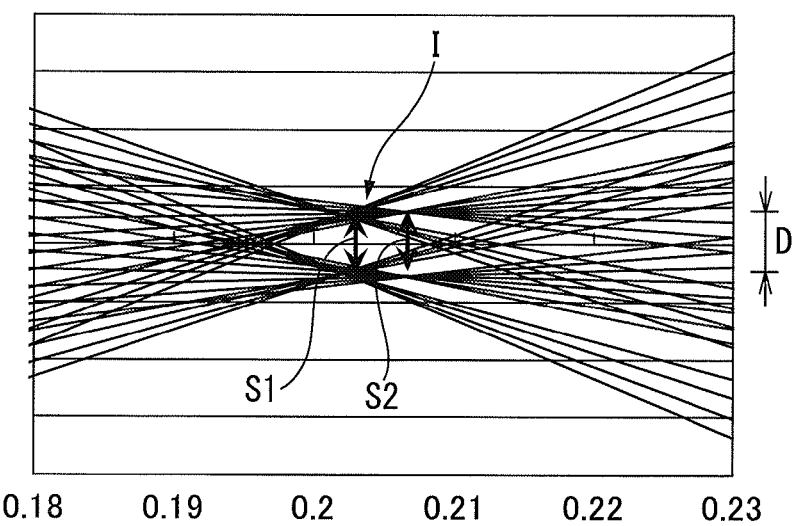
FIG. 22C is a diagram depicting light-ray paths around a light focusing point.

As shown in FIG. 22B, the transmissive optical member 104 incorporated in the laser processing apparatus 106 is provided within the processing head 18 (FIG. 2), and is disposed upstream of the light-focusing optical section 32 as seen in the traveling direction of the laser beam L. The transmissive optical member 104 is mounted within the housing 34 (FIG. 2) at a predetermined position between the exit end 26a of the optical fiber 26 and the light-focusing optical section 32 with the center axis line 104a thereof coinciding with the optical axis 32a of the light-focusing optical section 32. Further, the transmissive optical member 104 is located at a position where the center portion of the light flux of the laser beam L emitted from the exit end 26a of the optical fiber 26 is transmitted through the center flat plate portion 108 and the remaining outer portion through the annular plate portion 110. The transmissive optical member 110 allows the laser beam L emitted from the exit end 26a of the optical fiber 26 to be transmitted therethrough while keeping the diffusion angle α of the laser beam L unchanged before and after the transmission, in the same manner as previously described with reference to FIGS. 11A to 11D.

The group of light rays transmitted through the center flat plate portion 108 and the group of light rays transmitted through the annular flat plate portion 110 are each focused to the same focused beam diameter as the focused beam diameter that would be formed if the laser beam were not transmitted through the transmissive optical member 104. However, since the thickness of the center flat plate portion 108 is different from the thickness of the annular flat plate portion 110, the group of light rays transmitted through the center flat plate portion 108 is translated a different distance than the group of light rays transmitted through the annular flat plate portion 110. As a result, the group of light rays transmitted through the center flat plate portion 108 and the group of light rays transmitted through the annular flat plate portion 110 are focused on circular regions S1 and S2, respectively, one being displaced from the other along the optical axis, as shown in enlarged form in FIG. 22C. The position at which the outer diameter of the focused laser beam L becomes minimum is located between the circular region S1 and the circular region S2. This position is the light focusing point I of the laser beam L, and the focused beam diameter D here is larger than the focused beam diameter that would be formed if the laser beam were not transmitted through the transmissive optical member 104.

In this way, with the provision of the transmissive optical member 104 incorporating the center flat plate portion 108 and annular flat plate portion 110 (focused-beam diameter increasing part), the laser processing apparatus 106 at least offers an effect equivalent to that of the laser processing apparatus 54 shown in FIG. 12A. In the laser processing apparatus 106 also, the size of the focused beam diameter D can be changed by changing a desired one of various parameters such as the thicknesses, refractive indexes, etc. of the center flat plate portion 108 and annular flat plate portion 110. Further, the ratio in illumination intensity between the center region and the outer peripheral region of the light focusing point I can be adjusted by changing the outer diameter of the center flat plate portion 108 (i.e., the inner diameter of the annular flat plate portion 110).

The laser processing apparatus 106 may also be constructed so that the transmissive optical member 104 can be detachably mounted in a predetermined position within the processing head 18 or so that the transmissive optical member 104 can be mounted so as to be movable along the optical axis 32a of the light-focusing optical section 32. The size of the focused beam diameter D or the ratio in illumination intensity between the center region and the outer peripheral region of the light focusing point I can be changed or adjusted by changing the position of the transmissive optical member 104 along the optical axis 32a. Further, by detaching the transmissive optical member 104 or by mounting the transmissive optical member 104 at a position where all of the laser beam L emitted from the optical fiber exit end 26a is transmitted through the center flat plate portion 108, the laser beam L can be emitted from the processing head 18 without degrading its original focusing performance.

Next, referring to FIGS. 23A and 23B, the configuration of a transmissive optical member 112 that differs in shape from any of the transmissive optical members 44, 52, 62, 64, 74, 88, 96 and 104 and the configuration of a laser processing apparatus 114 according to an alternative embodiment incorporating the transmissive optical member 112 will be described. The laser processing apparatus 114 incorporating the transmissive optical member 112 may be constructed to have the same configuration as the laser processing apparatus 54 shown in FIGS. 12A to 15C, except that the transmissive optical member 52, 62 is replaced by the transmissive optical member 112. In the following description, components corresponding to those in the laser processing apparatus 54 are designated by like reference numerals, and such components will not be further described herein.

In the transmissive optical member 112, as in the transmissive optical member 104 described above, the conical plate portion that specifically functions as the focused-beam diameter increasing part is not provided. As shown in FIG. 23A, the focused-beam diameter increasing part of the transmissive optical member 112 includes a center flat plate portion 116 of uniform thickness formed in a rotationally symmetrical shape as a portion of the transmissive optical member 112 and perpendicular to its symmetry axis 116a, and an annular flat plate portion 118 of uniform thickness formed in a rotationally symmetrical shape as a portion of the transmissive optical member 112 and perpendicular to its symmetry axis 118a. The annular flat plate portion 118 is formed along the outer periphery of the center flat plate portion 116. The center flat plate portion 116 and the annular flat plate portion 118 are identical in thickness but differs in refractive index. The symmetry axis 116a of the center flat plate portion 116 and the symmetry axis 118a of the annular flat plate portion 118 coincide with each other and coincide with the center axis line 112a of the transmissive optical member 112.

Figure 23A:
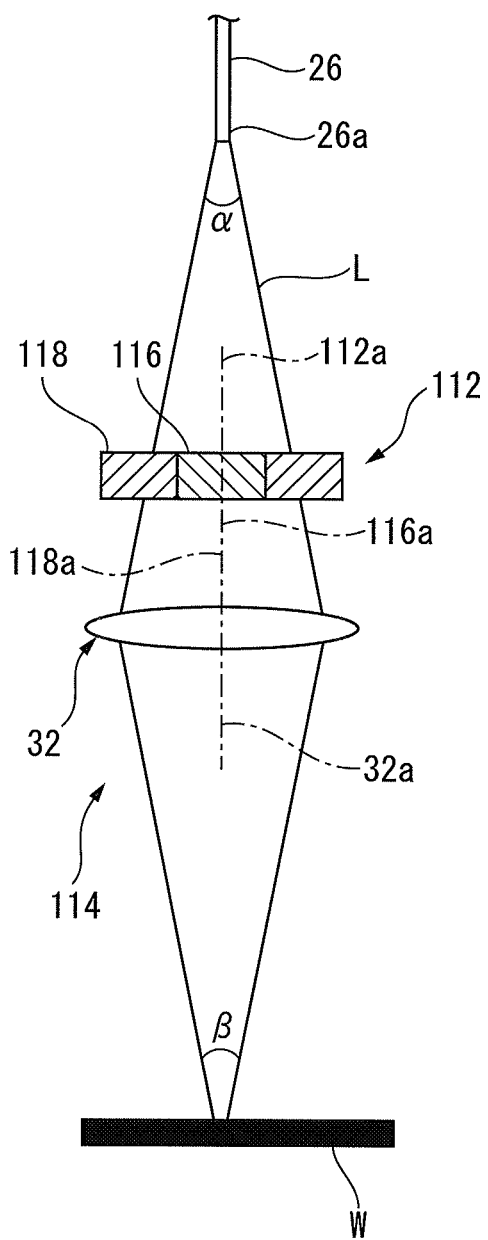
FIG. 23A is a diagram depicting a laser processing apparatus according to an yet further embodiment.
Figure 23B:
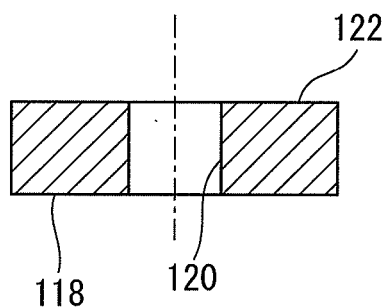
FIG. 23B is a sectional view of a transmissive optical member of the laser processing apparatus of FIG. 23A.

As shown in FIG. 23A, the transmissive optical member 112 incorporated in the laser processing apparatus 114 is provided within the processing head 18 (FIG. 2), and is disposed upstream of the light-focusing optical section 32 as seen in the traveling direction of the laser beam L. The transmissive optical member 112 is mounted within the housing 34 (FIG. 2) at a predetermined position between the exit end 26a of the optical fiber 26 and the light-focusing optical section 32 with the center axis line 112a thereof coinciding with the optical axis 32a of the light-focusing optical section 32. Further, the transmissive optical member 112 is located at a position where the center portion of the light flux of the laser beam L emitted from the exit end 26a of the optical fiber 26 is transmitted through the center flat plate portion 116 and the remaining outer portion through the annular plate portion 118.

With the provision of the transmissive optical member 112, the laser processing apparatus 114 can adjust the focused beam diameter of the laser beam L and the distribution of the illumination intensity on the focusing point in the same manner as the laser processing apparatus 106. Further, in the laser processing apparatuses 106 and 114, the transmissive optical member 104, 112 may be replaced by a transmissive optical member 122 which is provided, inside the annular flat plate portion 118, with a circular hole 120 centered at the symmetry axis 118a, as illustrated in FIG. 23B. The transmissive optical member 122 is substantially identical to the transmissive optical member 104, 112, except that the center flat plate portion 108, 116 is replaced by the hole 120, and the effect it exerts on the laser beam being transmitted is substantially the same as that of the transmissive optical member 104, 112.

When the transmissive optical member 104, 112, 122 is disposed on the upstream side of the light-focusing optical section 32, it is preferable that the annular flat plate portion 110, 118 has an inner diameter larger than the minimum beam diameter (equal to the core diameter of the exit end 26a of the optical fiber 26) of the laser beam L having the diffusion angle α. On the other hand, when the transmissive optical member 104, 112, 122 is disposed on the downstream side of the light-focusing optical section 32, it is preferable that the annular conical plate portion 110, 118 has an inner diameter larger than the focused beam diameter D of the laser beam L having the convergent angle β.

While the embodiments of the present invention have been described above, it will be understood by those skilled in the art that various modifications and changes can be made without departing from the scope of the invention as defined by the appended claims.

The invention claimed is:

1. A laser processing apparatus comprising:
a processing head configured to irradiate a workpiece with a laser beam;
a light-focusing optical section provided in said processing head, the light-focusing optical section configured to focus a laser beam having a diffusion angle, the laser beam being supplied from a laser source and entering said processing head, and to enable the laser beam to be emitted from said processing head as the laser beam having a convergent angle; and
a transmissive optical member provided in said processing head, the transmissive optical member configured to be located at an upstream side of said light-focusing optical section as seen in a traveling direction of the laser beam so as to transmit the laser beam while keeping said diffusion angle constant, before and after transmission, or alternatively, the transmissive optical member configured to be located at a downstream side of said light-focusing optical section as seen in a traveling direction of the laser beam so as to transmit the laser beam while keeping said convergent angle constant, before and after transmission;
wherein said transmissive optical member includes a focused-beam diameter increasing part configured to increase a focused beam diameter of the laser beam transmitted through the focused-beam diameter increasing part, as compared to a focused beam diameter of the laser beam in a case where the laser beam is not transmitted through the focused-beam diameter increasing part but is focused by said light-focusing optical section;
wherein said focused-beam diameter increasing part comprises a rotationally-symmetric conical plate portion of said transmissive optical member, the conical plate portion being oblique to a symmetry axis and having a uniform thickness; and
wherein said transmissive optical member is located at a position where the symmetry axis of the conical plate portion coincides with an optical axis of said light-focusing optical section.

2. The laser processing apparatus of claim 1, wherein said transmissive optical member is provided in its entirety with said conical plate portion.

3. The laser processing apparatus of claim 1, wherein said transmissive optical member is provided with a rotationally-symmetric center flat plate portion, the center flat plate portion being perpendicular to said symmetry axis and having a uniform thickness; and wherein said conical plate portion has an annular shape and is formed along a periphery of the center flat plate portion.

4. The laser processing apparatus of claim 1, wherein said conical plate portion has an annular shape; and wherein said transmissive optical member is provided inside said conical plate portion with a circular hole centered at said symmetry axis.

5. The laser processing apparatus of claim 3, wherein, in a configuration that said transmissive optical member is located at said upstream side, said conical plate portion having said annular shape has an inner diameter larger than a minimum beam diameter of the laser beam having the diffusion angle; or wherein, in a configuration that said transmissive optical member is located at said downstream side, said conical plate portion having said annular shape has an inner diameter larger than the focused beam diameter of the laser beam having the convergent angle.

6. The laser processing apparatus of claim 1, wherein said transmissive optical member is provided with a plurality of conical plate portions, each of which is said rotationally-symmetric conical plate portion; and wherein the plurality of conical plate portions are arranged concentrically and extend obliquely to said symmetry axis at mutually different angles.

7. The laser processing apparatus of claim 6, wherein said plurality of conical plate portions include a pair of conical plate portions extending obliquely to said symmetry axis in mutually opposite directions at angles with an equal absolute value.

8. The laser processing apparatus of claim 1, wherein said transmissive optical member includes a first member and a second member, which are shaped as two halves of said conical plate portion and have division faces perpendicular to said symmetry axis; and wherein the first and second members are mutually coaxially arranged with the division faces opposed to each other, or alternatively, with the division faces facing away from each other.

9. A laser processing apparatus comprising:
a processing head configured to irradiate a workpiece with a laser beam;
a light-focusing optical section provided in said processing head, the light-focusing optical section configured to focus a laser beam having a diffusion angle, the laser beam being supplied from a laser source and entering said processing head, and to enable the laser beam to be emitted from said processing head as the laser beam having a convergent angle; and
a transmissive optical member provided in said processing head, the transmissive optical member configured to be located at an upstream side of said light-focusing optical section as seen in a traveling direction of the laser beam so as to transmit the laser beam while keeping said diffusion angle constant, before and after transmission, or alternatively, the transmissive optical member configured to be located at a downstream side of said light-focusing optical section as seen in a traveling direction of the laser beam so as to transmit the laser beam while keeping said convergent angle constant, before and after transmission;
wherein said transmissive optical member includes a focused-beam diameter increasing part configured to increase a focused beam diameter of the laser beam transmitted through the focused-beam diameter increasing part, as compared to a focused beam diameter of the laser beam in a case where the laser beam is not transmitted through the focused-beam diameter increasing part but is focused by said light-focusing optical section;
wherein said focused-beam diameter increasing part comprises a rotationally-symmetric center flat plate portion of said transmissive optical member, the center flat plate portion being perpendicular to a symmetry axis and having a uniform thickness, and a rotationally-symmetric annular flat plate portion of said transmissive optical member, the annular flat plate portion being perpendicular to a symmetry axis and having a uniform thickness, the annular flat plate portion being formed along a periphery of the center flat plate portion, the thickness of the center flat plate portion being different from the thickness of the annular flat plate portion; and
wherein said transmissive optical member is located at a position where the symmetry axis of the center flat plate portion and the symmetry axis of the annular flat plate portion coincide with an optical axis of said light-focusing optical section.

10. A laser processing apparatus comprising:
a processing head configured to irradiate a workpiece with a laser beam;
a light-focusing optical section provided in said processing head, the light-focusing optical section configured to focus a laser beam having a diffusion angle, the laser beam being supplied from a laser source and entering said processing head, and to enable the laser beam to be emitted from said processing head as the laser beam having a convergent angle; and
a transmissive optical member provided in said processing head, the transmissive optical member configured to be located at an upstream side of said light-focusing optical section as seen in a traveling direction of the laser beam so as to transmit the laser beam while keeping said diffusion angle constant, before and after transmission, or alternatively, the transmissive optical member configured to be located at a downstream side of said light-focusing optical section as seen in a traveling direction of the laser beam so as to transmit the laser beam while keeping said convergent angle constant, before and after transmission;
wherein said transmissive optical member includes a focused-beam diameter increasing part configured to increase a focused beam diameter of the laser beam transmitted through the focused-beam diameter increasing part, as compared to a focused beam diameter of the laser beam in a case where the laser beam is not transmitted through the focused-beam diameter increasing part but is focused by said light-focusing optical section;
wherein said focused-beam diameter increasing part comprises a rotationally-symmetric center flat plate portion of said transmissive optical member, the center flat plate portion being perpendicular to a symmetry axis and having a uniform thickness, and a rotationally-symmetric annular flat plate portion of said transmissive optical member, the annular flat plate portion being perpendicular to a symmetry axis and having a uniform thickness, the annular flat plate portion being formed along a periphery of the center flat plate portion, a refractive index of the center flat plate portion being different from a refractive index of the annular flat plate portion; and
wherein said transmissive optical member is located at a position where the symmetry axis of the center flat plate portion and the symmetry axis of the annular flat plate portion coincide with an optical axis of said light-focusing optical section.

11. A laser processing apparatus comprising:
a processing head configured to irradiate a workpiece with a laser beam;
a light-focusing optical section provided in said processing head, the light-focusing optical section configured to focus a laser beam having a diffusion angle, the laser beam being supplied from a laser source and entering said processing head, and to enable the laser beam to be emitted from said processing head as the laser beam having a convergent angle; and
a transmissive optical member provided in said processing head, the transmissive optical member configured to be located at an upstream side of said light-focusing optical section as seen in a traveling direction of the laser beam so as to transmit the laser beam while keeping said diffusion angle constant, before and after transmission, or alternatively, the transmissive optical member configured to be located at a downstream side of said light-focusing optical section as seen in a traveling direction of the laser beam so as to transmit the laser beam while keeping said convergent angle constant, before and after transmission;
wherein said transmissive optical member includes a focused-beam diameter increasing part configured to increase a focused beam diameter of the laser beam transmitted through the focused-beam diameter increasing part, as compared to a focused beam diameter of the laser beam in a case where the laser beam is not transmitted through the focused-beam diameter increasing part but is focused by said light-focusing optical section;
wherein said focused-beam diameter increasing part comprises a rotationally-symmetric annular flat plate portion of said transmissive optical member, the annular flat plate portion being perpendicular to a symmetry axis and having a uniform thickness;

wherein said transmissive optical member is provided inside said annular flat plate portion with a circular hole centered at the symmetry axis; and wherein said transmissive optical member is located at a position where the symmetry axis of the annular flat plate portion coincides with an optical axis of said light-focusing optical section.

12. The laser processing apparatus of claim 9, wherein, in a configuration that said transmissive optical member is located at said upstream side, said annular flat plate portion has an inner diameter larger than a minimum beam diameter of the laser beam having the diffusion angle; or wherein, in a configuration that said transmissive optical member is located at said downstream side, said annular flat plate portion has an inner diameter larger than the focused beam diameter of the laser beam having the convergent angle.

13. The laser processing apparatus of claim 1, wherein said transmissive optical member is detachably attached to said processing head at a predetermined position of said processing head.

14. The laser processing apparatus of claim 1, wherein said transmissive optical member is attached to said processing head movably along an optical axis of said light-focusing optical section.

* * * * *